US012736801B2

(12) United States Patent
Lai et al.

(10) Patent No.: US 12,736,801 B2
(45) Date of Patent: Sep. 15, 2026

(54) TEMPERATURE-ADJUSTABLE OPTICAL IMAGING LENS

(71) Applicant: ABILITY OPTO-ELECTRONICS TECHNOLOGY CO., LTD., Taichung City (TW)

(72) Inventors: Chien-Hsun Lai, Taichung City (TW); Yeong-Ming Chang, Taichung City (TW); Yao-Wei Liu, Taichung City (TW)

(73) Assignee: ABILITY OPTO-ELECTRONICS TECHNOLOGY CO., LTD., Taichung City (TW)

( * ) Notice: Subject to any disclaimer, the term of this patent is extended or adjusted under 35 U.S.C. 154(b) by 318 days.

(21) Appl. No.: 18/421,665

(22) Filed: Jan. 24, 2024

(65) Prior Publication Data

US 2025/0155701 A1 May 15, 2025

(30) Foreign Application Priority Data

Nov. 10, 2023 (TW) ................................ 112143477

(51) Int. Cl.
*G02B 7/00* (2021.01)
*G02B 27/00* (2006.01)

(52) U.S. Cl.
CPC ......... *G02B 27/0006* (2013.01); *G02B 7/008* (2013.01)

(58) Field of Classification Search
CPC .... G02B 27/0006; G02B 7/008; G02B 7/021; G02B 7/028; G02B 13/00; G02B 13/0045
See application file for complete search history.

(56) References Cited

U.S. PATENT DOCUMENTS

2004/0223074 A1* 11/2004 Takada .................. H04N 23/54 348/360
2012/0135511 A1* 5/2012 Battrell ................. C12M 23/16 435/287.2
2018/0239105 A1* 8/2018 Lee ....................... G03B 17/55
2019/0137723 A1* 5/2019 Bernal .................. H04N 23/55
2019/0137850 A1* 5/2019 Ha ........................ G02B 7/028
2021/0239944 A1* 8/2021 Chang ..................... G02B 9/60
2021/0294066 A1* 9/2021 Hirata .................. G02B 7/028
2023/0221548 A1* 7/2023 Hsiao .................... G02B 7/028 359/512
2024/0427111 A1* 12/2024 Lin ....................... H04N 23/52

* cited by examiner

*Primary Examiner* — Mustak Choudhury

(74) *Attorney, Agent, or Firm* — Birch, Stewart, Kolasch & Birch, LLP

(57) ABSTRACT

A temperature-adjustable optical imaging lens includes an imaging lens assembly, a positioning assembly, a thermo-conductive module, and a heating module; the imaging lens assembly includes a first lens and a second lens with refractive power; the positioning assembly includes a lens barrel, which is hollow and non-transparent; the lens barrel has a cylindrical portion for accommodating the imaging lens assembly; the thermoconductive module is disposed in the cylindrical portion of the positioning assembly and between the first lens and the second lens and is in contact with the first lens and the second lens; the heating module is connected to the thermoconductive module and for providing a heat source to the first lens and the second lens.

35 Claims, 27 Drawing Sheets

TEMPERATURE-ADJUSTABLE OPTICAL IMAGING LENS

BACKGROUND OF THE INVENTION

Technical Field

The present invention relates generally to a lens barrel structure, and more particularly to a temperature-adjustable optical imaging lens.

Description of Related Art

Environmental adaptability of lens materials under various temperature conditions are one of the main factors in designing an optical imaging lens. For example, outdoor optical imaging lenses, including automotive cameras, action cameras, or aerial cameras, often require the use of multiple glass lenses to mitigate the impact of temperature changes on a shape of the lenses; For indoor optical imaging lenses, such as surveillance cameras, as indoor environments typically maintain at a certain temperature range, plastic lenses are used to reduce costs and weight.

Although an outdoor optical imaging lens can address the issue of lens deformation caused by temperature changes through the lens materials, the outdoor optical imaging lens still faces challenges in environments with significant temperature differences or in cold and humid weather. In such conditions, lens surfaces of the optical imaging lens are prone to fogging or frosting due to the condensation of water vapor in the air in the cold weather. In severe cases, ice may form on the lens surfaces inside the optical imaging lens, thereby obstructing the field of view and affecting the clarity of imaging. Moreover, this may lead to lens breakage of the optical imaging lens or malfunction and damage of internal components in the optical imaging lens.

Therefore, how to provide an optical imaging lens, which could resolve the fogging phenomenon, is a problem needed to be solved.

BRIEF SUMMARY OF THE INVENTION

In view of the above, the primary objective of the present invention is to provide a temperature-adjustable optical imaging lens, which could defog lenses through heating the lenses.

The present invention provides a temperature-adjustable optical imaging lens, including an imaging lens assembly, a positioning assembly, a thermoconductive module, and a heating module. The imaging lens assembly includes at least five lenses with refractive power and an image plane, wherein the at least five lenses, in order along an optical axis from an object side to an image side, a first lens, a second lens, a third lens, a fourth lens and a fifth lens; the positioning assembly includes a lens barrel which is hollow and non-transparent, wherein the lens barrel has a cylindrical portion; the cylindrical portion is adapted to accommodate the imaging lens assembly; the thermoconductive module is disposed in the cylindrical portion of the positioning assembly, wherein the thermoconductive module is disposed between the first lens and the second lens and is in contact with the first lens and the second lens; the heating module is connected to the thermoconductive module and is adapted to provide a heat source to the first lens and the second lens; wherein the imaging lens assembly satisfies: $1.2 \leq f/HEP \leq 3.0$; $1.5 \leq HOS/f \leq 10$; $50\ deg < HAF \leq 100\ deg$; and $0.1 \leq 2\ (ARE/HEP) \leq 2.0$, wherein f is a focal length of the imaging lens assembly; HEP is an entrance pupil diameter of the imaging lens assembly; HAF is a half of a maximum field angle of the imaging lens assembly; HOS is a distance between an object-side surface, which faces the object side, of the first lens and the image plane on the optical axis; for any surface of any lens, ARE is a profile curve length measured from a start point where the optical axis passes therethrough, along a surface profile thereof, and finally to a coordinate point of a perpendicular distance where is a half of the entrance pupil diameter away from the optical axis.

The present invention further provides a temperature-adjustable optical imaging lens, including an imaging lens assembly, a positioning assembly, a thermoconductive module, and a heating module. The imaging lens assembly includes at least five lenses with refractive power and an image plane, wherein the at least five lenses, in order along an optical axis from an object side to an image side, a first lens, a second lens, a third lens, a fourth lens and a fifth lens; the positioning assembly includes a lens barrel which is hollow and non-transparent, wherein the lens barrel has a cylindrical portion; the cylindrical portion is adapted to accommodate the imaging lens assembly; the thermoconductive module is disposed in the cylindrical portion of the positioning assembly, wherein the thermoconductive module is disposed between the first lens and the second lens and is in contact with the second lens; the heating module is disposed on the thermoconductive module and is in contact with the first lens; the heating module is adapted to provide a heat source to the first lens and the second lens; wherein the imaging lens assembly satisfies: $1.2 \leq f/HEP \leq 3.0$; $1.5 \leq HOS/f \leq 10$; $50\ deg < HAF \leq 100\ deg$; and $0.1 \leq 2\ (ARE/HEP) \leq 2.0$, wherein f is a focal length of the imaging lens assembly; HEP is the entrance pupil diameter of the imaging lens assembly; HAF is a half of a maximum field angle of the imaging lens assembly; HOS is a distance between an object-side surface of the first lens, which faces the object side, and the image plane; for any surface of any lens, ARE is a profile curve length measured from a start point where the optical axis passes therethrough, along a surface profile thereof, and finally to a coordinate point of a perpendicular distance where is a half of the entrance pupil diameter away from the optical axis.

The present invention further provides a temperature-adjustable optical imaging lens, including an imaging lens assembly, a positioning assembly, a thermoconductive module, and a heating module. The imaging lens assembly includes at least five lenses with refractive power and an image plane, wherein the at least five lenses, in order along an optical axis from an object side to an image side, includes a first lens, a second lens, a third lens, a fourth lens and a fifth lens; the positioning assembly includes a lens barrel which is hollow and non-transparent, wherein the lens barrel has a cylindrical portion; the cylindrical portion is adapted to accommodate the imaging lens assembly; the thermoconductive module is disposed in the cylindrical portion of the positioning assembly, wherein the thermoconductive module is disposed between the first lens and the second lens and is in contact with the second lens; the heating module is connected to the thermoconductive module and is adapted to provide a heat source to the first lens and the second lens; wherein the imaging lens assembly satisfies: $1.6 \leq f/HEP \leq 2.31$; $1.7 \leq HOS/f \leq 8.0$; $60\ deg < HAF \leq 70\ deg$; and $0.1 \leq 2\ (ARE/HEP) \leq 2.0$, wherein f is a focal length of the imaging lens assembly; HEP is an entrance pupil diameter of the imaging lens assembly; HAF is a half of a maximum field angle of the imaging lens assembly; HOS is a distance between an object-side surface, which face the object side, of the first lens and the image plane on the optical axis; for any surface of any lens, ARE is a profile curve length measured from a start point where the optical axis passes therethrough, along a surface profile thereof, and finally to a coordinate point of a perpendicular distance where is a half of the entrance pupil diameter away from the optical axis.

The term and the definition for the lens parameters in the embodiments of the present invention are detailed below for further reference.

The lens parameter related to a length or a height in the lens:

In the visible light spectrum, the present invention may adopt the wavelength of 555 nm as the main reference wavelength and the basis for measuring focus shift; a maximum height for image formation of the imaging lens assembly is denoted by HOI; a distance from the object-side surface of the first lens to the image plane of the imaging lens assembly is denoted by HOS; a distance from the object-side surface of the first lens to the image-side surface of the last lens of the imaging lens assembly is denoted by InTL; a distance from the aperture to the image plane of the imaging lens assembly is denoted by InS; a distance between the first lens and the second lens along the optical axis of the imaging lens assembly is denoted by IN12 (instance); a thickness of the first lens along the optical axis of the imaging lens assembly is denoted by TP1, a thickness of the second lens along the optical axis of the imaging lens assembly is denoted by TP2, and a thickness of the third lens along the optical axis of the imaging lens assembly is denoted by TP3.

The lens parameter related to a field angle in the lens:

A maximum field angle of the imaging lens assembly is denoted by AF; half of the maximum field angle is denoted by HAF.

The lens parameter related to an exit/entrance pupil in the lens:

An entrance pupil diameter of the imaging lens assembly is denoted by HEP; for any surface of any lens, a profile curve length of a half of the entrance pupil diameter (HEP) is, by definition, measured from a start point where the optical axis of the belonging imaging lens assembly passes through the surface of the lens, along a surface profile of the lens, and finally to a coordinate point of a perpendicular distance where is a half of the entrance pupil diameter away from the optical axis. In other words, the curve length between the aforementioned stat point and the coordinate point is the profile curve length of a half of the entrance pupil diameter (HEP), and is denoted by ARE. For example, the profile curve length of a half of the entrance pupil diameter (HEP) of the object-side surface of the first lens is denoted by ARE11, the profile curve length of a half of the entrance pupil diameter (HEP) of the image-side surface of the first lens is denoted by ARE12, the profile curve length of a half of the entrance pupil diameter (HEP) of the object-side surface of the second lens is denoted by ARE21, the profile curve length of a half of the entrance pupil diameter (HEP) of the image-side surface of the second lens is denoted by ARE22, and so on. For any surface of any lens, a maximum effective half diameter (EHD) is a perpendicular distance between an optical axis and a crossing point on the surface where the incident light with a maximum field angle of the imaging lens assembly passing the very edge of the entrance pupil. For example, the maximum effective half diameter of the object-side surface of the first lens is denoted by EHD11, the maximum effective half diameter of the image-side surface of the first lens is denoted by EHD12, the maximum effective half diameter of the object-side surface of the second lens is denoted by EHD21, the maximum effective half diameter of the image-side surface of the second lens is denoted by EHD22, and so on.

The lens variable related to aberrations:

TV distortion for image formation in the imaging lens assembly is denoted by TDT. Further, the range of the aberration offset for the view of image formation may be limited to 50%-100% field.

Transverse aberration on an edge of an aperture is denoted by STA, which stands for STOP transverse aberration, and is used to evaluate the performance of one specific imaging lens assembly. The transverse aberration of light in any field of view can be calculated with a tangential fan or a sagittal fan. More specifically, the transverse aberration caused when the longest operation wavelength (e.g., 650 nm) and the shortest operation wavelength (e.g., 470 nm) pass through the edge of the aperture can be used as the reference for evaluating performance. The coordinate directions of the aforementioned tangential fan can be further divided into a positive direction (upper light) and a negative direction (lower light). The longest operation wavelength which passes through the edge of the aperture has an imaging position on the image plane in a particular field of view, and the reference wavelength of the main light (e.g., 555 nm) has another imaging position on the image plane in the same field of view. The transverse aberration caused when the longest operation wavelength passes through the edge of the aperture is defined as a distance between these two imaging positions. Similarly, the shortest operation wavelength which passes through the edge of the aperture has an imaging position on the image plane in a particular field of view, and the transverse aberration caused when the shortest operation wavelength passes through the edge of the aperture is defined as a distance between the imaging position of the shortest operation wavelength and the imaging position of the reference wavelength. The performance of the imaging lens assembly can be considered excellent if the transverse aberrations of the shortest and the longest operation wavelength which pass through the edge of the aperture and image on the image plane in 0.7 field of view (i.e., 0.7 times the height for image formation HOI) are both less than 100 μm. Furthermore, for a stricter evaluation, the performance cannot be considered excellent unless the transverse aberrations of the shortest and the longest operation wavelength which pass through the edge of the aperture and image on the image plane in 0.7 field of view are both less than 80 μm.

The imaging lens assembly has a maximum image height HOI on the image plane vertical to the optical axis. A transverse aberration at 0.7 HOI in the positive direction of the tangential fan after the longest operation wavelength of visible light passing through the edge of the aperture is denoted by PLTA; a transverse aberration at 0.7 HOI in the positive direction of the tangential fan after the shortest operation wavelength of visible light passing through the edge of the aperture is denoted by PSTA; a transverse aberration at 0.7 HOI in the negative direction of the tangential fan after the longest operation wavelength of visible light passing through the edge of the aperture is denoted by NLTA; a transverse aberration at 0.7 HOI in the negative direction of the tangential fan after the shortest operation wavelength of visible light passing through the edge of the aperture is denoted by NSTA; a transverse aberration at 0.7 HOI of the sagittal fan after the longest operation wavelength of visible light passing through the edge of the aperture is denoted by SLTA; a transverse aberration at 0.7 HOI of the sagittal fan after the shortest operation wavelength of visible light passing through the edge of the aperture is denoted by SSTA.

With the aforementioned design of the temperature-adjustable optical imaging lens, the thermoconductive module is disposed between the first lens and the second lens of the imaging lens assembly and is at least in direct contact with the second lens.

In practice, when the heating module is activated to heat the thermoconductive module, the thermoconductive module could conducts the heat energy of the heating module to both the first lens and the second lens, so that the surface moisture on the first lens could be effectively heated and evaporated, thereby reducing the occurrence of fogging on the first lens. Simultaneously, the second lens is heated, thereby preventing environmental moisture, which enter the lens barrel, from condensation. In this way, the temperature-adjustable optical imaging lens could be applied in various working environments and maintains excellent image capture performance without being limited by the change of climate temperature difference.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
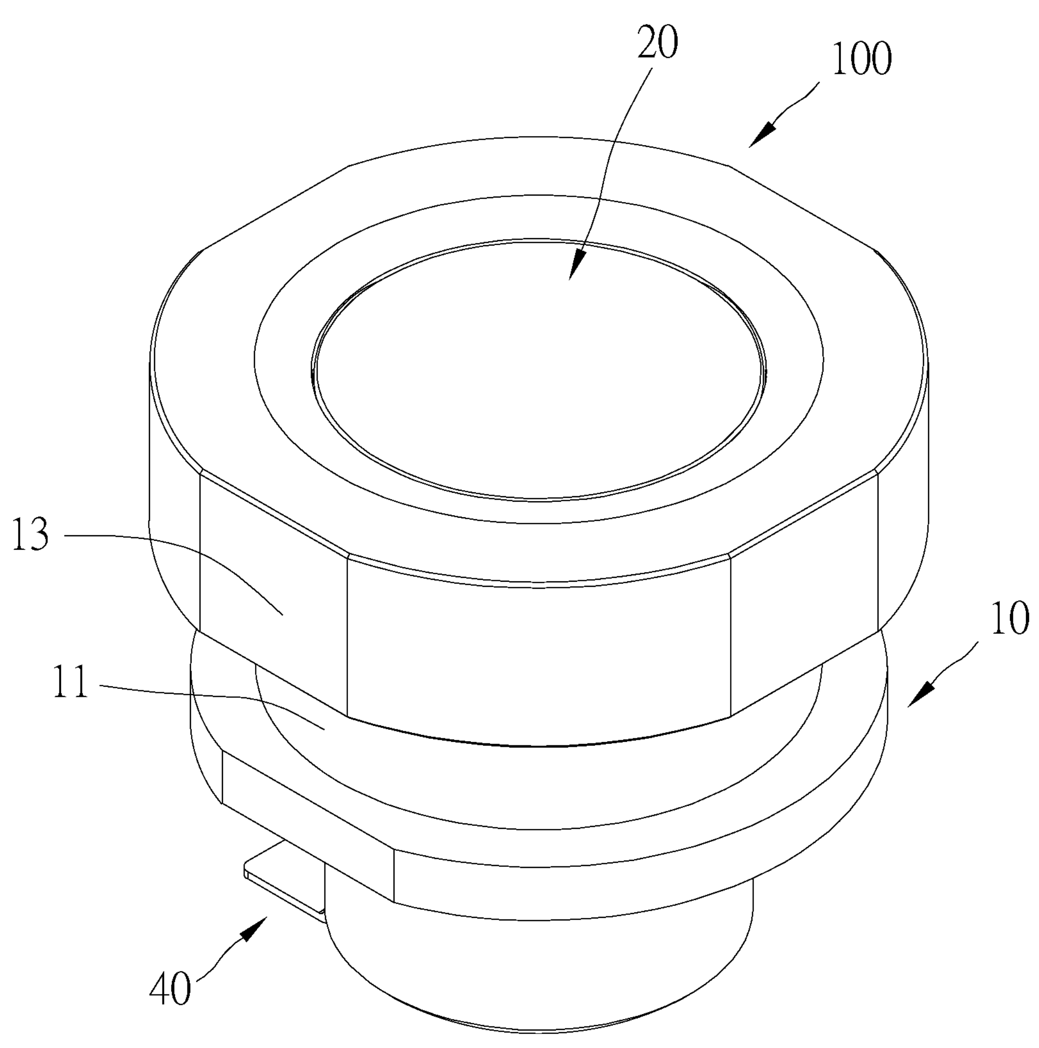
FIG. 1 is a perspective view of the temperature-adjustable optical imaging lens according to a first embodiment of the present invention.

A temperature-adjustable optical imaging lens 100 according to a first embodiment of the present invention is illustrated in FIG. 1 to FIG. 4 and includes a positioning assembly 10, an imaging lens assembly 20, a thermoconductive module 30, and a heating module 40.

Figure 2:
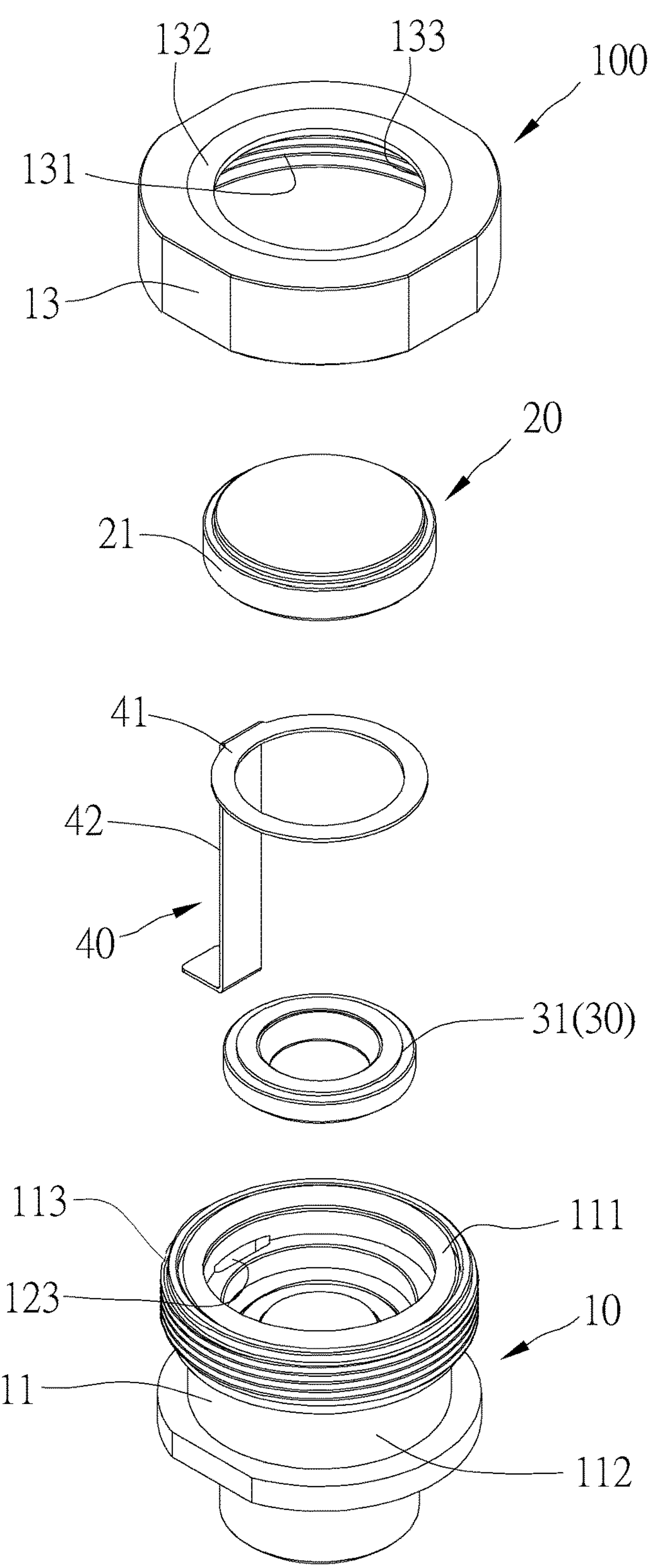
FIG. 2 is an exploded view of the temperature-adjustable optical imaging lens according to the first embodiment of the present invention.
Figure 3:
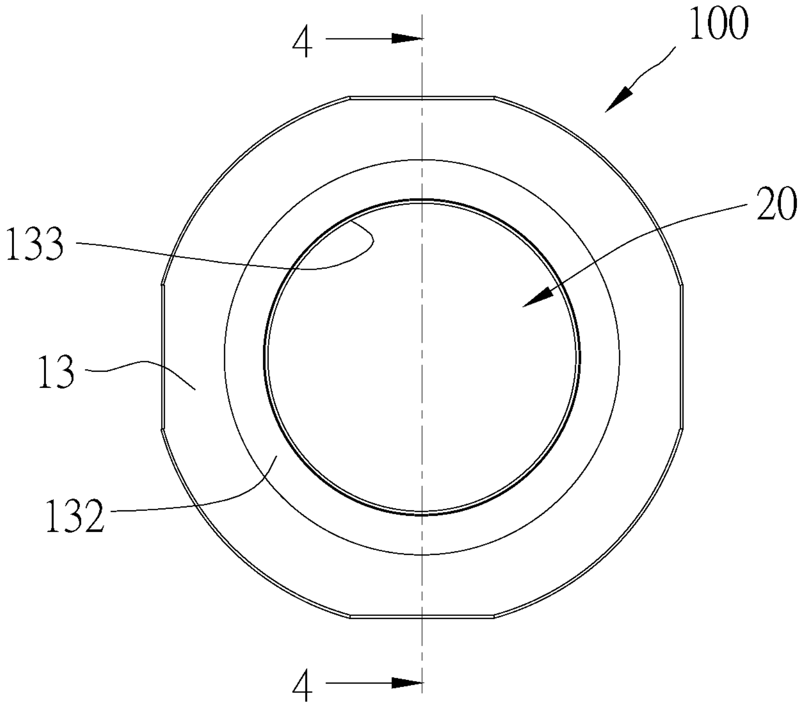
FIG. 3 is a top view of the temperature-adjustable optical imaging lens according to the first embodiment of the present invention.
Figure 4:
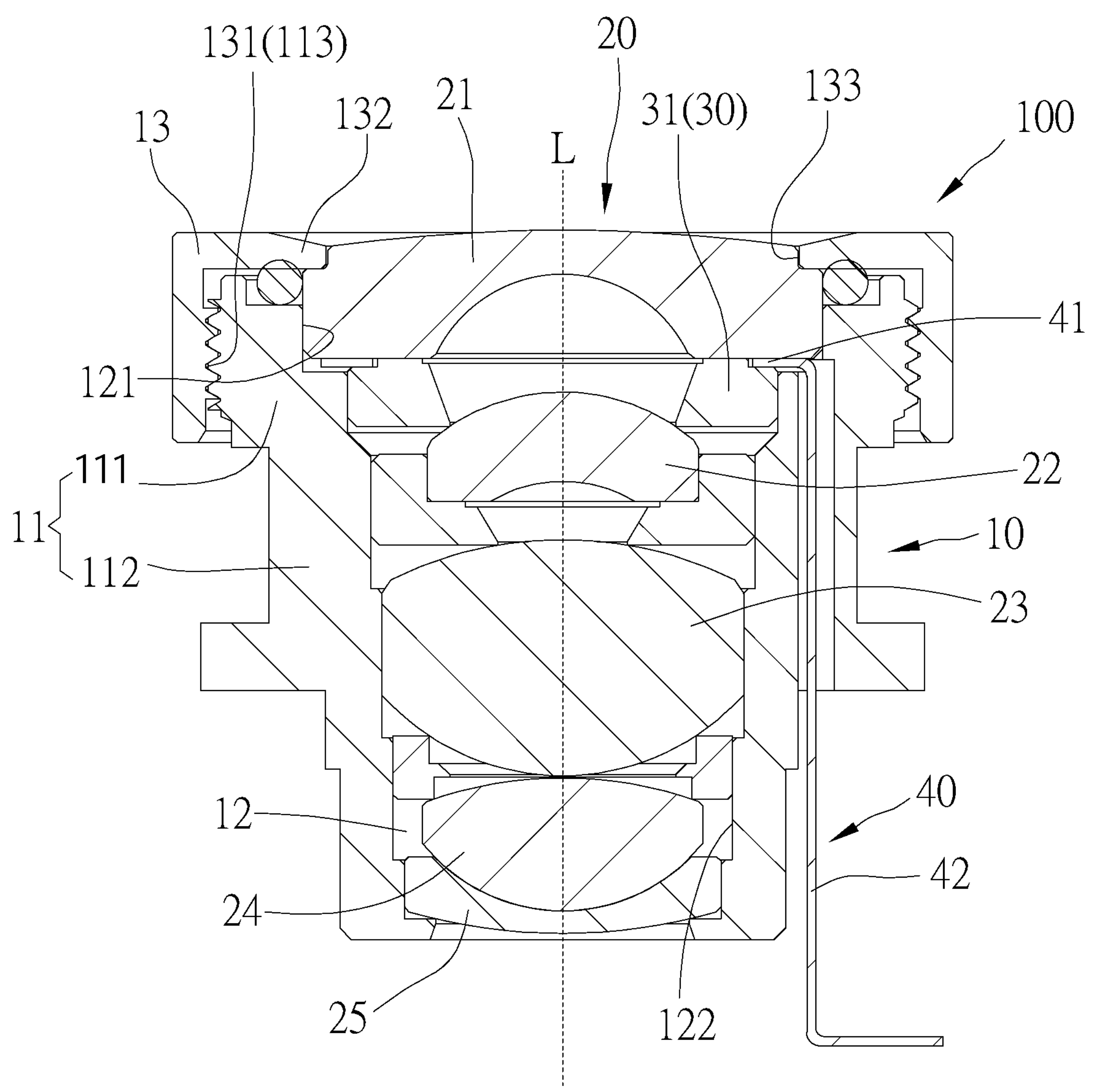
FIG. 4 is a sectional view along the 4-4 line in FIG. 3.

The positioning assembly 10 includes a lens barrel 11 which is hollow and non-transparent. The lens barrel 11 has a cylindrical portion 12 inside the lens barrel 11. The cylindrical portion 12 is adapted to accommodate the imaging lens assembly 20. Referring to FIG. 2 to FIG. 4, the cylindrical portion 12 includes a connecting head section 111 and a housing body section 112. The lens barrel 11 extends along a central axis L to form the connecting head section 111 and the housing body section 112, wherein the cylindrical portion 12 has a mounting slot 121 on an inner side of the connecting head section 111. The cylindrical portion 12 has a receiving groove 122 on an inner side of the housing body section 112 and penetrating along the central axis L to communicate with the mounting slot 121. In addition, the cylindrical portion 12 further includes a side opening 123, wherein the side opening 123 is located on the inner side of the connecting head section 111 and laterally penetrating a sidewall of the mounting slot 121, so that the mounting slot 121 laterally communicates with an outer side of the connecting head section 111 through the side opening 123.

In addition, the positioning assembly 10 further includes an external cover 13, wherein the external cover 13 is connected to the connecting head section 111 of the lens barrel 11. Referring to FIG. 2 and FIG. 4, an outer periphery of the connecting head section 111 of the lens barrel 11 has an external threaded section 113. An inner side of the external cover 13 has an internal threaded section 131 correspondingly screwed with the external threaded section 113. An end of the external cover 13 extends inward to form a blocking ring 132, wherein the blocking ring 132 partially blocks an opening of the mounting slot 121 of the connecting head section 111. A through hole 133 is formed on an inner side of the blocking ring 132 and communicates with the mounting slot 121.

The imaging lens assembly 20 is installed inside the lens barrel 11 of the positioning assembly 10. The imaging lens assembly 20 includes at least five lenses with refractive power and an image plane (not shown), wherein the at least five lenses, arranged in order from an object side to an image side along an optical axis, include a first lens 21, a second lens 22, a third lens 23, a fourth lens 24, and a fifth lens 25. In the first embodiment, the first lens 21, the second lens 22, the third lens 23, the fourth lens 24, and the fifth lens 25 are arranged in sequence along the central axis L from the object side to the image side and installed in the cylindrical portion 12, wherein the first lens 21 is installed in the mounting slot 121 of the connecting head section 111, and the second lens 22, the third lens 23, the fourth lens 24, and the fifth lens 25 are respectively arranged and installed in the receiving groove 122 of the housing body section 112. When the first lens 21 is loaded into the mounting slot 121 of the connecting head section 111, the external cover 13 is correspondingly assembled onto the connecting head section 111 of the lens barrel 11. At this point, the blocking ring 132 of the external cover 13 abuts against a periphery of the first lens 21, so that the first lens 21 is positioned within the mounting slot 121. An object-side surface of the first lens 21 is exposed within the through hole 133 of the inner side of the blocking ring 132, wherein the optical axis of the imaging lens assembly 20 overlaps with the central axis L of the cylindrical portion 12, so that light could pass through the imaging lens assembly 20 installed in the cylindrical portion 12 and project onto the image plane. The imaging lens assembly 20 further includes an image sensor, wherein the image sensor is disposed on the image plane.

Figure 5:
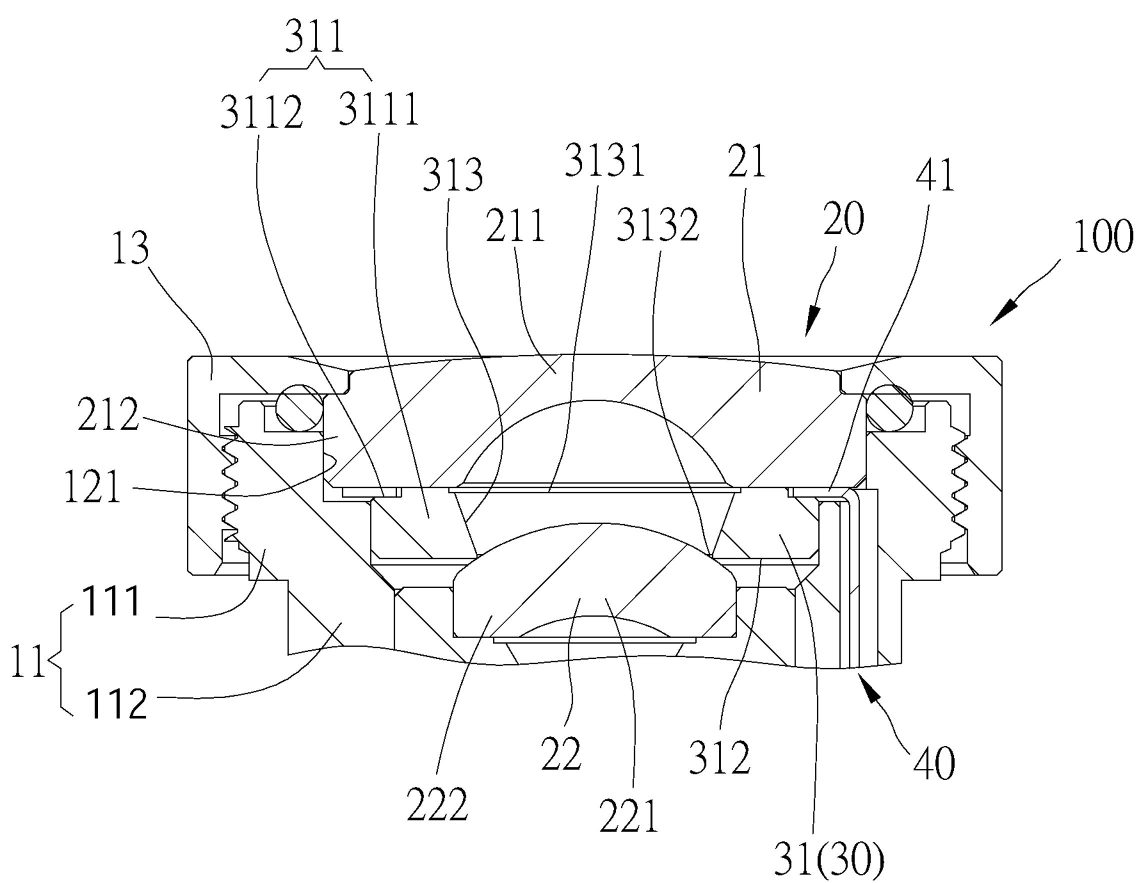
FIG. 5 is a partially enlarged view of FIG. 4.

Referring to FIG. 4 and FIG. 5, optical structures of the first lens 21 and the second lens 22 are explained below. The first lens 21 has a first optical effective area 211 and a first optical ineffective area 212. The first optical ineffective area 212 surrounds an outer periphery of the first optical effective area 211. The first optical effective area 211 represents an area where the optical axis and an imaging light corresponding to the imaging lens assembly 20 pass through. The first optical ineffective area 212 represents an area surrounding the optical axis of the imaging lens assembly 20 and where the imaging light does not pass through. The second lens 22 has a second optical effective area 221 and a second optical ineffective area 222. The second optical effective area 221 faces the first optical effective area 211. The second optical ineffective area 222 surrounds an outer periphery of the second optical effective area 221. The second optical effective area 221 represents an area where the optical axis and the imaging light corresponding to the imaging lens assembly 20 pass through. The second optical ineffective area 222 represents an area surrounding the optical axis of the imaging lens assembly 20 and where the imaging light does not pass through.

The thermoconductive module 30 is disposed in the cylindrical portion 12 of the positioning assembly 10. The thermoconductive module 30 is disposed between the first lens 21 and the second lens 22 and is in contact with the first lens 21 and the second lens 22. In the first embodiment, the thermoconductive module 30 is a washer 31 made of heat-conductive material; the washer 31 is primarily made of metal material, such as aluminum, gold, copper, etc.; a thermal conductivity of the washer 31 is in a range from 200 W/m·K to 400 W/m·K, and a linear thermal expansion coefficient of the wash 31 is in a range from $15\times10^{-6}$/K to $30\times10^{-6}$/K, so that the aforementioned material characteristics of the washer 31 could provide high performance in heat conduction.

Referring to FIG. 4 and FIG. 5, the washer 31 has an upper peripheral surface 311 and a lower peripheral surface 31. The upper peripheral surface 311 faces the first lens 21. The lower peripheral surface 312 faces the second lens 22. The washer 31 has an inner annular hole 313 penetrating through the upper peripheral surface 311 and the lower peripheral surface 312. Two sides of the inner annular hole 313 forms an upper rim 3131 on an inner side of the upper peripheral surface 311 and a lower rim 3132 on an inner side of the lower peripheral surface 312, respectively. The washer 31 is disposed on the second lens 22. An object-side surface of the second lens 22 abuts against the lower rim 3132 and is in a curved shape to extends into the inner annular hole 313. An image-side surface of the first lens 21 abuts against the upper peripheral surface 311. Referring to FIG. 5, in the first embodiment, the washer 31 is disposed between the first optical ineffective area 212 and the second optical ineffective area 222, wherein the inner annular hole 313 of the washer 31 correspondingly communicates between the first optical effective area 211 and the second optical effective area 221.

In addition, the upper peripheral surface 311 of the washer 31 has an annular convex portion 3111 and an abutting stepped portion 3112. The annular convex portion 3111 surrounds the upper rim 3131, the first lens 21 abuts on the annular convex portion 3111, and the abutting stepped portion 3112 is recessed into an outer periphery of the annular convex portion 3111, so that a gap is formed between the abutting stepped portion 3112 and the first lens 21.

The heating module 40 is connected to the thermoconductive module 30 and is adapted to provide a heat source to the first lens 21 and the second lens 22. Referring to FIG. 4 and FIG. 5, the heating module 40 is disposed in the mounting slot 121 of the inner side of the connecting head section 111 of the lens barrel 11. The heating module 40 includes an electric heating ring 41 and a power connection portion 42. The electric heating ring 41 surrounds the inner annular hole 313 and is in contact with the washer 31, wherein the electric heating ring 41 is disposed on the upper peripheral surface 311 of the washer 31, and the electric heating ring 41 fits around the abutting stepped portion 3112 by surrounding the annular convex portion 3111. When the first lens 21 abuts on the annular convex portion 3111 of the washer 31, the electric heating ring 41 is correspondingly accommodated within the gap between the abutting stepped portion 3112 and the first lens 21, so that the electric heating ring 41 is located between the washer 31 and the first lens 21. The power connection portion 42 is connected to the electric heating ring 41 and is guided by the side opening 123 of the cylindrical portion 12 to an external to be connected to an external power source, thereby supplying electrical power required to the electric heating ring 41 to generate the heat source.

The design of the thermoconductive module 30 and the heating module 40 in the first embodiment involves the direct contact of the washer 31 of the thermoconductive module 30 with the first lens 21 and the second lens 22. In practice, upon activating the heating module 40 to perform heating, the thermoconductive module 30 directly conducts the heat energy of the heating module 40 to the first lens 21 and the second lens 22, so that both the first lens 21 and the second lens 22 could be effectively heated. Since the electric heating ring 41 of the heating module 40 is located between the washer 31 of the thermoconductive module 30 and the first lens 21, the first lens 21 could be effectively heated by the heating module 40. The object-side surface of the first lens 21 is exposed to the through hole 133 of the external cover 13, so that environmental moisture could be effectively evaporated, thereby reducing the occurrence of fogging on the object-side surface of the first lens 21. Additionally, the heat energy conducted from the thermoconductive module 30 to the second lens 22 relieves the formation of fogging of the second lens 22, thereby enhancing a definition of an image captured by the imaging lens assembly 20. In this way, the temperature-adjustable optical imaging lens 100 could be applied in various working environments and maintain excellent image capture performance without being limited by the change of climate temperature difference.

Figure 6:
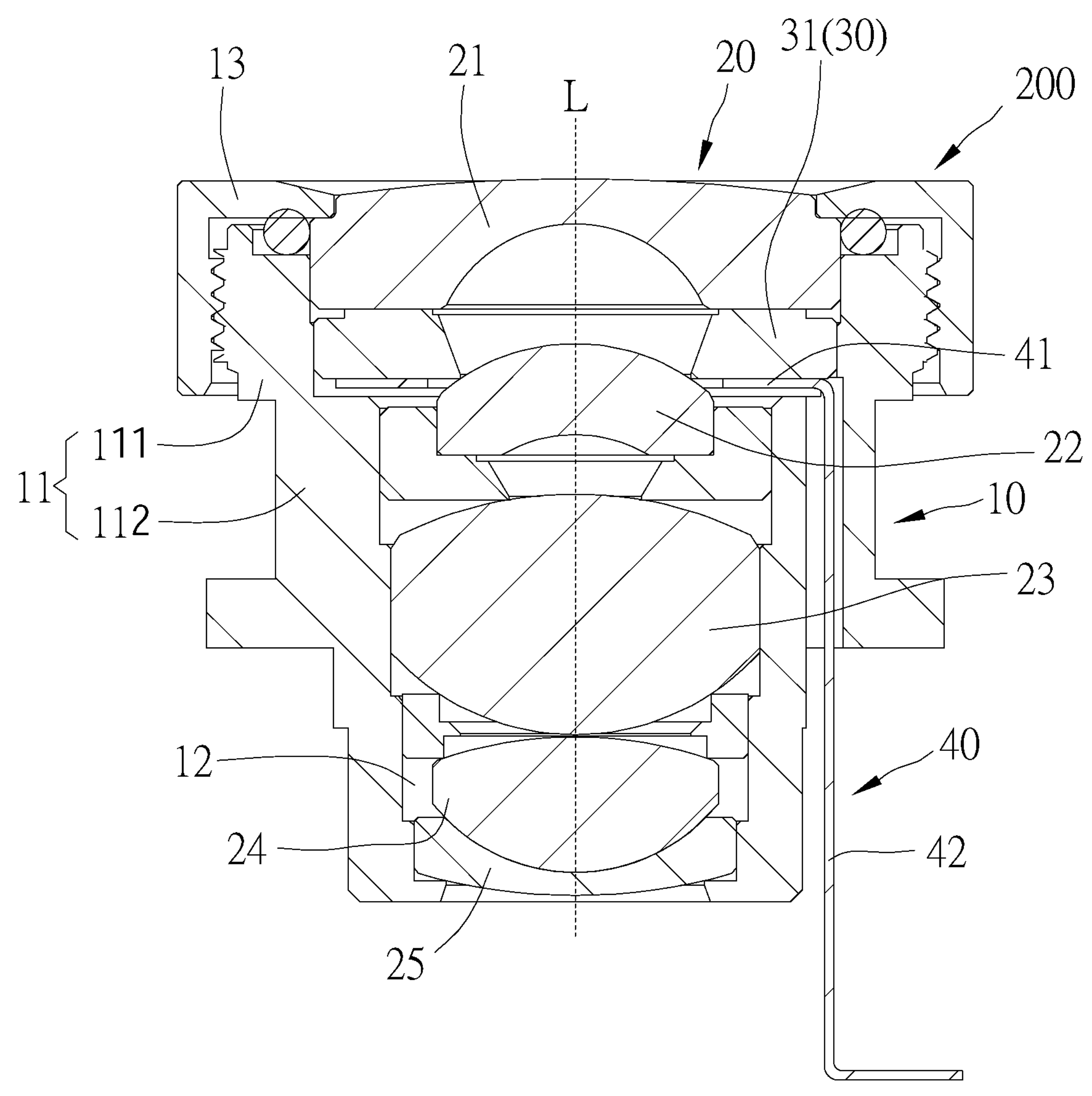
FIG. 6 is a sectional schematic view of the temperature-adjustable optical imaging lens according to a second embodiment of the present invention.
Figure 7:
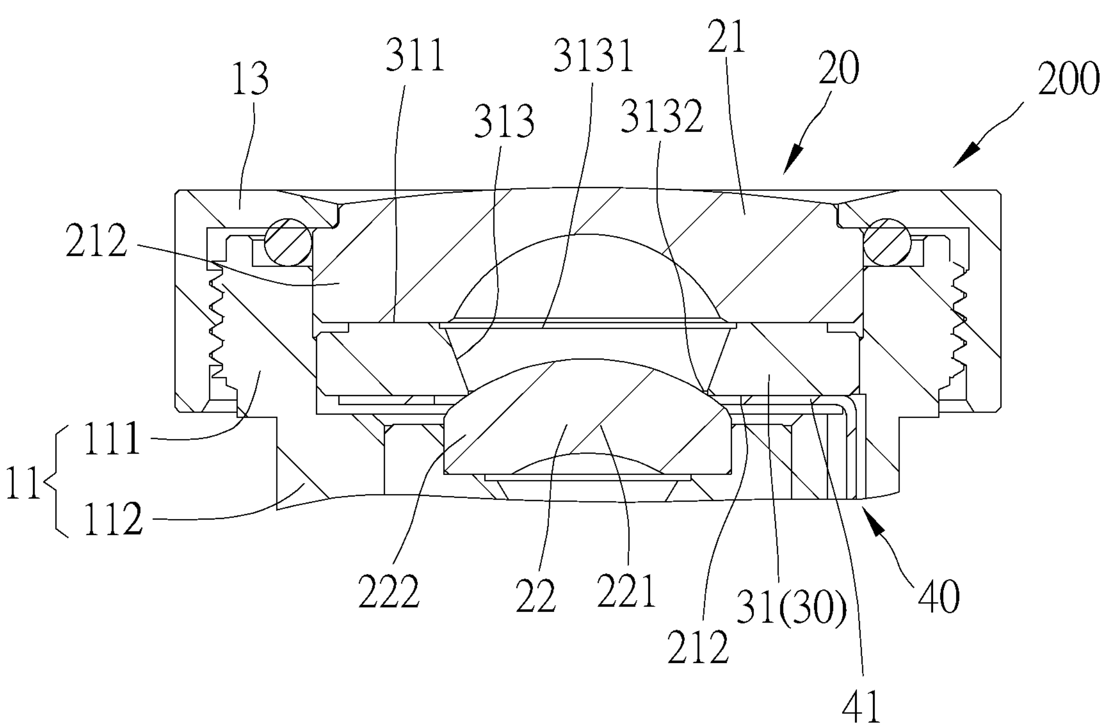
FIG. 7 is a partially enlarged view of FIG. 6.

A temperature-adjustable optical imaging lens 200 according to a second embodiment of the present invention is illustrated in FIG. 6 and FIG. 7 and basically includes a positioning assembly 10, a imaging lens assembly 20, a thermoconductive module 30, and a heating module 40. The structures of the positioning assembly 10, imaging lens assembly 20, thermoconductive module 30, and heating module 40 in the second embodiment are basically the same as the structures described in the first embodiment and are not repeated here.

The difference between the second embodiment and the first embodiment is the position of the heating module 40. Referring to FIG. 7, the electric heating ring 41 of the heating module 40 in the second embodiment is located between the washer 31 of the thermoconductive module 30 and the second lens 22, wherein the electric heating ring 41 of the heating module 40 is fixed to the lower peripheral surface 312 of the washer 31 to correspond to the lower rim 3132 of the washer 31, so that the electric heating ring 41 of the heating module 40 is away from the first lens 21 and is directly in contact with the lower peripheral surface 312 of the washer 31. The electric heating ring 41 surrounds the second optical ineffective area 222 of the second lens 22, and the power connection portion 42 of the heating module 40 is guided by the side opening 123 of the cylindrical portion 12 to the external. In this way, when the heating module 40 is activated to perform heating, the electric heating ring 41 of the heating module 40 could effectively heat the second lens 22 and correspondingly increase a temperature of the cylindrical portion 12, thereby preventing the environmental moisture entered into the lens barrel 11 from condensing. Additionally, due to the thermal energy conducted by the thermoconductive module 30, defogging of the first lens 21 could be achieved.

Figure 8:
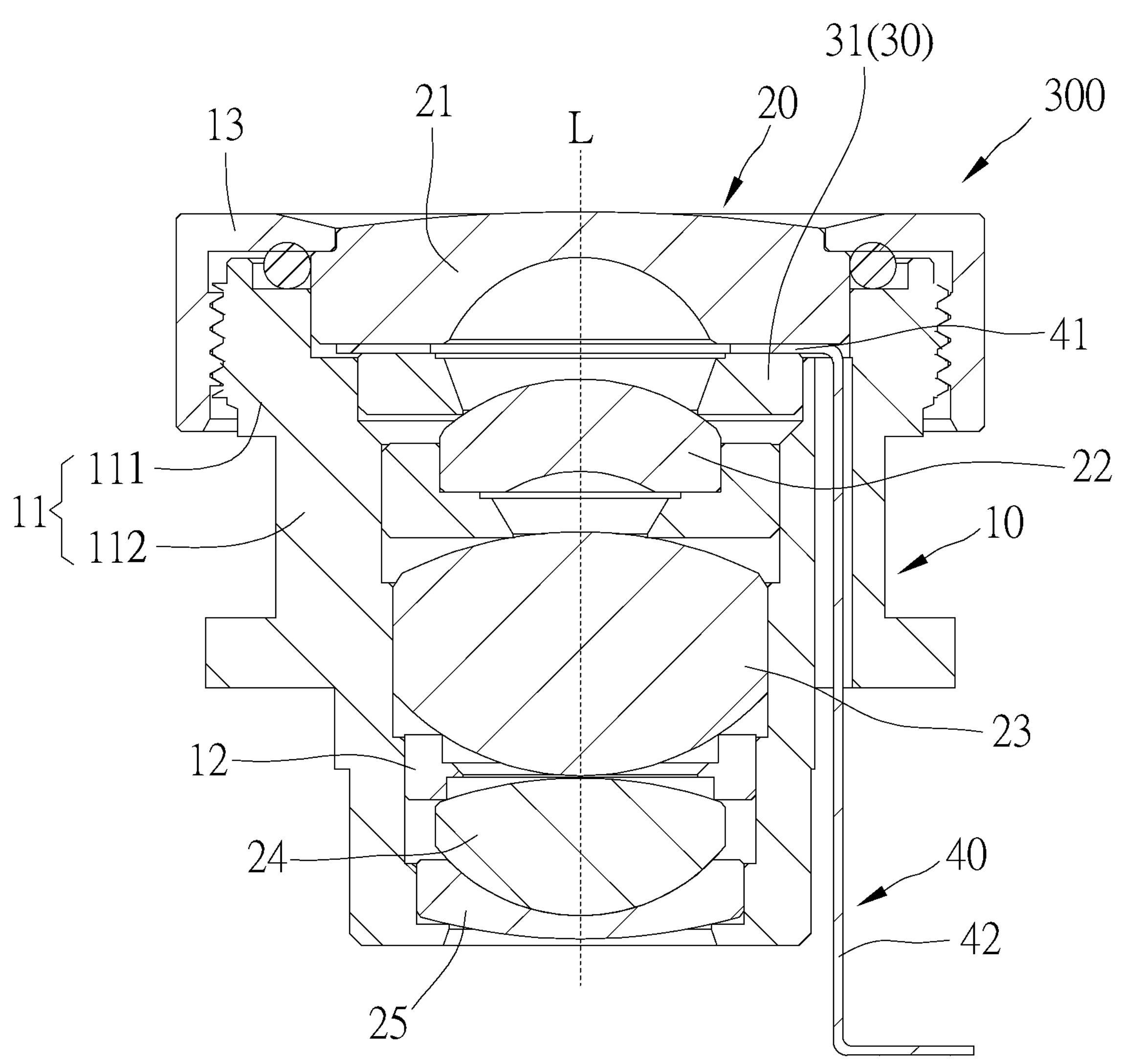
FIG. 8 is the sectional schematic view of the temperature-adjustable optical imaging lens according to a third embodiment of the present invention.
Figure 9:
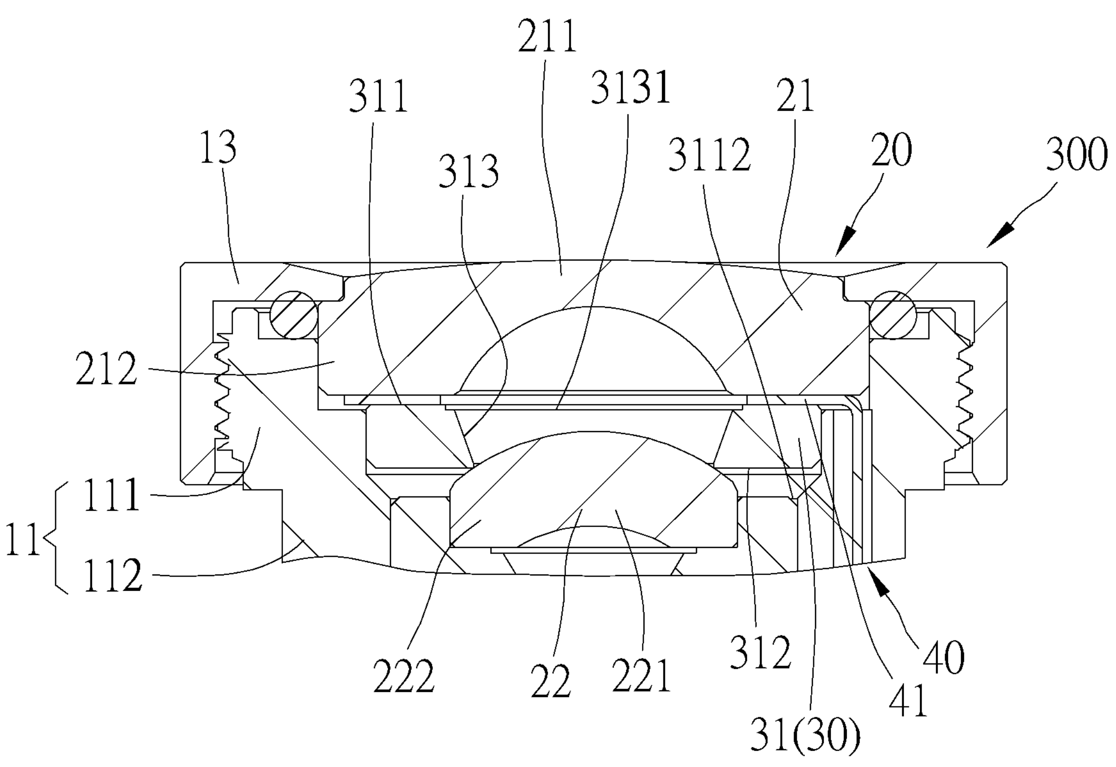
FIG. 9 is the partially enlarged view of FIG. 8.

A temperature-adjustable optical imaging lens 300 according to a third embodiment of the present invention is illustrated in FIG. 8 and FIG. 9 and includes a positioning assembly 10, an imaging lens assembly 20, a thermoconductive module 30, and a heating module 40. In the third embodiment, the structures of the positioning assembly 10, imaging lens assembly 20, thermoconductive module 30, and heating module 40 are basically the same as the structures described in the first embodiment and are not repeated here.

The difference between the third embodiment and the first embodiment is the position of the heating module 40. Referring to FIG. 9, the electric heating ring 41 of the heating module 40 in the third embodiment is located between the washer 31 of the thermoconductive module 30 and the first lens 21, wherein the electric heating ring 41 of the heating module 40 surrounds the inner annular hole 313 to correspond to the upper rim 3131 of the washer 31. The electric heating ring 41 is abutted by the first lens 21 to be positioned on the upper peripheral surface 311 of the washer 31, so that the electric heating ring 41 is in contact with the first optical ineffective area 212 of the first lens 21. In this way, the heating module 40 could directly heat the first lens 21, so that a temperature of the first lens 21 could be effectively raised, thereby enhancing the defogging effect of the first lens 21.

In addition to the aforementioned structural embodiments, the following describes optical embodiments for the imaging lens assembly 20. The imaging lens assembly 20 of the present invention can work in five wavelengths, including 470 nm, 510 nm, 555 nm, 610 nm, and 650 nm, wherein 555 nm is the main reference wavelength for obtaining the technical characters.

The imaging lens assembly 20 satisfies: $1.2 \leq f/HEP \leq 3.0$, $1.5 \leq HOS/f \leq 10$, 50 deg$<HAF \leq 100$ deg, and $0.1 \leq 2\ (ARE/HEP) \leq 2.0$. The imaging lens assembly 20 satisfies: $1.6 \leq f/HEP \leq 2.31$; 60 deg$<HAF \leq 70$ deg; $1.7 \leq HOS/f \leq 8.0$, wherein f is a focal length of the imaging lens assembly 20; HEP is an entrance pupil diameter of the imaging lens assembly 20; HAF is a half of a maximum field angle of the imaging lens assembly 20; HOS is a distance between the object-side surface of the first lens 21 and the image plane on the optical axis; for any surface of any lens, ARE is a profile curve length measured from a start point where the optical axis passes therethrough, along a surface profile thereof, and finally to a coordinate point of a perpendicular distance where is a half of the entrance pupil diameter away from the optical axis. In this way, size reduction of the imaging lens assembly 20 could be maintained, thereby being suitable for integration into portable electronic devices that are light in weight.

In addition, the imaging lens assembly 20 further satisfies: 0.9≤2 (ARE/HEP)≤2.0, wherein for any surface of any lens, ARE is a profile curve length measured from a start point where the optical axis passes therethrough, along a surface profile thereof, and finally to a coordinate point of a perpendicular distance where is a half of the entrance pupil diameter away from the optical axis. The imaging lens assembly 20 further satisfies: 0.9≤ARS/EHD≤2.0, wherein for any surface of any lens, EHD is a maximum effective half diameter thereof, and ARS is a profile curve length measured from a start point where the optical axis passes therethrough, along a surface profile thereof, and finally to an end point of the maximum effective half diameter thereof.

The imaging lens assembly 20 further satisfies: PLTA≤100 μm; PSTA≤100 μm; NLTA≤100 μm; NSTA≤100 μm; SLTA≤100 μm; and SSTA≤100 μm; |TDT|<100%, wherein TDT is a TV distortion for image formation of the imaging lens assembly 20; HOI is a maximum height for image formation on the image plane perpendicular to the optical axis; PLTA is a transverse aberration at 0.7 HOI on the image plane in a positive direction of a tangential fan of the imaging lens assembly 20 after a longest operation wavelength of light passing through an edge of an entrance pupil; PSTA is a transverse aberration at 0.7 HOI on the image plane in the positive direction of the tangential fan after a shortest operation wavelength of light passing through the edge of the entrance pupil; NLTA is a transverse aberration at 0.7 HOI on the image plane in a negative direction of the tangential fan after the longest operation wavelength of light passing through the edge of the entrance pupil; NSTA is a transverse aberration at 0.7 HOI on the image plane in the negative direction of the tangential fan after the shortest operation wavelength of light passing through the edge of the entrance pupil; SLTA is a transverse aberration at 0.7 HOI on the image plane of a sagittal fan of the imaging lens assembly after the longest operation wavelength of light passing through the edge of the entrance pupil; SSTA is a transverse aberration at 0.7 HOI on the image plane of the sagittal fan after the shortest operation wavelength of light passing through the edge of the entrance pupil.

In addition, the imaging lens assembly 20 of the present invention could be provided with at least one aperture according to needs, which reduces stray light and helps enhancing image quality.

In the imaging lens assembly 20 of the present invention, the aperture could be either a front aperture or a middle aperture, wherein the front aperture is provided between an object and the first lens 21, and the middle aperture is provided between the first lens 21 and the image plane. When the aperture is the front aperture, the front aperture provides a long distance between an exit pupil of the imaging lens assembly 20 and the image plane, so that more optical elements could be accommodated and increasing the efficiency of the image sensor to receive an image. When the aperture is the middle aperture, the middle aperture could enlarge a field angle of a system, so that the imaging lens assembly 20 is provided with the advantages of a wide-angle lens. The imaging lens assembly 20 further satisfies: 0.2≤InS/HOS≤1.1, wherein InS is a distance between the aperture and the image plane. In this way, the imaging lens assembly 20 could be miniaturized while possessing the characteristics of the wide-angle lens.

The imaging lens assembly 20 further satisfies: 0.9≤IN12/f≤1.1, wherein IN12 is a distance between the first lens 21 and the second lens 22 on the optical axis. In this way, the chromatic aberration of the lenses could be corrected, thereby enhancing the performance.

The imaging lens assembly 20 further satisfies: 0.6≤TP1/TP2≤0.9; 0.4≤TP2/TP3≤0.6, wherein TP1 is a central thickness of the first lens 21 on the optical axis; TP2 is a central thickness of the second lens 22 on the optical axis. In this way, the sensitivity of manufacture of the imaging lens assembly 20 could be controlled and the performance of the imaging lens assembly 20 could be improved.

In other embodiments, the imaging lens assembly could include six lenses having refractive power, i.e., the imaging lens assembly further includes a sixth lens. The sixth lens is located between the fifth lens and the image plane. The imaging lens assembly further satisfies: 0.1≤InTL/HOS≤0.95, wherein HOS is a distance between the object-side surface of the first lens and the image plane on the optical axis; InTL is a distance from the object-side surface of the first lens and an image-side surface of the sixth lens on the optical axis. Alternatively, the imaging lens assembly could include seven lenses having refractive power, i.e., the imaging lens assembly further includes a seventh lens. The seventh lens is located between the sixth lens and the image plane. The imaging lens assembly further satisfies: 0.1≤InTL/HOS≤0.95, wherein HOS is a distance between the object-side surface of the first lens and the image plane on the optical axis; InTL is a distance from the object-side surface of the first lens and an image-side surface of the seventh lens on the optical axis. In this way, the aberration of the incident rays could be fine-tuned and corrected layer by layer and the overall height of the imaging lens assembly 20 could be reduced.

In the imaging lens assembly 20 of the present invention, the lenses could be made of either plastic or glass. When the lenses are made of plastic, the production cost and the weight could be effectively reduced. When the lenses are made of glass, the thermal effect could be controlled and a space for arrangement of lens with refractive power of the imaging lens assembly 20 could be enlarged. Moreover, both the object-side surface and the image-side surface of the lenses of the imaging lens assembly 20 could be aspheric, so that more control variables could be obtained to reduce aberration. The number of lenses could be less than the conventional spherical glass lenses, thereby effectively lowering the overall height of the imaging lens assembly 20 of the present invention.

An equation of the aforementioned aspheric surfaces is:

$$z = ch^2/\left[1 + \left[1(k+1)c^2h^2\right]^{0.5}\right] + A4h^4 + A6h^6 + A8h^8 + A10h^{10} + A12h^{12} + A14h^{14} + A16h^{16} + A18h^{18} + A20h^{20} + \ldots \quad (1)$$

where z is a position value along the optical axis at a height h with a surface vertex as a reference point; k is conic constant; c is reciprocal of the radius of curvature, and A4, A6, A8, A10, A12, A14, A16, A18, and A20 are high-order aspheric coefficients.

Furthermore, in the imaging lens assembly 20 of the present invention, when the lens has a convex surface, the surface is convex around a position where the optical axis passes. When the lens has a concave surface, the surface is concave around a position where the optical axis passes.

The imaging lens assembly 20 of the present invention could be applied to a dynamic focusing optical system and have excellent performances of the correction of aberration and imaging quality, so that the imaging lens assembly 20 could be applied in lots of fields.

Several embodiments are provided below in conjunction with the accompanying drawings for the best understanding.

Fourth Embodiment

Figure 10A:
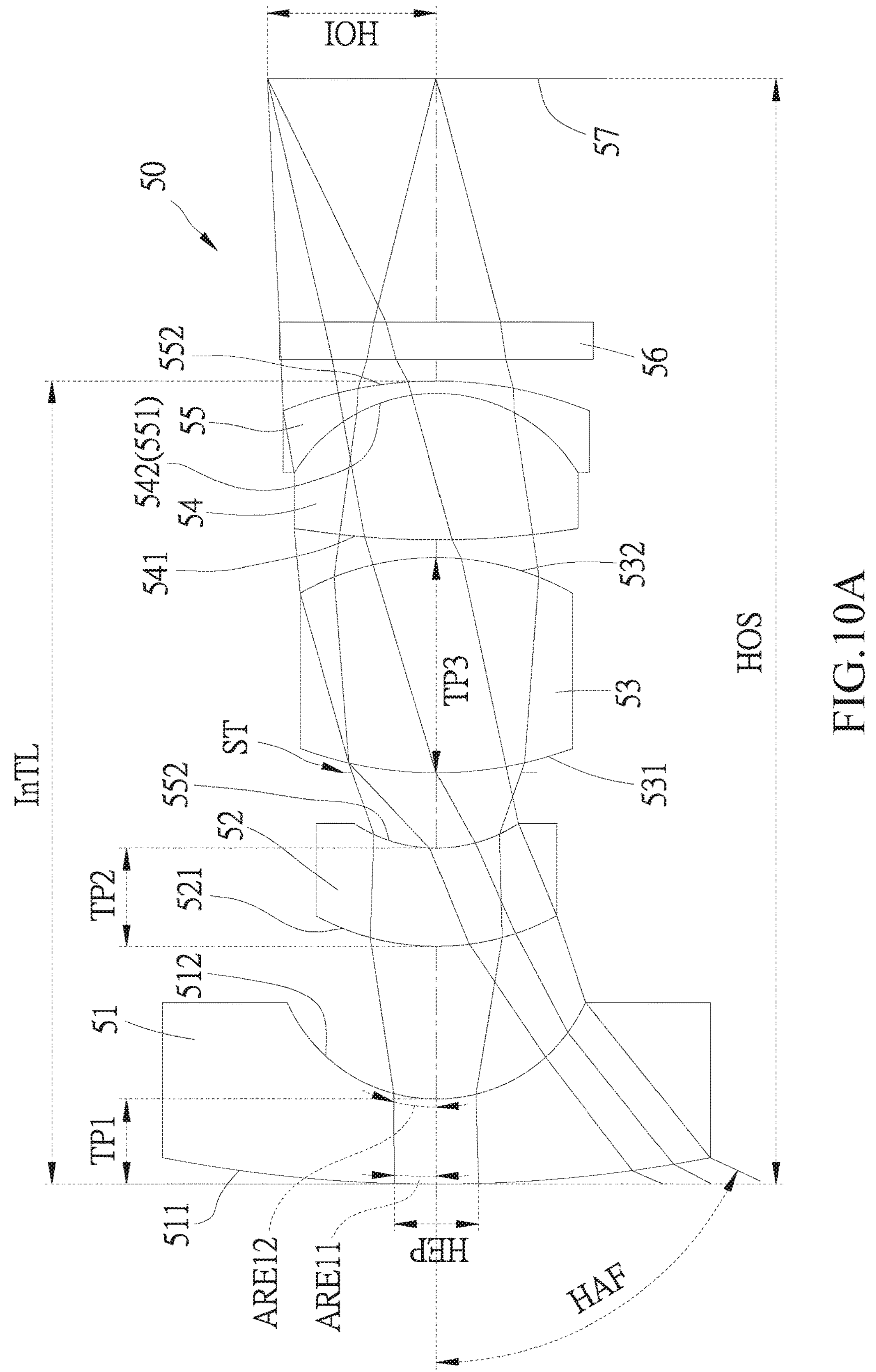
FIG. 10A is a schematic diagram of the lens arrangement of the imaging lens assembly according to a fourth embodiment of the present invention.
Figure 10B:
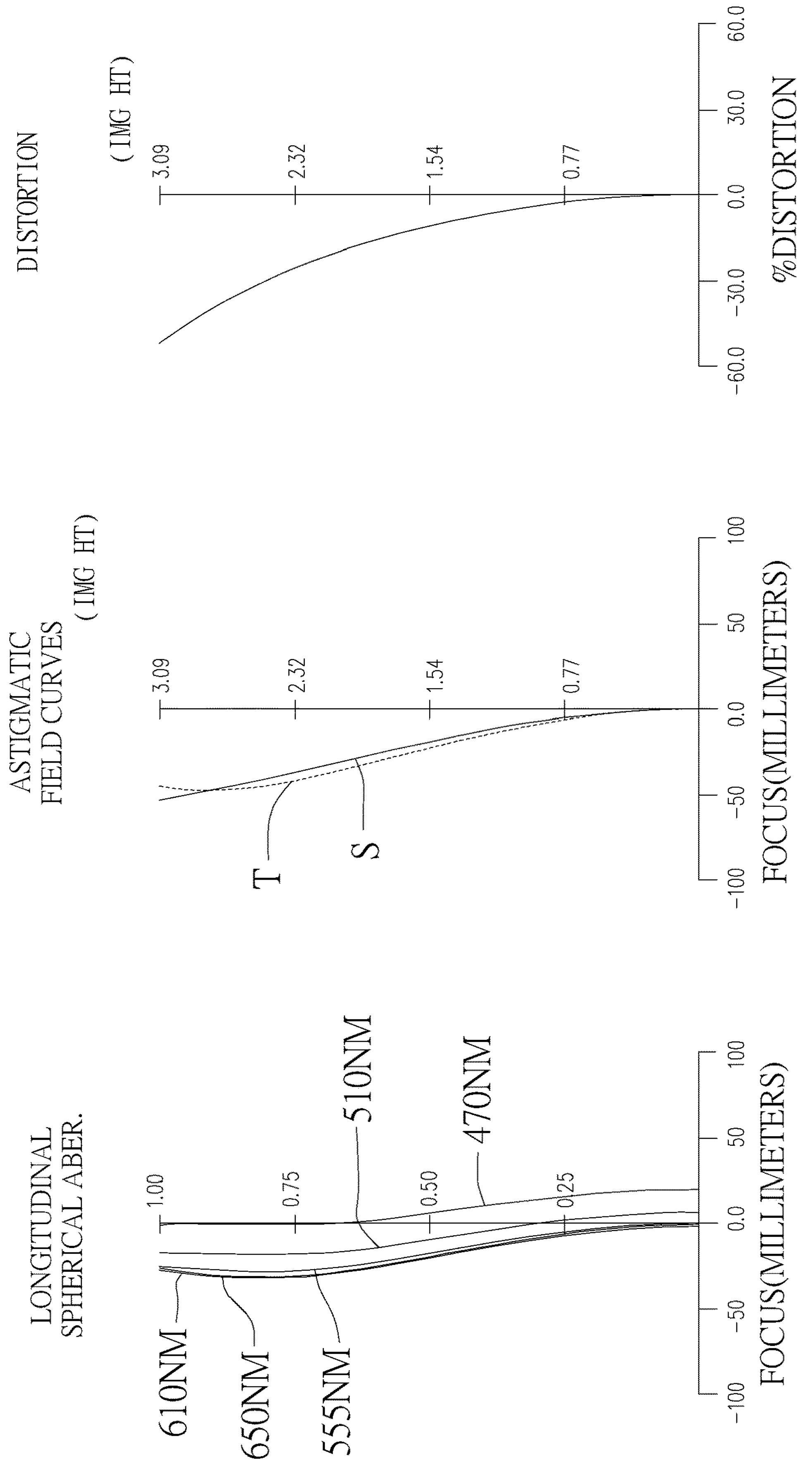
FIG. 10B is a curve diagram of spherical aberration, astigmatic field, and optical distortion of the imaging lens assembly in the order from left to right according to the fourth embodiment of the present invention.

Referring to FIG. 10A and FIG. 10B, FIG. 10A is a schematic diagram of a structure of an imaging lens assembly 50 according to a fourth embodiment of the present invention, and FIG. 10B is a curve diagram of a spherical aberration, an astigmatic field, and an optical distortion of the imaging lens assembly 50 in the order from left to right according to the fourth embodiment.

Figure 10C:
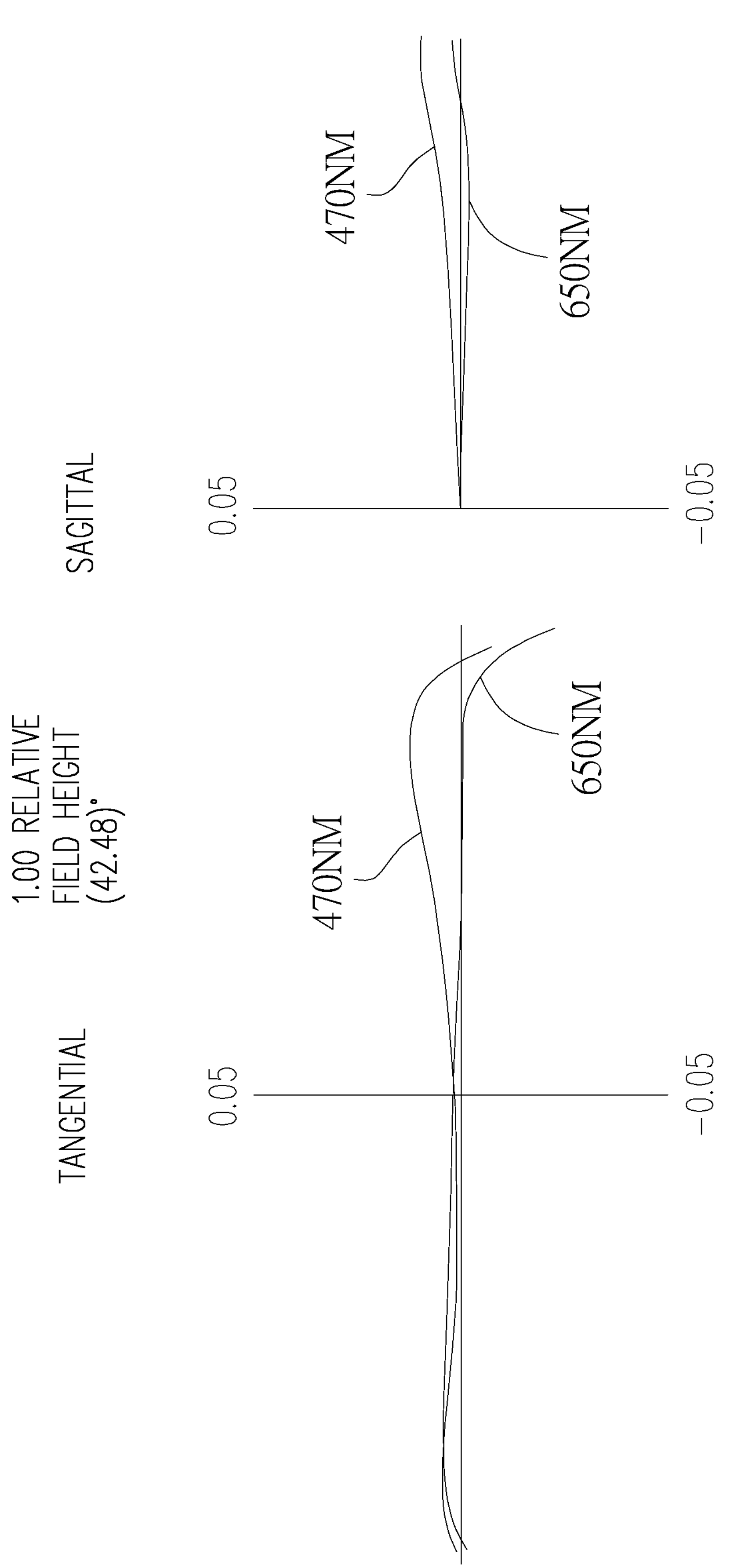
FIG. 10C shows a tangential fan and a sagittal fan of the imaging lens assembly according to the fourth embodiment of the present invention, and a transverse aberration diagram at 0.7 field of view when a longest operation wavelength and a shortest operation wavelength pass through an edge of an aperture.

FIG. 10C is a transverse aberration diagram of the imaging lens assembly 50 at 0.7 field of view according to the fourth embodiment. Referring to FIG. 10A, the imaging lens assembly 50 includes, along an optical axis from an object side to an image side, a first lens 51, a second lens 52, an aperture ST, a third lens 53, a fourth lens 54, a fifth lens 55, an infrared filter 56, and an image plane 57, wherein structures of the first lens 51, the second lens 52, the third lens 53, the fourth lens 54, and the fifth lens 55 of the imaging lens assembly 50 of the fourth embodiment are similar to the lenses of the imaging lens assembly 20 of the aforementioned first embodiment to the third embodiment.

The first lens 51 has negative refractive power and is made of glass. The first lens 51 is a convex-concave lens, wherein an object-side surface 511, which faces the object side, of the first lens 51 is convex, and an image-side surface 512, which faces the image side, of the first lens 51 is concave. The object-side surface 511 and the image-side surface 512 of the first lens 51 are both spherical.

The second lens 52 has negative refractive power and is made of glass. the second lens 52 is a convex-concave lens, wherein an object-side surface 521, which faces the object side, of the second lens 52 is convex, and an image-side surface 522, which faces the image side, of the second lens 52 is concave. The object-side surface 521 and the image-side surface 522 of the second lens 52 are both spherical.

The third lens 53 has positive refractive power and is made of glass. The third lens 53 is a double convex lens, wherein an object-side surface 531, which faces the object side, and an image-side surface 532, which faces the image side, of the third lens 53 are both convex. The object-side surface 531 and the image-side surface 532 of the third lens 53 are both spherical.

The fourth lens 54 has positive refractive power and is made of glass. The fourth lens 54 is a double convex lens, wherein an object-side surface 541, which faces the object side, and an image-side surface 542, which faces the image side, of the fourth lens 54 are both convex. The object-side surface 541 and the image-side surface 542 of the fourth lens 54 are both spherical.

The fifth lens 55 has negative refractive power and is made of glass. The fifth lens 55 is a concave-convex lens, wherein an object-side surface 551, which faces the object side, of the fifth lens 55 is concave, and an image-side surface 552, which faces the image side, of the fifth lens 55 is convex. The object-side surface 551 and the image-side surface 552 of the fifth lens 55 are both spherical. The object-side surface 551 of the fifth lens 55 and the image-side surface 542 of the fourth lens 54 are adhered to form a compound lens.

The infrared filter 56 is made of glass, is disposed between the fifth lens 55 and the image plane 57, and does not affect the focal length of the imaging lens assembly 50.

The parameters of the lenses of the fourth embodiment are listed in Table 1 and Table 2.

TABLE 1 f = 2.808 mm; f/HEP = 1.6; HAF = 100 deg

| Surface | | Radius of curvature (mm) | Thickness (mm) | Material | Refractive index | Abbe number | Focal length (mm) |
|---|---|---|---|---|---|---|---|
| 0 | Object | 1E+18 | 1E+18 | | | | |
| 1 | $1^{st}$ lens | 26.26095171 | 1.574 | glass | 1.6935 | 53.38 | −4.977 |
| 2 | | 2.970254901 | 2.836 | | | | |
| 3 | $2^{nd}$ lens | 4.646302407 | 1.822 | glass | 1.84666 | 23.78 | −15.458 |
| 4 | | 2.810691193 | 1.374 | | | | |
| 5 | Aperture | 1E+18 | 0.000 | | | | |
| 6 | $3^{rd}$ lens | 7.257835011 | 4.000 | glass | 1.744 | 44.90 | 4.611 |
| 7 | | −4.955417939 | 0.293 | | | | |
| 8 | $4^{th}$ lens | 14.2831181 | 2.769 | glass | 1.618 | 63.39 | 4.303 |
| 9 | | −3.019049183 | 0.000 | | | | |
| 10 | $5^{th}$ lens | −3.019049183 | 0.180 | glass | 1.92286 | 20.88 | −5.632 |
| 11 | | −7.460738038 | 0.411 | | | | |
| 12 | Infrared filter | 1E+18 | 0.700 | SBSL7_OHARA | 1.5174 | 64.20 | |
| 13 | | 1E+18 | 4.507 | | | | |
| 14 | Image plane | 1E+18 | 0.000 | | | | |

Reference wavelength (d-line): 555 nm; no

TABLE 2

| Aspheric coefficients of the fourth embodiment | | | | | |
|---|---|---|---|---|---|
| Surface | 1 | 2 | 3 | 4 | 6 |
| k | 0.000000E+00 | 0.000000E+00 | 0.000000E+00 | 0.000000E+00 | 0.000000E+00 |
| A4 | 0.000000E+00 | 0.000000E+00 | 0.000000E+00 | 0.000000E+00 | 0.000000E+00 |
| A6 | 0.000000E+00 | 0.000000E+00 | 0.000000E+00 | 0.000000E+00 | 0.000000E+00 |
| A8 | 0.000000E+00 | 0.000000E+00 | 0.000000E+00 | 0.000000E+00 | 0.000000E+00 |
| A10 | 0.000000E+00 | 0.000000E+00 | 0.000000E+00 | 0.000000E+00 | 0.000000E+00 |
| Surface | 8 | 9 | 10 | 11 | 12 |
| k | 0.000000E+00 | 0.000000E+00 | 0.000000E+00 | 0.000000E+00 | 0.000000E+00 |
| A4 | 0.000000E+00 | 0.000000E+00 | 0.000000E+00 | 0.000000E+00 | 0.000000E+00 |
| A6 | 0.000000E+00 | 0.000000E+00 | 0.000000E+00 | 0.000000E+00 | 0.000000E+00 |
| A8 | 0.000000E+00 | 0.000000E+00 | 0.000000E+00 | 0.000000E+00 | 0.000000E+00 |
| A10 | 0.000000E+00 | 0.000000E+00 | 0.000000E+00 | 0.000000E+00 | 0.000000E+00 |

The detailed parameters of the fourth embodiment shown in FIG. 10A are listed in Table 1, wherein units for radius of curvature, thickness, distance, and focal length are in millimeters (mm). Surfaces 0-14 represent the surfaces of all elements in the imaging lens assembly 50 in sequence from the object side to the image side. Table 2 contains the list of the aspheric coefficients of the fourth embodiment, wherein k represents the conic constant in the equation of aspheric surface, and A1-A12 represent the aspheric coefficients from the first order to the twelfth order of each aspheric surface.

The values of expressions obtained based on Table 1 and Table 2 are listed in the following table:

| Fourth embodiment (Reference wavelength: 555 nm) | | | | | |
|---|---|---|---|---|---|
| \| f/f1 \| | \| f/f2 \| | \| f/f3 \| | \| f/f4 \| | \| f/f5 \| | \| f1/f2 \| |
| 0.6168 | 0.1988 | 0.6660 | 0.0822 | 0.0701 | 0.3223 |
| TP1 / TP2 | TP2 / TP3 | TP3 / TP4 | IN12 / f | IN23 / f | \| f2/f3 \| |
| 0.8641 | 0.4555 | 1.4443 | 0.9288 | 0.4499 | 3.3500 |
| (TP1 + IN12)/ TP2 | | (TP2 + IN23)/ TP3 | | (TP3 + IN34)/ TP4 | |
| 2.4205 | | 0.7989 | | 1.5500 | |
| InTL | HOS | HOS / HOI | InS/ HOS | ODT % | TDT % |
| 14.8479 | 20.4660 | 6.6276 | 0.6284 | −51.8003 | 35.6466 |
| PSTA | PLTA | NSTA | NLTA | SSTA | SLTA |
| 0.001 mm | −0.001 mm | −0.029 mm | −0.023 mm | 0.010 mm | 0.002 mm |

The values related to the profile curve lengths obtained based on Table 1 and Table 2 are listed in the following table:

| Fourth embodiment (Reference wavelength: 555 nm) | | | | | | |
|---|---|---|---|---|---|---|
| ARE | 1/2(HEP) | ARE value | ARE − 1/2(HEP) | 2(ARE/HEP) % | TP | ARE/TP (%) |
| 11 | 0.762 | 0.762 | 0.000 | 100.01% | 1.574 | 48.41% |
| 12 | 0.762 | 0.771 | 0.009 | 101.13% | 1.574 | 48.95% |
| 21 | 0.762 | 0.765 | 0.003 | 100.45% | 1.822 | 42.01% |
| 22 | 0.762 | 0.772 | 0.010 | 101.27% | 1.822 | 42.35% |
| 31 | 0.762 | 0.763 | 0.001 | 100.18% | 4.000 | 19.09% |
| 32 | 0.762 | 0.765 | 0.003 | 100.40% | 4.000 | 19.13% |
| 41 | 0.762 | 0.762 | 0.000 | 100.05% | 2.769 | 27.53% |
| 42 | 0.762 | 0.770 | 0.008 | 101.09% | 2.769 | 27.82% |
| 51 | 0.762 | 0.770 | 0.008 | 101.09% | 0.180 | 427.96% |
| 52 | 0.762 | 0.763 | 0.001 | 100.17% | 0.180 | 424.07% |
| ARS | EHD | ARS value | ARS − EHD | (ARS/EHD) % | TP | ARS/TP (%) |
| 11 | 5.137 | 5.169 | 0.032 | 100.63% | 1.574 | 328.36% |
| 12 | 2.720 | 3.435 | 0.715 | 126.29% | 1.574 | 218.21% |
| 21 | 2.215 | 2.308 | 0.093 | 104.20% | 1.822 | 126.66% |
| 22 | 1.520 | 1.606 | 0.086 | 105.66% | 1.822 | 88.15% |
| 31 | 1.727 | 1.743 | 0.016 | 100.93% | 4.000 | 43.57% |
| 32 | 2.547 | 2.674 | 0.127 | 104.99% | 4.000 | 66.85% |
| 41 | 2.610 | 2.624 | 0.014 | 100.53% | 2.769 | 94.74% |
| 42 | 1.720 | 1.830 | 0.110 | 106.38% | 2.769 | 66.08% |
| 51 | 1.719 | 1.829 | 0.109 | 106.37% | 0.180 | 1016.01% |
| 52 | 1.839 | 1.857 | 0.018 | 101.01% | 0.180 | 1031.73% |

Fifth Embodiment

Figure 11A:
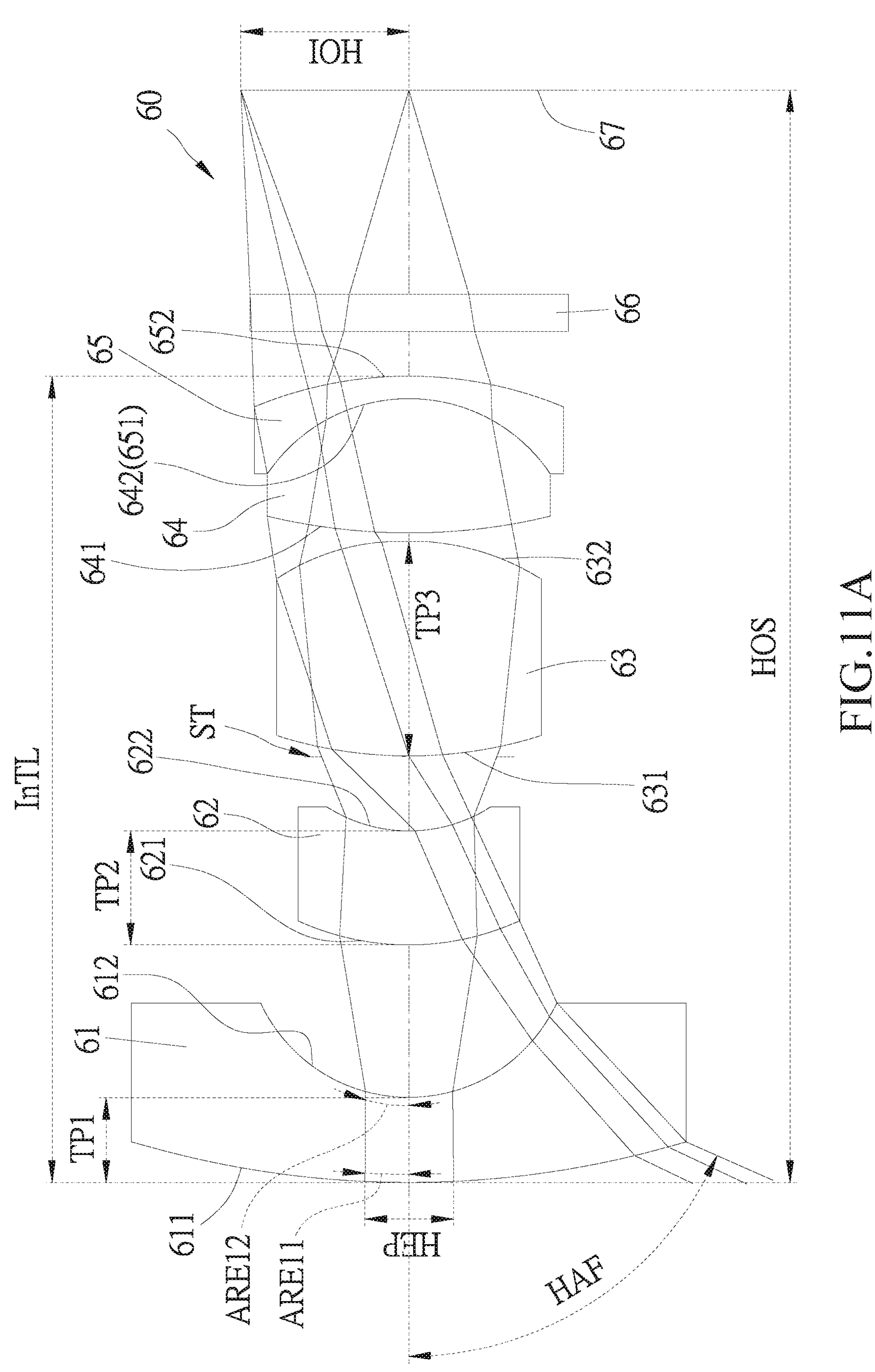
FIG. 11A is a schematic diagram of the lens arrangement of the imaging lens assembly according to a fifth embodiment of the present invention.
Figure 11B:
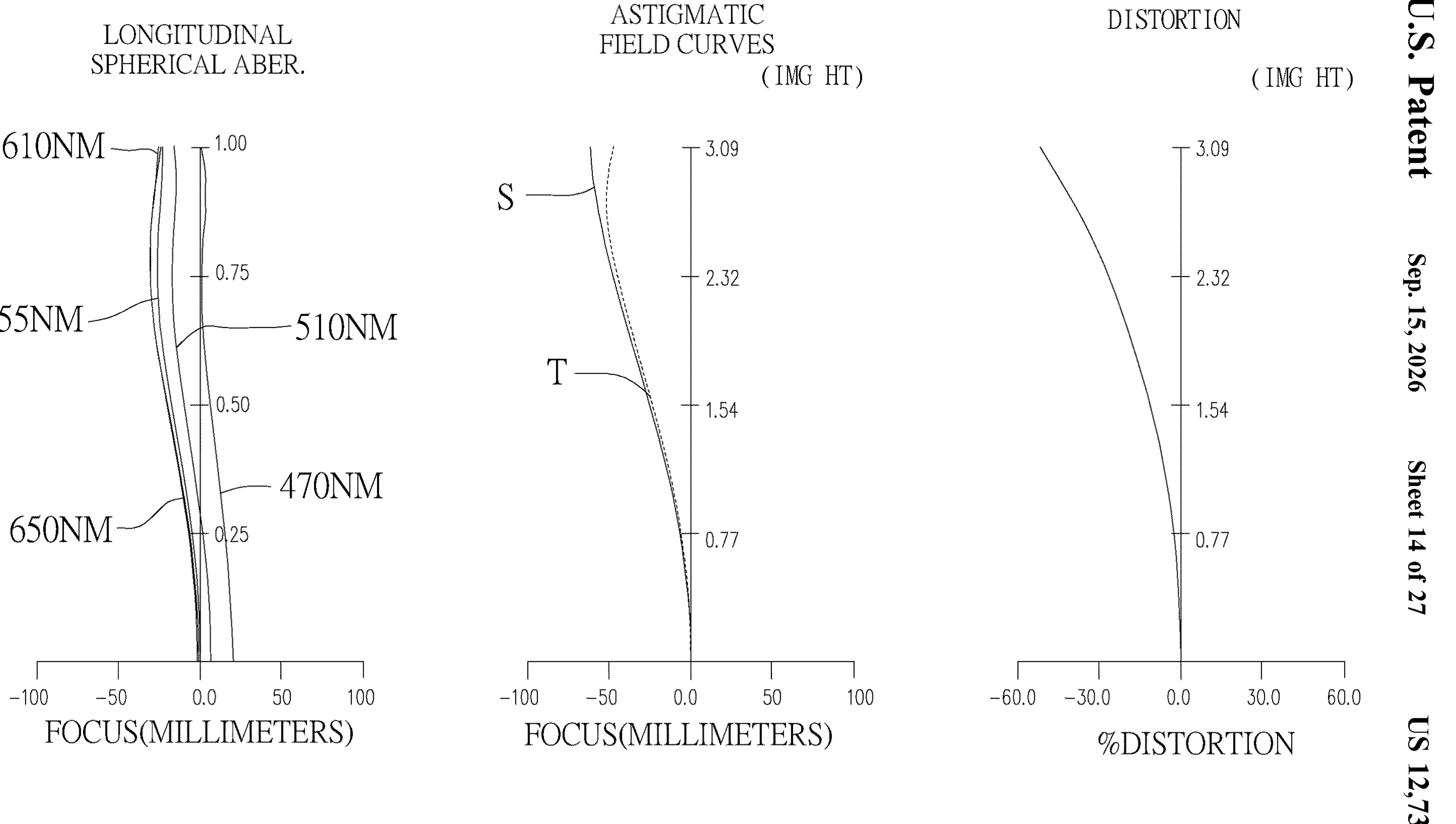
FIG. 11B is a curve diagram of a spherical aberration, an astigmatic field, and an optical distortion of the imaging lens assembly in the order from left to right according to the fifth embodiment of the present invention.
Figure 11C:
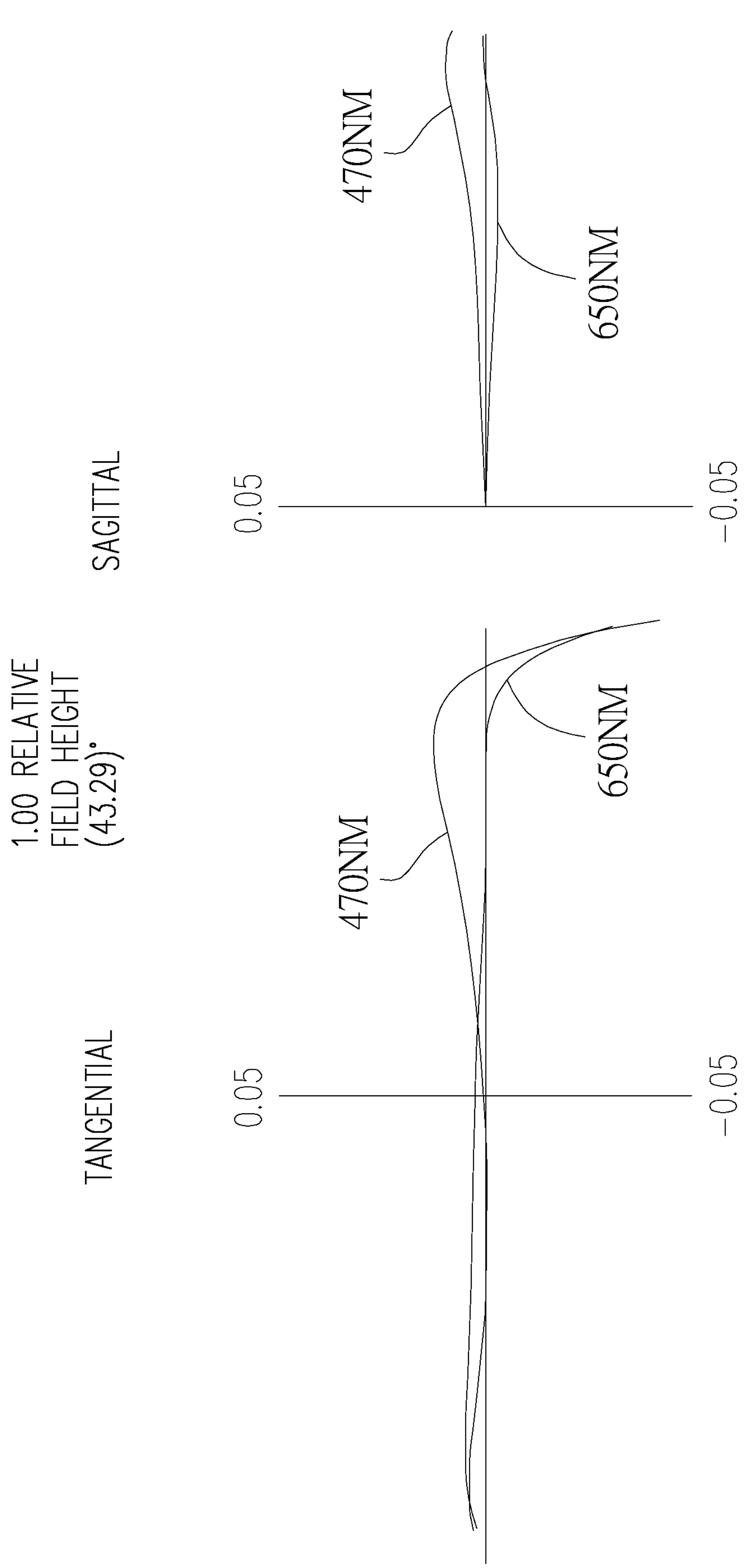
FIG. 11C shows a tangential fan and a sagittal fan of the imaging lens assembly according to the fifth embodiment of the present invention and a transverse aberration diagram at 0.7 field of view when a longest operation wavelength and a shortest operation wavelength pass through an edge of an aperture.

Referring to FIG. 11A and FIG. 11B, FIG. 11A is a schematic diagram of a structure of an imaging lens assembly 60 according to a fifth embodiment of the present invention, and FIG. 11B is a curve diagram of a spherical aberration, an astigmatic field, and an optical distortion of the imaging lens assembly 60 in the order from left to right according to the fifth embodiment of the present invention. FIG. 11C is a transverse aberration diagram of the imaging lens assembly 60 at 0.7 field of view according to the fifth embodiment. Referring to FIG. 11A, the imaging lens assembly 60 includes, along an optical axis from an object side to an image side, a first lens 61, a second lens 62, an aperture ST, a third lens 63, a fourth lens 64, a fifth lens 65, an infrared filter 66, and an image plane 67.

The first lens 61 has negative refractive power and is made of glass. The first lens 61 is a convex-concave lens, wherein an object-side surface 611, which faces the object side, of the first lens 61 is convex, and an image-side surface 612, which faces the image side, of the first lens 61 is concave. The object-side surface 611 and the image-side surface 612 of the first lens 61 are both spherical.

The second lens 62 has negative refractive power and is made of glass. The second lens 62 is a convex-concave lens, wherein an object-side surface 621, which faces the object side, of the second lens 62 is convex, and an image-side surface 622, which faces the image side, of the second lens 62 is concave. The object-side surface 621 and the image-side surface 622 of the second lens 62 are both spherical.

The third lens 63 has positive refractive power and is made of glass. The third lens 63 is a double convex lens, wherein an object-side surface 631, which faces the object side, and an image-side surface 632, which faces the image side, of the third lens 63 are both convex. The object-side surface 631 and the image-side surface 632 of the third lens 63 are both spherical.

The fourth lens 64 has positive refractive power and is made of glass. The fourth lens 64 is a double convex lens, wherein an object-side surface 641, which faces the object side, and an image-side surface 642, which faces the image side, of the fourth lens 64 are both convex. The object-side surface 641 and the image-side surface 642 of the fourth lens 64 are both spherical.

The fifth lens 65 has negative refractive power and is made of glass. The fifth lens 65 is a concave-convex lens, wherein an object-side surface 651, which faces the object side, of the fifth lens 65 is concave, and an image-side surface 652, which faces the image side, of the fifth lens 65 is convex. The object-side surface 651 and the image-side surface 652 of the fifth lens 65 are both spherical. The object-side surface 651 of the fifth lens 65 and the image-side surface 642 of the fourth lens 64 are adhered to form a compound lens.

The infrared filter 66 is made of glass, is disposed between the fifth lens 65 and the image plane 67, and does not affect the focal length of the imaging lens assembly 60.

The parameters of the lenses of the fifth embodiment are listed in Table 3 and Table 4.

TABLE 3 f = 2.9872 mm; f/HEP = 1.8; HAF = 65.0354 deg

| Surface | | Radius of curvature (mm) | Thickness (mm) | Material | Refractive index | Abbe number | Focal length (mm) |
|---|---|---|---|---|---|---|---|
| 0 | Object | 1E+18 | 1E+18 | | | | |
| 1 | $1^{st}$ lens | 17.43212008 | 1.574 | glass | 1.6935 | 53.38 | −5.414 |
| 2 | | 2.970254901 | 2.836 | | | | |
| 3 | $2^{nd}$ lens | 4.806189588 | 2.124 | glass | 1.84666 | 23.78 | −15.648 |
| 4 | | 2.810691193 | 1.374 | | | | |
| 5 | Aperture | 1E+18 | 0.000 | | | | |
| 6 | $3^{rd}$ lens | 7.615577695 | 4.000 | glass | 1.744 | 44.90 | 4.593 |
| 7 | | −4.790012107 | 0.173 | | | | |
| 8 | $4^{th}$ lens | 11.36367403 | 2.482 | glass | 1.618 | 63.39 | 4.249 |
| 9 | | −3.123770073 | 0.000 | | | | |
| 10 | $5^{th}$ lens | −3.123770073 | 0.400 | glass | 1.92286 | 20.88 | −5.809 |
| 11 | | −8.000443249 | 0.827 | | | | |
| 12 | Infrared filter | 1E+18 | 0.700 | SBSL7_OHARA | 1.5174 | 64.20 | |
| 13 | | 1E+18 | 3.790 | | | | |
| 14 | Image plane | 1E+18 | 0.000 | | | | |

Reference wavelength (d-line): 555 nm; no

TABLE 4

Aspheric coefficients of the fifth embodiment

| Surface | 1 | 2 | 3 | 4 | 6 | 7 | 8 |
|---|---|---|---|---|---|---|---|
| k | 0.000000E+00 | 0.000000E+00 | 0.000000E+00 | 0.000000E+00 | 0.000000E+00 | 0.000000E+00 | 0.000000E+00 |
| A4 | 0.000000E+00 | 0.000000E+00 | 0.000000E+00 | 0.000000E+00 | 0.000000E+00 | 0.000000E+00 | 0.000000E+00 |
| A6 | 0.000000E+00 | 0.000000E+00 | 0.000000E+00 | 0.000000E+00 | 0.000000E+00 | 0.000000E+00 | 0.000000E+00 |
| A8 | 0.000000E+00 | 0.000000E+00 | 0.000000E+00 | 0.000000E+00 | 0.000000E+00 | 0.000000E+00 | 0.000000E+00 |
| A10 | 0.000000E+00 | 0.000000E+00 | 0.000000E+00 | 0.000000E+00 | 0.000000E+00 | 0.000000E+00 | 0.000000E+00 |

TABLE 4-continued

| Aspheric coefficients of the fifth embodiment | | | |
|---|---|---|---|
| Surface | 9 | 10 | 11 |
| k | 0.000000E+00 | 0.000000E+00 | 0.000000E+00 |
| A4 | 0.000000E+00 | 0.000000E+00 | 0.000000E+00 |
| A6 | 0.000000E+00 | 0.000000E+00 | 0.000000E+00 |
| A8 | 0.000000E+00 | 0.000000E+00 | 0.000000E+00 |
| A10 | 0.000000E+00 | 0.000000E+00 | 0.000000E+00 |

The values of expressions obtained based on Table 3 and Table 4 are listed in the following table:

| Fifth embodiment (Reference wavelength: 555 nm) | | | | | |
|---|---|---|---|---|---|
| \| f/f1 \| | \| f/f2 \| | \| f/f3 \| | \| f/f4 \| | \| f/f5 \| | \| f1/f2 \| |
| −5.38564 | −15.5577 | 4.56586 | −52.6152 | 52.1281 | 0.3462 |
| TP1 / TP2 | TP2 / TP3 | TP3 / TP4 | IN12 / f | IN23 / f | \| f2/f3 \| |
| 0.7413 | 0.5309 | 1.6117 | 0.9493 | 0.4599 | −3.4074 |
| (TP1 + IN12)/ TP2 | | (TP2 + IN23)/ TP3 | | (TP3 + IN34)/ TP4 | |
| 2.0766 | | 0.8743 | | 1.6814 | |
| InTL | HOS | HOS / HOI | InS/ HOS | ODT % | TDT % |
| 14.9622 | 20.2785 | 6.5669 | 0.6101 | −51.8089 | 35.2546 |
| PSTA | PLTA | NSTA | NLTA | SSTA | SLTA |
| 0.003 mm | 0.002 mm | −0.042 mm | −0.031 mm | 0.008 mm | 0.001 mm |

The values related to the profile curve lengths obtained based on Table 3 and Table 4 are listed in the following table:

| Fifth embodiment (Reference wavelength: 555 nm) | | | | | | |
|---|---|---|---|---|---|---|
| ARE | 1/2(HEP) | ARE value | ARE − 1/2(HEP) | 2(ARE/HEP) % | TP | ARE/TP (%) |
| 11 | 0.830 | 0.830 | 0.000 | 100.04% | 1.574 | 52.74% |
| 12 | 0.830 | 0.841 | 0.011 | 101.35% | 1.574 | 53.43% |
| 21 | 0.830 | 0.834 | 0.004 | 100.50% | 2.124 | 39.28% |
| 22 | 0.830 | 0.843 | 0.013 | 101.51% | 2.124 | 39.67% |
| 31 | 0.830 | 0.832 | 0.002 | 100.20% | 4.000 | 20.79% |
| 32 | 0.830 | 0.834 | 0.004 | 100.51% | 4.000 | 20.86% |
| 41 | 0.830 | 0.831 | 0.001 | 100.09% | 2.482 | 33.47% |
| 42 | 0.830 | 0.840 | 0.010 | 101.22% | 2.482 | 33.85% |
| 51 | 0.830 | 0.840 | 0.010 | 101.22% | 0.400 | 210.02% |
| 52 | 0.830 | 0.831 | 0.001 | 100.18% | 0.400 | 207.87% |
| ARS | EHD | ARS value | ARS − EHD | (ARS/EHD)% | TP | ARS/TP (%) |
| 11 | 5.200 | 5.280 | 0.080 | 101.54% | 1.574 | 335.41% |
| 12 | 2.720 | 3.435 | 0.715 | 126.29% | 1.574 | 218.21% |
| 21 | 2.241 | 2.330 | 0.090 | 104.00% | 2.124 | 109.73% |
| 22 | 1.520 | 1.606 | 0.086 | 105.66% | 2.124 | 75.62% |
| 31 | 1.800 | 1.817 | 0.017 | 100.94% | 4.000 | 45.43% |
| 32 | 2.583 | 2.728 | 0.145 | 105.61% | 4.000 | 68.20% |
| 41 | 2.610 | 2.632 | 0.022 | 100.86% | 2.482 | 106.07% |
| 42 | 2.170 | 2.399 | 0.229 | 110.55% | 2.482 | 96.66% |
| 51 | 2.609 | 3.088 | 0.479 | 118.35% | 0.400 | 771.97% |
| 52 | 2.876 | 2.941 | 0.065 | 102.26% | 0.400 | 735.19% |

Sixth Embodiment

Figure 12A:
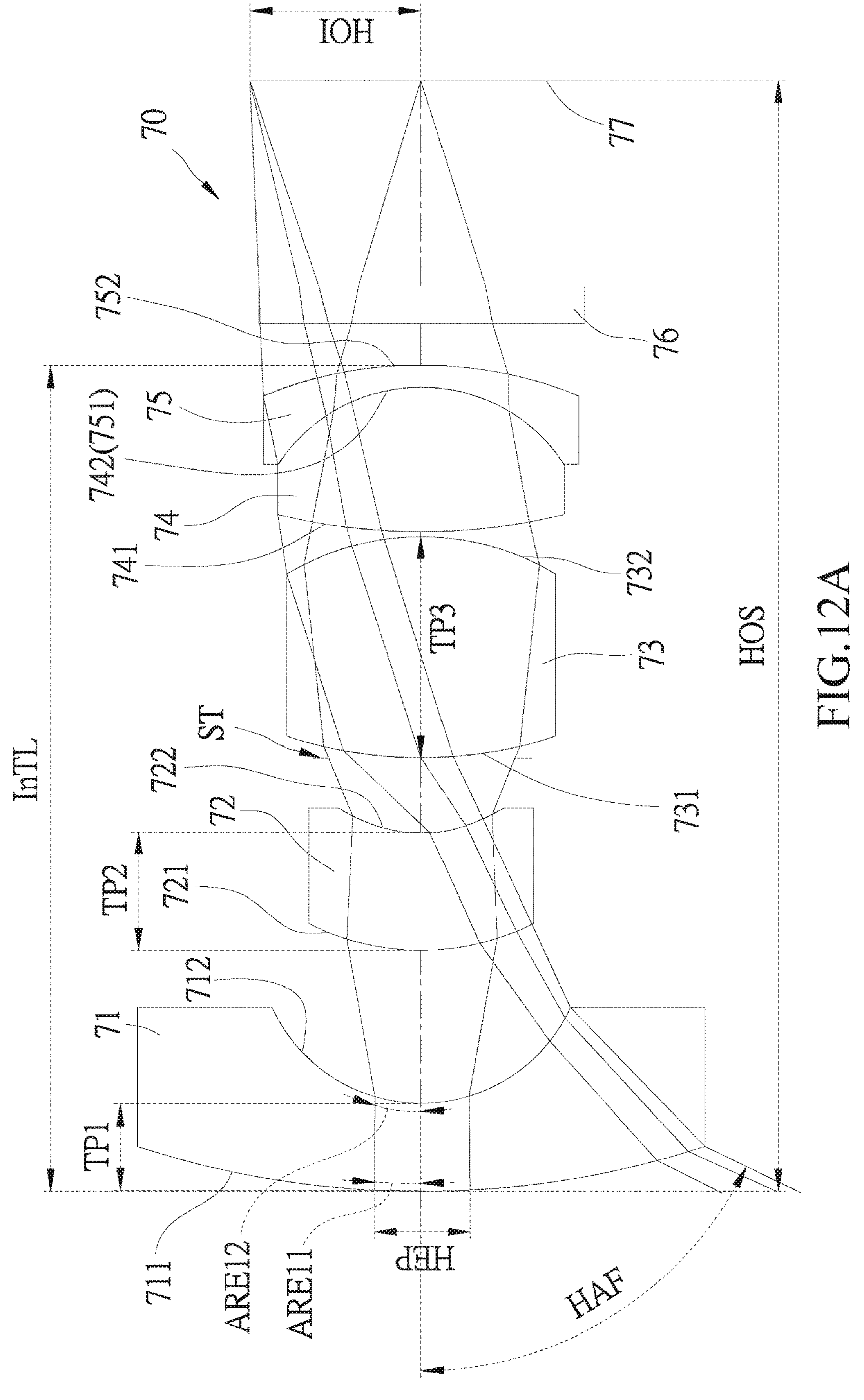
FIG. 12A is a schematic diagram of the lens arrangement of the imaging lens assembly according to a sixth embodiment of the present invention.
Figure 12B:
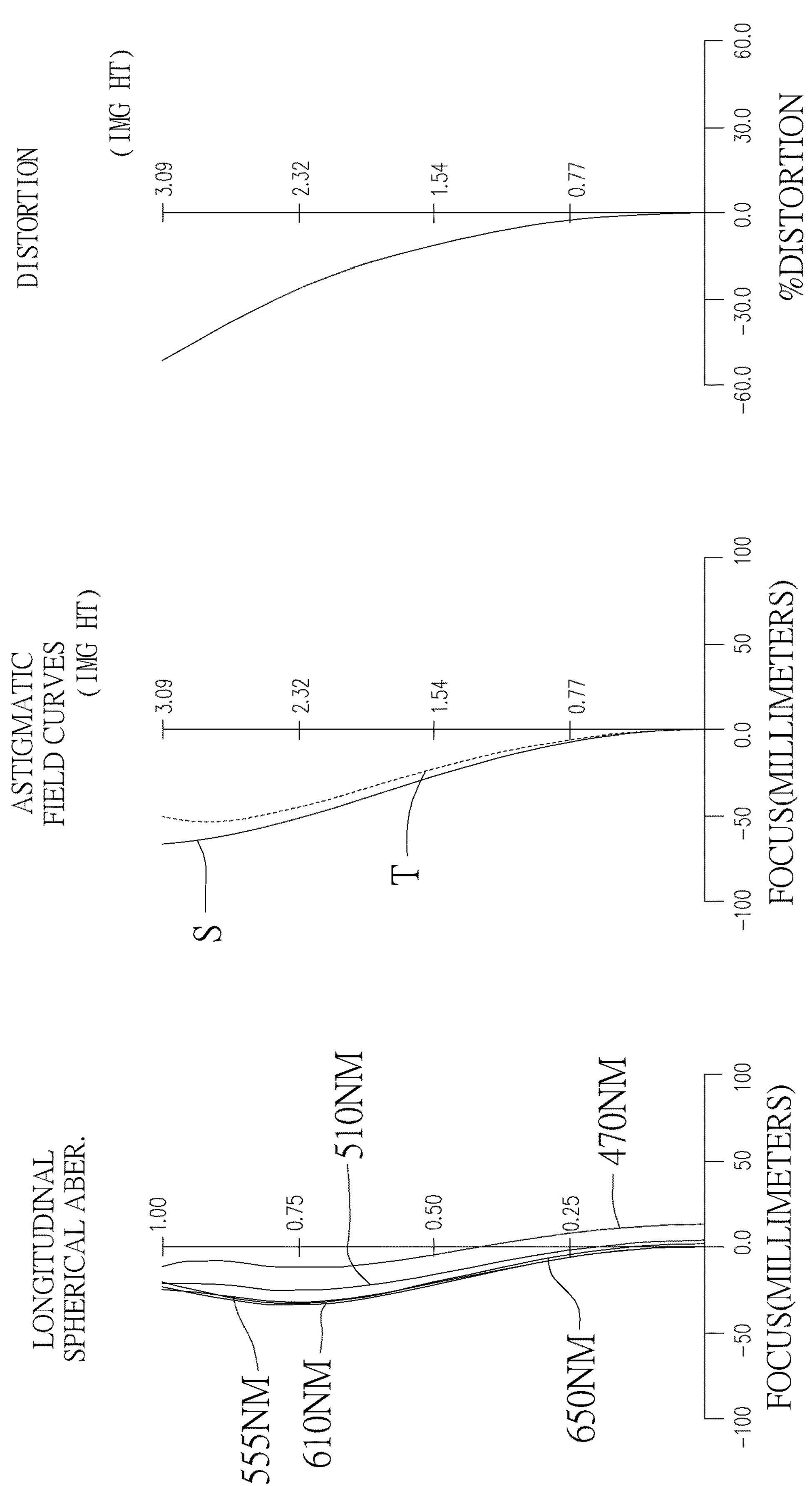
FIG. 12B is a curve diagram of a spherical aberration, an astigmatic field, and an optical distortion of the imaging lens assembly in the order from left to right according to the sixth embodiment of the present invention.
Figure 12C:
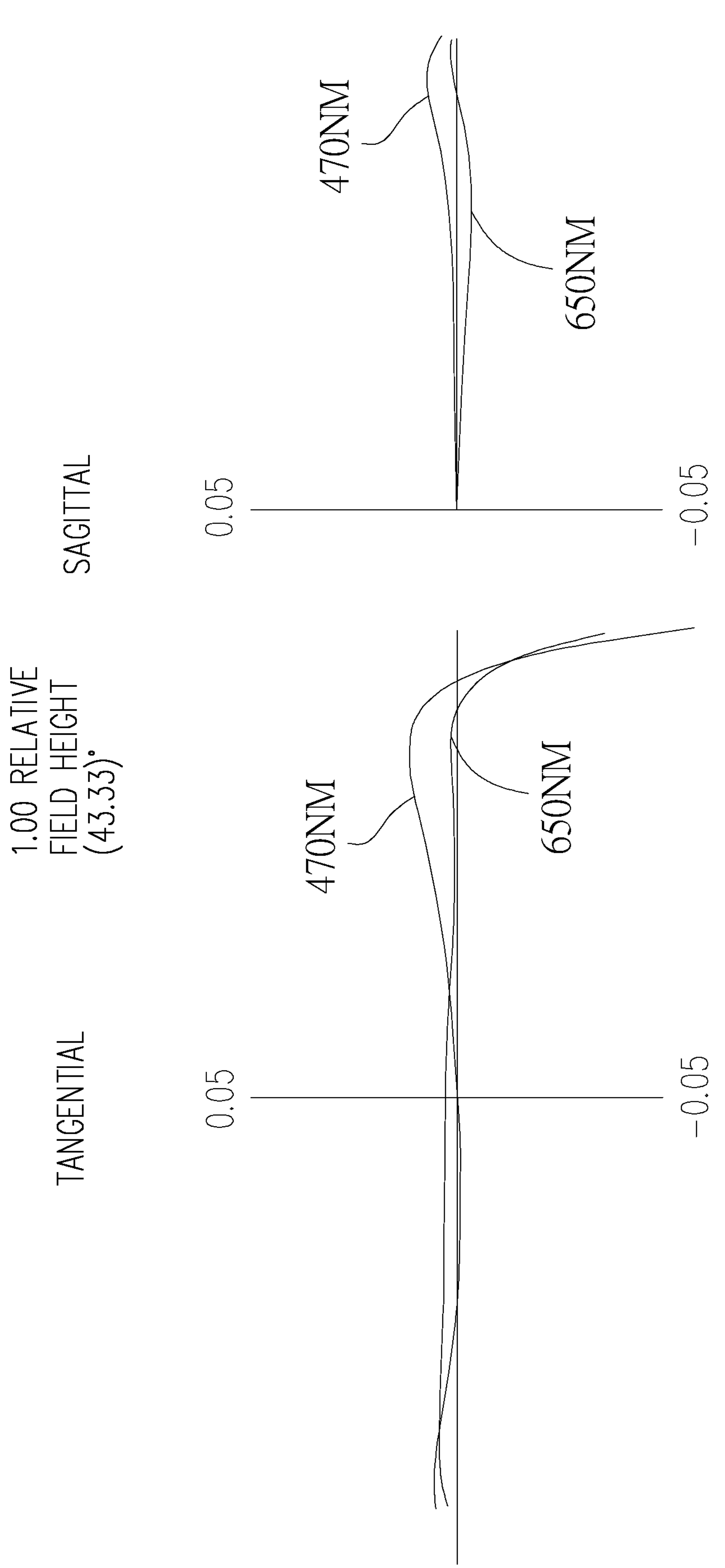
FIG. 12C shows a tangential fan and a sagittal fan of the imaging lens assembly according to the sixth embodiment of the present invention and a transverse aberration diagram at 0.7 field of view when a longest operation wavelength and a shortest operation wavelength pass through an edge of an aperture.

Referring to FIG. 12A and FIG. 12B, FIG. 12A is a schematic diagram of a structure of an imaging lens assembly 70 according to a sixth embodiment of the present invention, and FIG. 12B is a curve diagram of a spherical aberration, an astigmatic field, and an optical distortion of the imaging lens assembly 70 in the order from left to right according to the sixth embodiment of the present invention. FIG. 12C is shows a tangential fan and a sagittal fan of the imaging lens assembly 70 according to the sixth embodiment of the present invention and a transverse aberration diagram at 0.7 field of view when a longest operation wavelength and a shortest operation wavelength pass through an edge of an aperture. Referring to FIG. 12A, the imaging lens assembly 70 includes, along an optical axis from an object side to an image side, a first lens 71, a second lens 72, an aperture ST, a third lens 73, a fourth lens 74, a fifth lens 75, an infrared filter 76, and an image plane 77.

The first lens 71 has negative refractive power and is made of glass. The first lens 71 is a convex-concave lens, wherein an object-side surface 711, which faces the object side, of the first lens 71 is convex, and an image-side surface 712, which faces the image side, of the first lens 71 is concave. The object-side surface 711 and the image-side surface 712 of the first lens 71 are both spherical.

The second lens 72 has negative refractive power and is made of glass. The second lens 72 is a convex-concave lens, wherein an object-side surface 721, which faces the object side, of the second lens 72 is convex, and an image-side surface 722, which faces the image side, second lens 72 is concave. The object-side surface 721 and the image-side surface 722 of the second lens 72 are both spherical.

The third lens 73 has positive refractive power and is made of glass. The third lens 73 is a double convex lens, an object-side surface 731, which faces the object side, and an image-side surface 732, which faces the image side, of the third lens 73 are both convex. The object-side surface 731 and the image-side surface 732 of the third lens 73 are both spherical.

The fourth lens 74 has positive refractive power and is made of glass. The fourth lens 74 is a double convex lens, wherein an object-side surface 741, which faces the object side, and an image-side surface 742, which faces the image side, of the fourth lens 74 are both convex. The object-side surface 741 and the image-side surface 742 of the fourth lens 74 are both spherical.

The fifth lens 75 has negative refractive power and is made of glass. The fifth lens 75 is a concave-convex lens, wherein an object-side surface 751, which faces the object side, of the fifth lens 75 is concave, and an image-side surface 752, which faces the image side, of the fifth lens 75 is convex. The object-side surface 751 and the image-side surface 752 of the fifth lens 75 are both spherical. The object-side surface 751 of the fifth lens 75 and the image-side surface 742 of the fourth lens 74 are adhered to form a compound lens.

The infrared filter 76 is made of glass, is disposed between the fifth lens 75 and the image plane 77, and does not affect the focal length of the imaging lens assembly 70.

The parameters of the lenses of the sixth embodiment are listed in Table 5 and Table 6.

TABLE 5 f = 2.9842 mm; f/HEP = 1.7; HAF = 65.0410 deg

| Surface | | Radius of curvature (mm) | Thickness (mm) | Material | Refractive index | Abbe number | Focal length (mm) |
|---|---|---|---|---|---|---|---|
| 0 | Object | 1E+18 | 1E+18 | | | | |
| 1 | $1^{st}$ lens | 16.55221896 | 1.574 | glass | 1.6935 | 53.38 | −5.491 |
| 2 | | 2.970254901 | 2.836 | | | | |
| 3 | $2^{nd}$ lens | 4.725808986 | 2.119 | glass | 1.84666 | 23.78 | −16.663 |
| 4 | | 2.810691193 | 1.374 | | | | |
| 5 | Aperture | 1E+18 | 0.000 | | | | |
| 6 | $3^{rd}$ lens | 7.858131568 | 4.000 | glass | 1.744 | 44.90 | 4.636 |
| 7 | | −4.792874398 | 0.102 | | | | |
| 8 | $4^{th}$ lens | 11.10636585 | 2.609 | glass | 1.618 | 63.39 | 4.279 |
| 9 | | −3.152949082 | 0.000 | | | | |
| 10 | $5^{th}$ lens | −3.152949082 | 0.400 | glass | 1.92286 | 20.88 | −5.933 |
| 11 | | −7.939515111 | 0.763 | | | | |
| 12 | Infrared filter | 1E+18 | 0.700 | SBSL7_OHARA | 1.5174 | 64.20 | |
| 13 | | 1E+18 | 3.726 | | | | |
| 14 | Image plane | 1E+18 | 0.000 | | | | |

Reference wavelength (d-line): 555 nm; no

TABLE 6

| Aspheric coefficients of the sixth embodiment | | | | | | | |
|---|---|---|---|---|---|---|---|
| Surface | 1 | 2 | 3 | 4 | 6 | 7 | 8 |
| k | 0.000000E+00 | 0.000000E+00 | 0.000000E+00 | 0.000000E+00 | 0.000000E+00 | 0.000000E+00 | 0.000000E+00 |
| A4 | 0.000000E+00 | 0.000000E+00 | 0.000000E+00 | 0.000000E+00 | 0.000000E+00 | 0.000000E+00 | 0.000000E+00 |
| A6 | 0.000000E+00 | 0.000000E+00 | 0.000000E+00 | 0.000000E+00 | 0.000000E+00 | 0.000000E+00 | 0.000000E+00 |
| A8 | 0.000000E+00 | 0.000000E+00 | 0.000000E+00 | 0.000000E+00 | 0.000000E+00 | 0.000000E+00 | 0.000000E+00 |
| A10 | 0.000000E+00 | 0.000000E+00 | 0.000000E+00 | 0.000000E+00 | 0.000000E+00 | 0.000000E+00 | 0.000000E+00 |

| Surface | 9 | 10 | 11 |
|---|---|---|---|
| k | 0.000000E+00 | 0.000000E+00 | 0.000000E+00 |
| A4 | 0.000000E+00 | 0.000000E+00 | 0.000000E+00 |
| A6 | 0.000000E+00 | 0.000000E+00 | 0.000000E+00 |
| A8 | 0.000000E+00 | 0.000000E+00 | 0.000000E+00 |
| A10 | 0.000000E+00 | 0.000000E+00 | 0.000000E+00 |

The values of expressions obtained based on Table 5 and Table 6 are listed in the following table:

| Sixth embodiment (Reference wavelength: 555 nm) | | | | | |
|---|---|---|---|---|---|
| \| f/f1 \| | \| f/f2 \| | \| f/f3 \| | \| f/f4 \| | \| f/f5 \| | \| f1/f2 \| |
| 0.5464 | 0.1800 | 0.6476 | 0.0525 | 0.0627 | 0.3295 |
| TP1 / TP2 | TP2 / TP3 | TP3 / TP4 | IN12 / f | IN23 / f | \| f2/f3 \| |
| 0.7428 | 0.5299 | 1.5332 | 0.9503 | 0.4603 | −3.5967 |
| (TP1 + IN12)/ TP2 | | (TP2 + IN23)/ TP3 | | (TP3 + IN34)/ TP4 | |
| 2.0808 | | 0.8733 | | 1.5722 | |
| InTL | HOS | HOS / HOI | InS/ HOS | ODT % | TDT % |
| 15.0137 | 20.2020 | 6.5421 | 0.6088 | −51.7717 | 35.1950 |
| PSTA | PLTA | NSTA | NLTA | SSTA | SLTA |
| 0.005 mm | 0.002 mm | −0.057 mm | −0.035 mm | 0.004 mm | 0.001 mm |

The values related to the profile curve lengths obtained based on Table 5 and Table 6 are listed in the following table:

| Sixth embodiment (Reference wavelength: 555 nm) | | | | | | |
|---|---|---|---|---|---|---|
| ARE | 1/2(HEP) | ARE value | ARE − 1/2(HEP) | 2(ARE/HEP) % | TP | ARE/TP (%) |
| 11 | 0.878 | 0.878 | 0.000 | 100.05% | 1.574 | 55.80% |
| 12 | 0.878 | 0.891 | 0.013 | 101.52% | 1.574 | 56.62% |
| 21 | 0.878 | 0.883 | 0.005 | 100.58% | 2.119 | 41.67% |
| 22 | 0.878 | 0.893 | 0.015 | 101.70% | 2.119 | 42.13% |
| 31 | 0.878 | 0.880 | 0.002 | 100.21% | 4.000 | 22.00% |
| 32 | 0.878 | 0.883 | 0.005 | 100.57% | 4.000 | 22.07% |
| 41 | 0.878 | 0.879 | 0.001 | 100.10% | 2.609 | 33.69% |
| 42 | 0.878 | 0.890 | 0.012 | 101.34% | 2.609 | 34.11% |
| 51 | 0.878 | 0.890 | 0.012 | 101.34% | 0.400 | 222.44% |
| 52 | 0.878 | 0.880 | 0.002 | 100.20% | 0.400 | 219.95% |
| ARS | EHD | ARS value | ARS − EHD | (ARS/EHD)% | TP | ARS/TP (%) |
| 11 | 5.203 | 5.293 | 0.089 | 101.72% | 1.574 | 336.20% |
| 12 | 2.720 | 3.435 | 0.715 | 126.29% | 1.574 | 218.21% |
| 21 | 2.251 | 2.345 | 0.094 | 104.20% | 2.119 | 110.64% |
| 22 | 1.520 | 1.606 | 0.086 | 105.66% | 2.119 | 75.77% |
| 31 | 1.871 | 1.889 | 0.018 | 100.95% | 4.000 | 47.23% |
| 32 | 2.611 | 2.760 | 0.149 | 105.71% | 4.000 | 69.00% |
| 41 | 2.610 | 2.634 | 0.024 | 100.90% | 2.609 | 100.95% |
| 42 | 2.195 | 2.427 | 0.232 | 110.57% | 2.609 | 93.01% |
| 51 | 2.616 | 3.085 | 0.469 | 117.93% | 0.400 | 771.34% |
| 52 | 2.882 | 2.948 | 0.067 | 102.31% | 0.400 | 737.07% |

Seven Embodiment

Figure 13A:
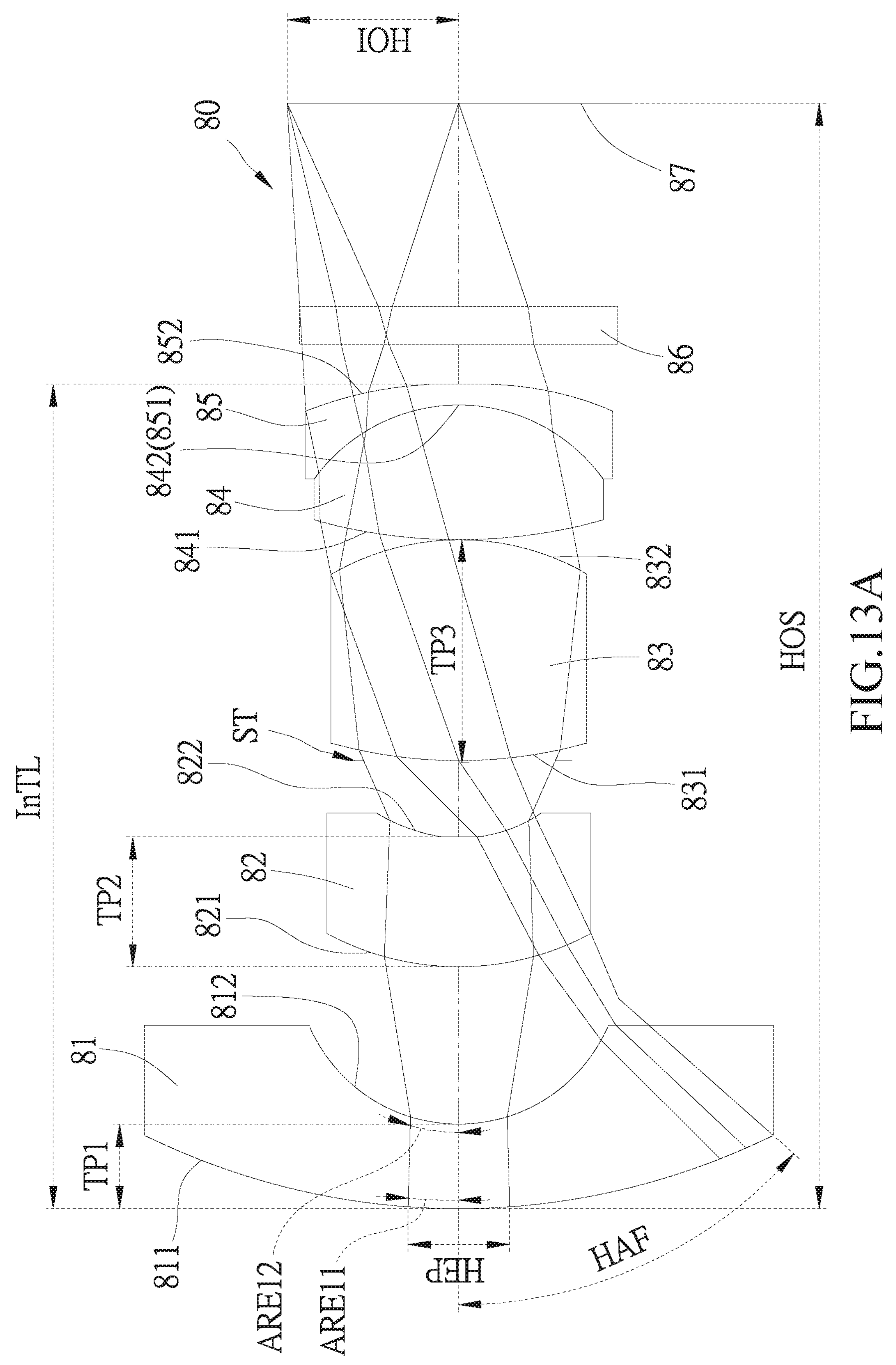
FIG. 13A is a schematic diagram of the lens arrangement of the imaging lens assembly according to a seventh embodiment of the present invention.
Figure 13B:
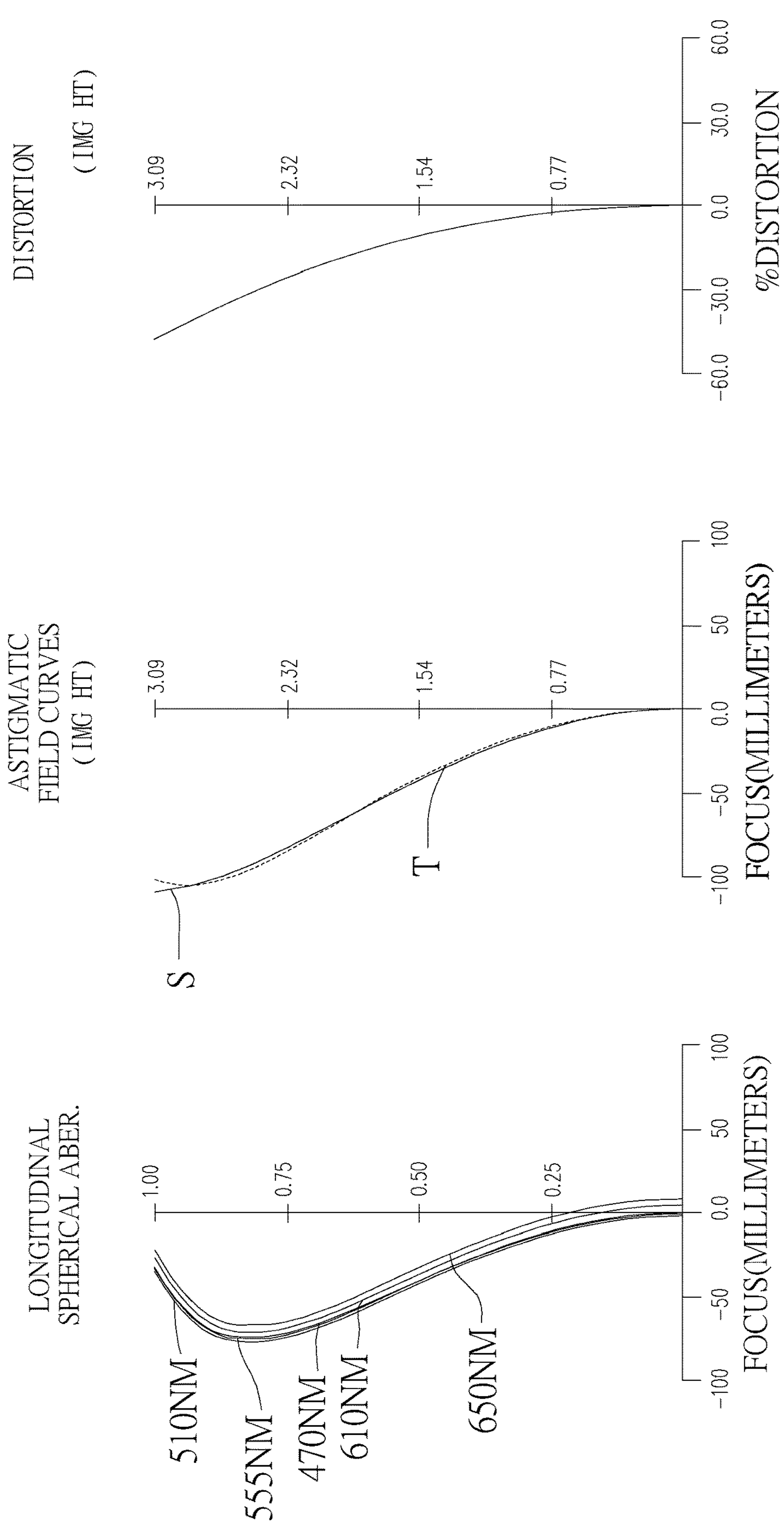
FIG. 13B is a curve diagram of a spherical aberration, an astigmatic field, and an optical distortion of the imaging lens assembly in the order from left to right according to the seventh embodiment of the present invention.
Figure 13C:
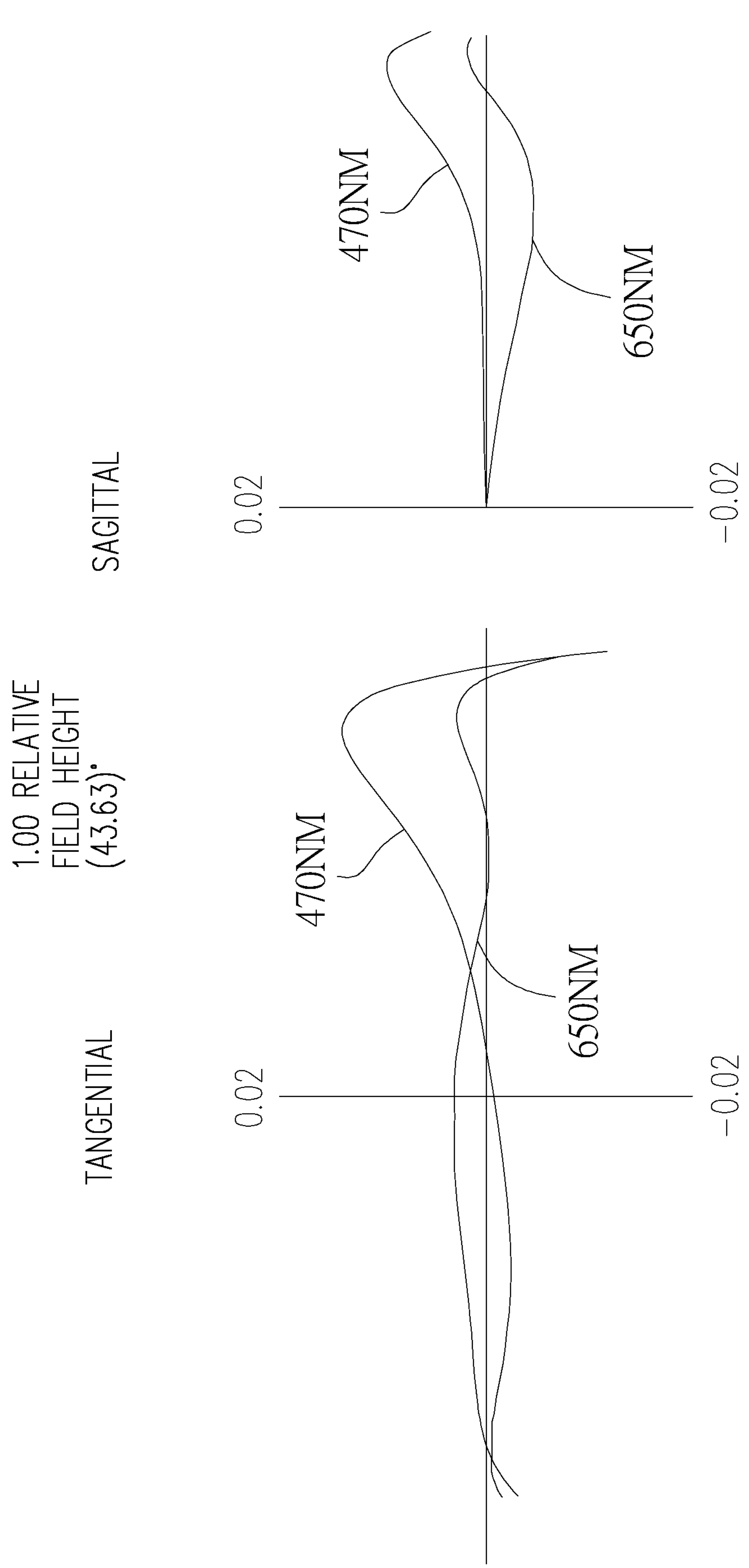
FIG. 13C shows a tangential fan and a sagittal fan of the imaging lens assembly according to the seventh embodiment of the present invention, and a transverse aberration diagram at 0.7 field of view when a longest operation wavelength and a shortest operation wavelength pass through an edge of an aperture.

Referring to FIG. 13A and FIG. 13B, FIG. 13A is a schematic diagram of a structure of an imaging lens assembly 80 according to a seventh embodiment of the present invention, and FIG. 13B is a curve diagram of a spherical aberration, an astigmatic field, and an optical distortion of the imaging lens assembly 80 in the order from left to right according to the seventh embodiment. FIG. 13C shows a tangential fan and a sagittal fan of the imaging lens assembly 70 according to the seventh embodiment of the present invention and a transverse aberration diagram at 0.7 field of view when a longest operation wavelength and a shortest operation wavelength pass through an edge of an aperture. Referring to FIG. 13A, the imaging lens assembly 80 includes, along an optical axis from an object side to an image side, a first lens 81, a second lens 82, an aperture ST, a third lens 83, a fourth lens 84, a fifth lens 85, an infrared filter 86, and an image plane 87.

The first lens 81 has negative refractive power and is made of glass. The first lens 81 is a convex-concave lens, wherein an object-side surface 811, which faces the object side, of the first lens 81 is convex, and an image-side surface 812, which faces the image side, of the first lens 81 is concave. The object-side surface 811 and the image-side surface 812 of the first lens 81 are both spherical.

The second lens 82 has negative refractive power and is made of glass. The second lens 82 is a convex-concave lens, wherein an object-side surface 821, which faces the object side, of the second lens 82 is convex, and an image-side surface 822, which faces the image side, of the second lens 82 is concave. The object-side surface 821 and the image-side surface 822 of the second lens 82 are both spherical.

The third lens 83 has positive refractive power and is made of glass. The third lens 83 is a double convex lens, wherein an object-side surface 831, which faces the object side, and an image-side surface 832, which faces the image side, of the third lens 83 are both convex. The object-side surface 831 and the image-side surface 832 of the third lens 83 are both spherical.

The fourth lens 84 has positive refractive power and is made of glass. The fourth lens 84 is a double convex lens, wherein an object-side surface 841, which faces the object side, and an image-side surface 842, which faces the image side, of the fourth lens 84 are both convex. The object-side surface 841 and the image-side surface 842 of the fourth lens 84 are both spherical.

The fifth lens 85 has negative refractive power and is made of glass. The fifth lens 85 is a concave-convex lens, wherein an object-side surface 851, which faces the object side, of the fifth lens 85 is concave, and an image-side surface 852, which faces the image side, of the fifth lens 85 is convex. The object-side surface 851 and the image-side surface 852 of the fifth lens 85 are both spherical. The object-side surface 851 of the fifth lens 85 and the image-side surface 842 of the fourth lens 84 are adhered to form a compound lens.

The infrared filter 86 is made of glass, is disposed between the fifth lens 85 and the image plane 87, and does not affect the focal length of the imaging lens assembly 80.

The parameters of the lenses of the seventh embodiment are listed in Table 7 and Table 8.

TABLE 7

| f = 2.9528 mm; f/HEP = 1.6; HAF = 65.0361 deg | | | | | | | |
|---|---|---|---|---|---|---|---|
| Surface | | Radius of curvature (mm) | Thickness (mm) | Material | Refractive index | Abbe number | Focal length (mm) |
| 0 | Object | 1E+18 | 1E+18 | | | | |
| 1 | $1^{st}$ lens | 12.54256617 | 1.574 | glass | 1.6935 | 53.38 | −6.029 |
| 2 | | 2.970254901 | 2.836 | | | | |
| 3 | $2^{nd}$ lens | 5.013929747 | 2.354 | glass | 1.84666 | 23.78 | −14.843 |
| 4 | | 2.810691193 | 1.374 | | | | |
| 5 | Aperture | 1E+18 | 0.000 | | | | |
| 6 | $3^{rd}$ lens | 8.165908775 | 4.000 | glass | 1.744 | 44.90 | 4.629 |
| 7 | | −4.694112262 | 0.025 | | | | |
| 8 | $4^{th}$ lens | 10.0339955 | 2.423 | glass | 1.618 | 63.39 | 4.245 |
| 9 | | −3.217581268 | 0.000 | | | | |
| 10 | $5^{th}$ lens | −3.217581268 | 0.400 | glass | 1.92286 | 20.88 | −6.073 |
| 11 | | −8.059176865 | 0.711 | | | | |
| 12 | Infrared filter | 1E+18 | 0.700 | SBSL7_OHARA | 1.5174 | 64.20 | |
| 13 | | 1E+18 | 3.674 | | | | |
| 14 | Image plane | 1E+18 | 0.000 | | | | |

Reference wavelength (d-line): 555 nm; no

TABLE 8

| Aspheric coefficients of the seventh embodiment | | | | | | | |
|---|---|---|---|---|---|---|---|
| Surface | 1 | 2 | 3 | 4 | 6 | 7 | 8 |
| k | 0.000000E+00 | 0.000000E+00 | 0.000000E+00 | 0.000000E+00 | 0.000000E+00 | 0.000000E+00 | 0.000000E+00 |
| A4 | 0.000000E+00 | 0.000000E+00 | 0.000000E+00 | 0.000000E+00 | 0.000000E+00 | 0.000000E+00 | 0.000000E+00 |
| A6 | 0.000000E+00 | 0.000000E+00 | 0.000000E+00 | 0.000000E+00 | 0.000000E+00 | 0.000000E+00 | 0.000000E+00 |
| A8 | 0.000000E+00 | 0.000000E+00 | 0.000000E+00 | 0.000000E+00 | 0.000000E+00 | 0.000000E+00 | 0.000000E+00 |
| A10 | 0.000000E+00 | 0.000000E+00 | 0.000000E+00 | 0.000000E+00 | 0.000000E+00 | 0.000000E+00 | 0.000000E+00 |

| Surface | 9 | 10 | 11 |
|---|---|---|---|
| k | 0.000000E+00 | 0.000000E+00 | 0.000000E+00 |
| A4 | 0.000000E+00 | 0.000000E+00 | 0.000000E+00 |
| A6 | 0.000000E+00 | 0.000000E+00 | 0.000000E+00 |
| A8 | 0.000000E+00 | 0.000000E+00 | 0.000000E+00 |
| A10 | 0.000000E+00 | 0.000000E+00 | 0.000000E+00 |

The values of expressions obtained based on Table 7 and Table 8 are listed in the following table:

| Seventh embodiment (Reference wavelength: 555 nm) | | | | | |
|---|---|---|---|---|---|
| \| f/f1 \| | \| f/f2 \| | \| f/f3 \| | \| f/f4 \| | \| f/f5 \| | \| f1/f2 \| |
| 0.4923 | 0.2001 | 0.6416 | 0.0397 | 0.0625 | 0.4064 |
| TP1 / TP2 | TP2 / TP3 | TP3 / TP4 | IN12 / f | IN23 / f | \| f2/f3 \| |
| 0.6687 | 0.5886 | 1.6505 | 0.9604 | 0.4652 | −3.206 |
| (TP1 + IN12)/ TP2 | | (TP2 + IN23)/ TP3 | | (TP3 + IN34)/ TP4 | |
| 1.8731 | | 0.9320 | | 1.6608 | |
| InTL | HOS | HOS / HOI | InS/ HOS | ODT % | TDT % |
| 14.9867 | 20.0718 | 6.4999 | 0.5945 | −51.2499 | 34.6454 |
| PSTA | PLTA | NSTA | NLTA | SSTA | SLTA |
| −0.002 mm | −0.003 mm | −0.012 mm | −0.007 mm | 0.006 mm | 0.002 mm |

The values related to the profile curve lengths obtained based on Table 7 and Table 8 are listed in the following table:

| Seventh embodiment (Reference wavelength: 555 nm) | | | | | | |
|---|---|---|---|---|---|---|
| ARE | 1/2(HEP) | ARE value | ARE − 1/2(HEP) | 2(ARE/HEP) % | TP | ARE/TP (%) |
| 11 | 0.924 | 0.924 | 0.001 | 100.09% | 1.574 | 58.68% |
| 12 | 0.924 | 0.939 | 0.016 | 101.68% | 1.574 | 59.62% |
| 21 | 0.924 | 0.928 | 0.005 | 100.57% | 2.354 | 39.43% |
| 22 | 0.924 | 0.940 | 0.017 | 101.89% | 2.354 | 39.94% |
| 31 | 0.924 | 0.925 | 0.002 | 100.21% | 4.000 | 23.12% |
| 32 | 0.924 | 0.929 | 0.006 | 100.66% | 4.000 | 23.23% |
| 41 | 0.924 | 0.924 | 0.001 | 100.14% | 2.423 | 38.14% |
| 42 | 0.924 | 0.936 | 0.013 | 101.42% | 2.423 | 38.63% |
| 51 | 0.924 | 0.936 | 0.013 | 101.42% | 0.400 | 234.04% |
| 52 | 0.924 | 0.925 | 0.002 | 100.22% | 0.400 | 231.26% |
| ARS | EHD | ARS value | ARS − EHD | (ARS/EHD)% | TP | ARS/TP (%) |
| 11 | 5.430 | 5.616 | 0.186 | 103.42% | 1.574 | 356.72% |
| 12 | 2.720 | 3.435 | 0.715 | 126.29% | 1.574 | 218.21% |
| 21 | 2.271 | 2.357 | 0.086 | 103.77% | 2.354 | 100.10% |
| 22 | 1.520 | 1.606 | 0.086 | 105.66% | 2.354 | 68.21% |
| 31 | 1.884 | 1.900 | 0.016 | 100.86% | 4.000 | 47.50% |
| 32 | 2.643 | 2.806 | 0.164 | 106.19% | 4.000 | 70.15% |
| 41 | 2.610 | 2.639 | 0.029 | 101.12% | 2.423 | 108.91% |
| 42 | 2.164 | 2.373 | 0.209 | 109.67% | 2.423 | 97.94% |
| 51 | 2.647 | 3.108 | 0.461 | 117.43% | 0.400 | 777.12% |
| 52 | 2.908 | 2.974 | 0.066 | 102.28% | 0.400 | 743.51% |

Eighth Embodiment

Figure 14A:
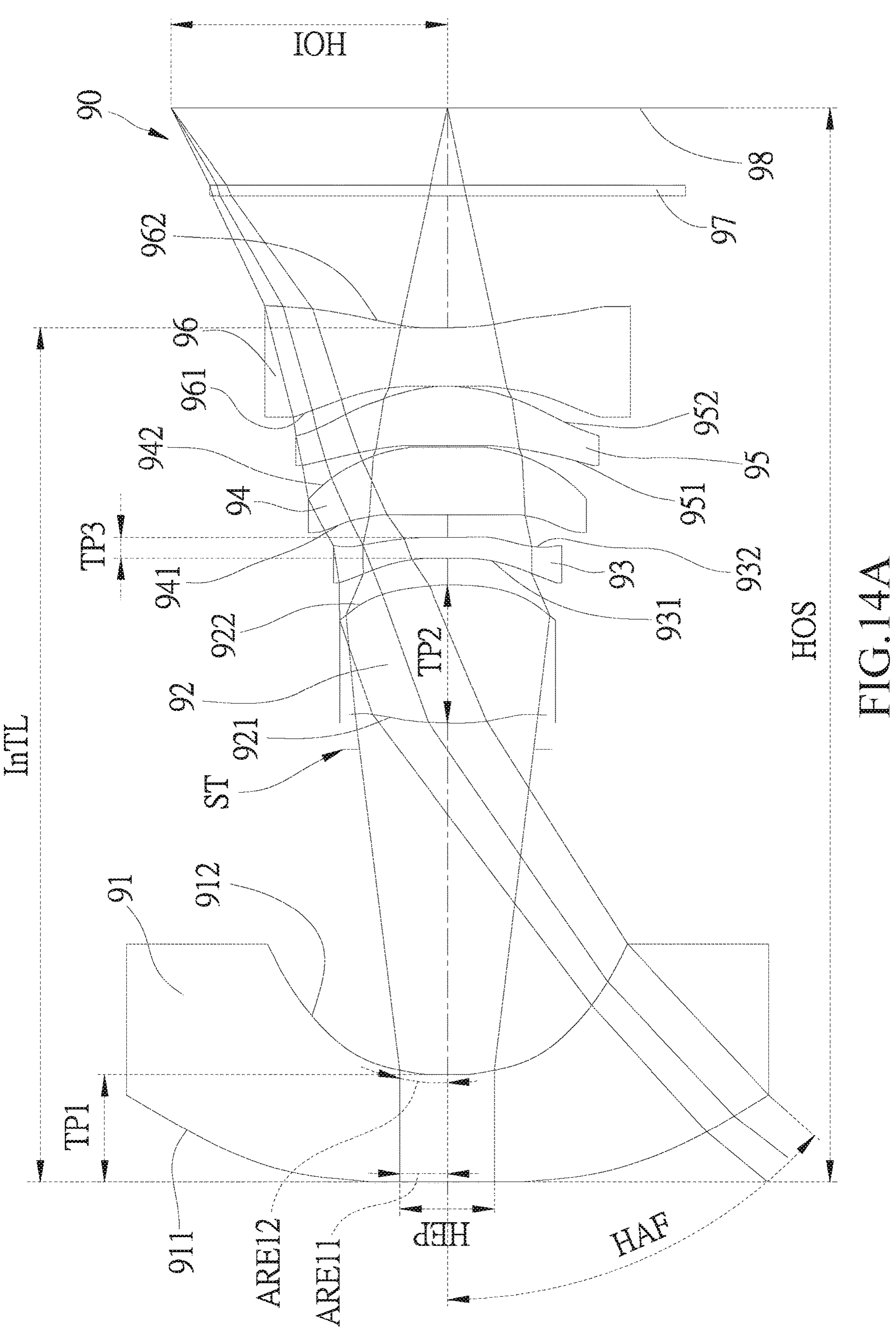
FIG. 14A is a schematic diagram of the lens arrangement of the imaging lens assembly according to an eighth embodiment of the present invention.
Figure 14B:
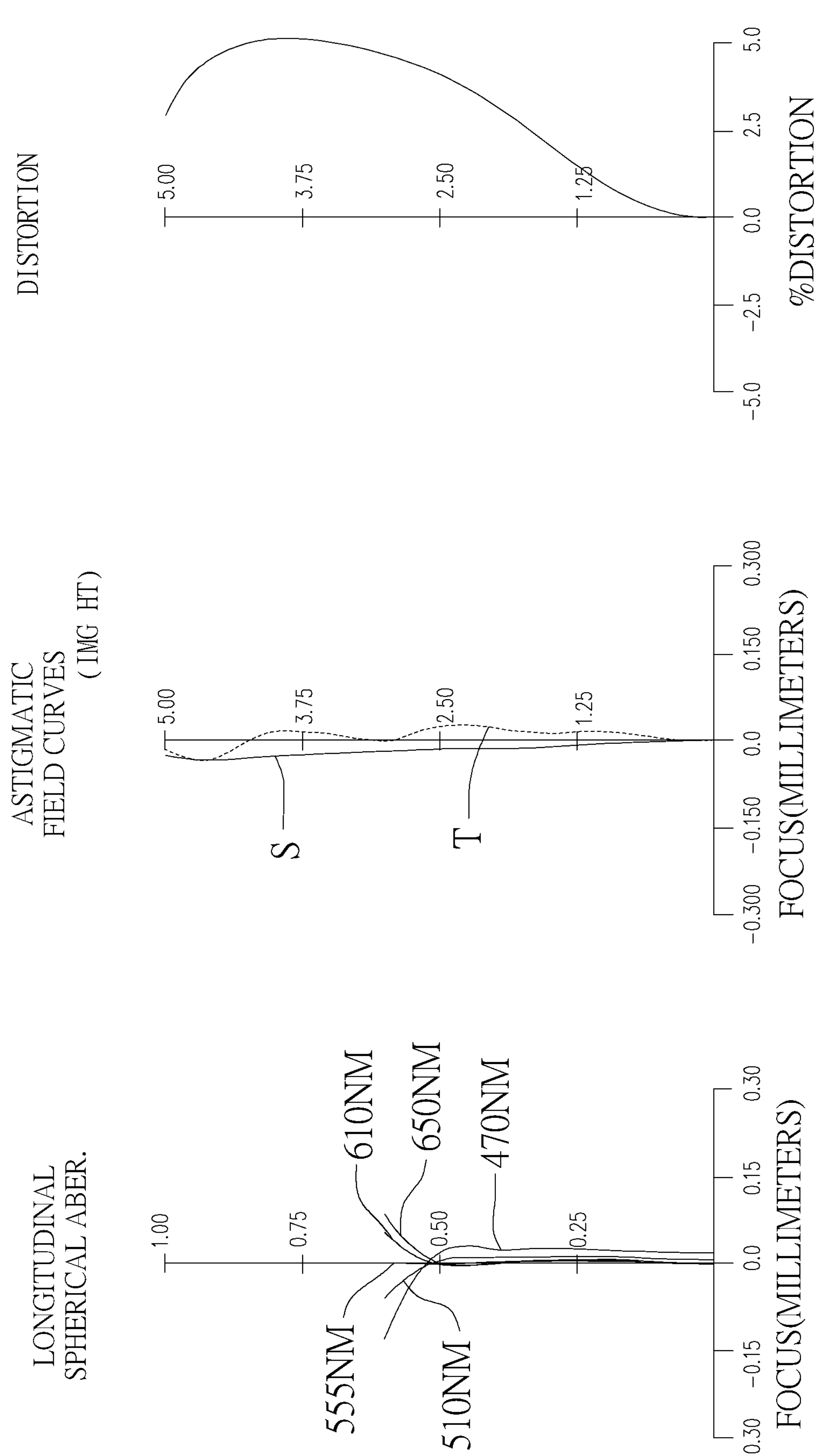
FIG. 14B is a curve diagram of a spherical aberration, an astigmatic field, and an optical distortion of the imaging lens assembly in the order from left to right according to the eighth embodiment of the present invention.
Figure 14C:
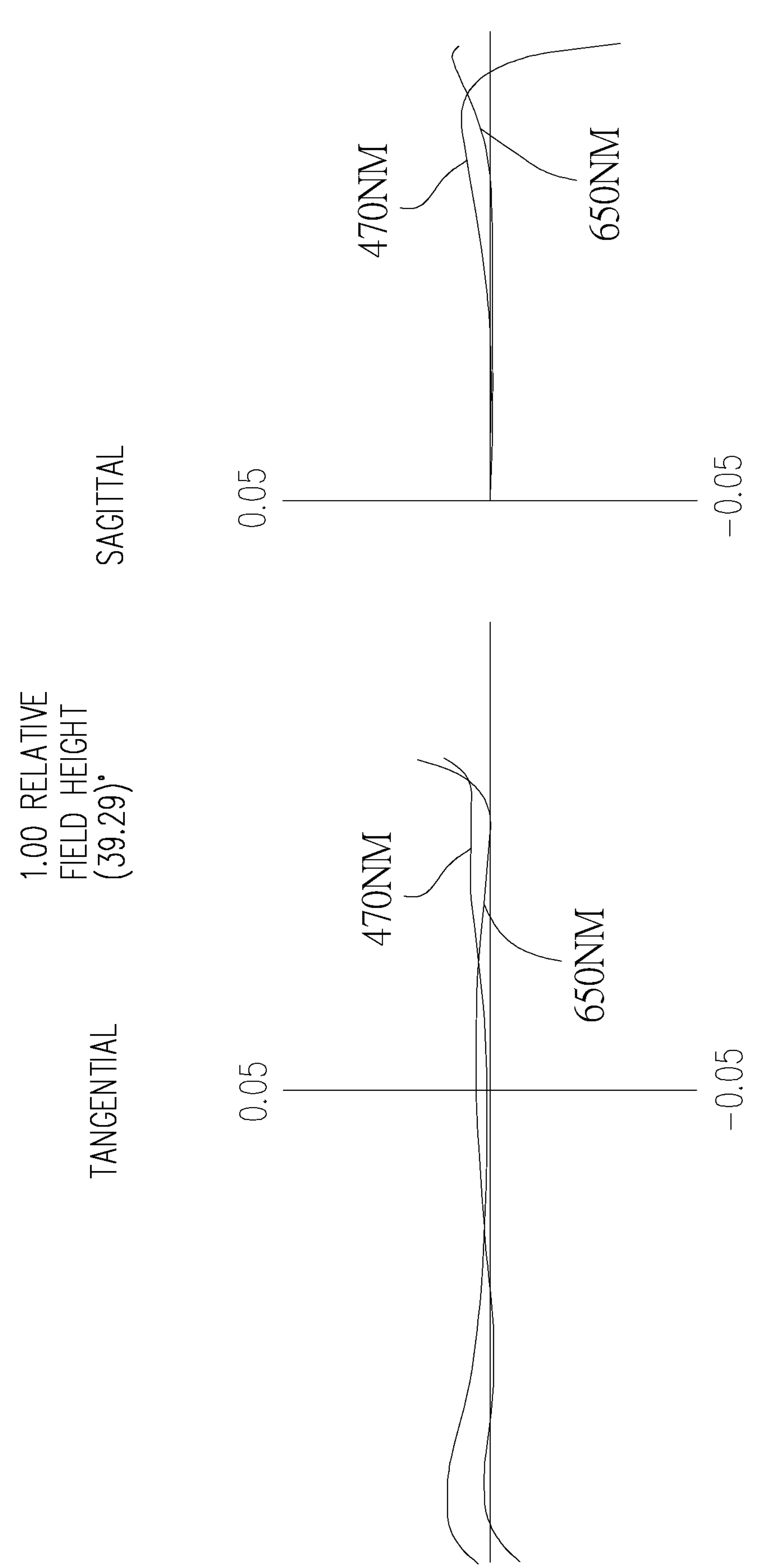
FIG. 14C shows a tangential fan and a sagittal fan of the imaging lens assembly according to the eighth embodiment of the present invention, and a transverse aberration diagram at 0.7 field of view when a longest operation wavelength and a shortest operation wavelength pass through an edge of an aperture.

Referring to FIG. 14A and FIG. 14B, FIG. 14A is a schematic diagram of a structure of an imaging lens assembly 90 according to an eighth embodiment of the present invention, and FIG. 14B is a curve diagram of a spherical aberration, an astigmatic field, and an optical distortion of the imaging lens assembly 90 in the order from left to right according to the eighth embodiment. FIG. 14C shows a tangential fan and a sagittal fan of the imaging lens assembly 90 according to the eighth embodiment of the present invention and a transverse aberration diagram at 0.7 field of view when a longest operation wavelength and a shortest operation wavelength pass through an edge of an aperture. Referring to FIG. 14A, the imaging lens assembly 90 includes, along an optical axis from an object side to an image side, a first lens 91, an aperture ST, a second lens 92, a third lens 93, a fourth lens 94, a fifth lens 95, a sixth lens 96, an infrared filter 97, and an image plane 98.

The first lens 91 has negative refractive power and is made of plastic. The first lens 91 is a double concave lens, wherein an object-side surface 911, which faces the object side, and an image-side surface 912, which faces the image side, of the first lens 91 are both concave. The object-side surface 911 and the image-side surface 912 of the first lens 91 are both aspheric.

The second lens 92 has positive refractive power and is made of plastic. The second lens 92 is a double convex lens, wherein an object-side surface 921, which faces the object side, and an image-side surface 922, which faces the image side, of the second lens 92 are both convex. The object-side surface 921 and the image-side surface 922 of the second lens 92 are both aspheric.

The third lens 93 has negative refractive power and is made of plastic. The third lens 93 is a concave-convex lens, wherein an object-side surface 931, which faces the object side, of the third lens 93 is concave, and an image-side surface 932, which faces the image side, of the third lens 93 is convex. The object-side surface 931 and the image-side surface 932 of the third lens 93 are both aspheric.

The fourth lens 94 has positive refractive power and is made of plastic. The fourth lens 94 is a convex-concave lens, wherein an object-side surface 941, which faces the object side, of the fourth lens 94 is convex, and an image-side surface 942, which faces the image side, of the fourth lens 94 is concave. The object-side surface 941 and the image-side surface 942 of the fourth lens 94 are both aspheric.

The fifth lens 95 has positive refractive power and is made of plastic. The fifth lens 95 is a double convex lens, wherein an object-side surface 951, which faces the object side, and an image-side surface 952, which faces the image side, of the fifth lens 95 are both convex. The object-side surface 951 and the image-side surface 952 of the fifth lens 95 are both aspheric.

The sixth lens 96 has negative refractive power and is made of plastic. The sixth lens 96 is a double concave lens, wherein an object-side surface 961, which faces the object side, and an image-side surface 962, which faces the image side, of the sixth lens 96 are both concave. The object-side surface 961 and the image-side surface 962 of the sixth lens 96 are both aspheric.

The infrared filter 97 is made of glass, is disposed between the sixth lens 96 and the image plane 98, and does not affect the focal length of the imaging lens assembly 90.

The parameters of the lenses of the eighth embodiment are listed in Table 9 and Table 10.

TABLE 9

| f = 4.075 mm; f/HEP = 1.4; HAF = 50.000 deg | | | | | | | |
|---|---|---|---|---|---|---|---|
| Surface | Radius of curvature (mm) | | Thickness (mm) | Material | Refractive index | Abbe number | Focal length (mm) |
| 0 | Object | 1E+18 | 1E+18 | | | | |
| 1 | $1^{st}$ lens | −40.99625704 | 1.934 | plastic | 1.515 | 56.55 | −7.828 |
| 2 | | 4.555209289 | 5.923 | | | | |
| 3 | Aperture | 1E+18 | 0.495 | | | | |
| 4 | $2^{nd}$ lens | 5.333427366 | 2.486 | plastic | 1.544 | 55.96 | 5.897 |
| 5 | | −6.781659971 | 0.502 | | | | |
| 6 | $3^{rd}$ lens | −5.697794287 | 0.380 | plastic | 1.642 | 22.46 | −25.738 |
| 7 | | −8.883957518 | 0.401 | | | | |
| 8 | $4^{th}$ lens | 13.19225664 | 1.236 | plastic | 1.544 | 55.96 | 59.205 |
| 9 | | 21.55681832 | 0.025 | | | | |
| 10 | $5^{th}$ lens | 8.987806345 | 1.072 | plastic | 1.515 | 56.55 | 4.668 |
| 11 | | −3.158875374 | 0.025 | | | | |
| 12 | $6^{th}$ lens | −29.46491425 | 1.031 | plastic | 1.642 | 22.46 | −4.886 |
| 13 | | 3.593484273 | 2.412 | | | | |
| 14 | Infrared filter | 1E+18 | 0.200 | | 1.517 | 64.13 | |
| 15 | | 1E+18 | 1.420 | | | | |
| 16 | Image plane | 1E+18 | | | | | |

Reference wavelength (d-line): 555 nm; no

TABLE 10

| Aspheric coefficients of the eighth embodiment | | | | | | | |
|---|---|---|---|---|---|---|---|
| Surface | 1 | 2 | 4 | 5 | 6 | 7 | 8 |
| k | 4.310876E+01 | −4.707622E+00 | 2.616025E+00 | 2.445397E+00 | 5.645686E+00 | −2.117147E+01 | −5.287220E+00 |
| A4 | 7.054243E−03 | 1.714312E−02 | −8.377541E−03 | −1.789549E−02 | −3.379055E−03 | −1.370959E−02 | −2.937377E−02 |
| A6 | −5.233264E−04 | −1.502232E−04 | −1.838068E−03 | −3.657520E−03 | −1.225453E−03 | 6.250200E−03 | 2.743532E−03 |
| A8 | 3.077890E−05 | −1.359611E−04 | 1.233332E−03 | −1.131622E−03 | −5.979572E−03 | −5.854426E−03 | −2.457574E−03 |
| A10 | −1.260650E−06 | 2.680747E−05 | −2.390895E−03 | 1.390351E−03 | 4.556449E−03 | 4.049451E−03 | 1.874319E−03 |
| A12 | 3.319093E−08 | −2.017491E−06 | 1.998555E−03 | −4.152857E−04 | −1.177175E−03 | −1.314592E−03 | −6.013661E−04 |
| A14 | −5.051600E−10 | 6.604615E−08 | −9.734019E−04 | 5.487286E−05 | 1.370522E−04 | 2.143097E−04 | 8.792480E−05 |
| A16 | 3.380000E−12 | −1.301630E−09 | 2.478373E−04 | −2.919339E−06 | −5.974015E−06 | −1.399894E−05 | −4.770527E−06 |

| Surface | 9 | 10 | 11 | 12 | 13 |
|---|---|---|---|---|---|
| k | 6.200000E+01 | −2.114008E+01 | −7.699904E+00 | −6.155476E+01 | −3.120467E−01 |
| A4 | −1.359965E−01 | −1.263831E−01 | −1.927804E−02 | −2.492467E−02 | −3.521844E−02 |
| A6 | 6.628518E−02 | 6.965399E−02 | 2.478376E−03 | −1.835360E−03 | 5.629654E−03 |
| A8 | −2.129167E−02 | −2.116027E−02 | 1.438785E−03 | 3.201343E−03 | −5.466925E−04 |
| A10 | 4.396344E−03 | 3.819371E−03 | −7.013749E−04 | −8.990757E−04 | 2.231154E−05 |
| A12 | −5.542899E−04 | −4.040283E−04 | 1.253214E−04 | 1.245343E−04 | 5.548990E−07 |
| A14 | 3.768879E−05 | 2.280473E−05 | −9.943196E−06 | −8.788363E−06 | −9.396920E−08 |
| A16 | −1.052467E−06 | −5.165452E−07 | 2.898397E−07 | 2.494302E−07 | 2.728360E−09 |

The values of expressions obtained based on Table 9 and Table 10 are listed in the following table:

| Eighth embodiment (Reference wavelength: 555 nm) | | | | | |
|---|---|---|---|---|---|
| \| f/f1 \| | \| f/f2 \| | \| f/f3 \| | \| f/f4 \| | \| f/f5 \| | \| f/f6 \| |
| 0.5206 | 0.691 | 0.1583 | 0.0688 | 0.873 | 0.834 |
| TP1 / TP2 | TP2 / TP3 | TP3 / TP4 | IN12 / f | IN23 / f | \| f1/f2 \| |
| 0.778 | 6.5421 | 0.3074 | 1.575 | 0.123 | 1.3275 |
| (TP1 + IN12)/ TP2 | | (TP2 + IN23)/ TP3 | | (TP3 + IN34)/ TP4 | |
| 3.3596 | | 7.8632 | | 0.6319 | |
| InTL | HOS | HOS / HOI | | InS/ HOS | |
| 15.51 | 19.542 | 3.9084 | | 0.5979 | |

The values of expression related to the profile curve lengths obtained based on Table 9 and Table 10:

| Eighth embodiment (Reference wavelength: 555 nm) | | | | | | |
|---|---|---|---|---|---|---|
| ARE | 1/2(HEP) | ARE value | ARE − 1/2(HEP) | 2(ARE/HEP) % | TP | ARE/TP (%) |
| 11 | 1.455 | 1.455 | −0.00033 | 99.98% | 1.934 | 75.23% |
| 12 | 1.455 | 1.495 | 0.03957 | 102.72% | 1.934 | 77.29% |
| 21 | 1.455 | 1.465 | 0.00940 | 100.65% | 2.486 | 58.93% |
| 22 | 1.455 | 1.495 | 0.03950 | 102.71% | 2.486 | 60.14% |
| 31 | 1.455 | 1.486 | 0.03045 | 102.09% | 0.380 | 391.02% |
| 32 | 1.455 | 1.464 | 0.00830 | 100.57% | 0.380 | 385.19% |
| 41 | 1.455 | 1.458 | 0.00237 | 100.16% | 1.236 | 117.95% |
| 42 | 1.455 | 1.484 | 0.02825 | 101.94% | 1.236 | 120.04% |
| 51 | 1.455 | 1.462 | 0.00672 | 100.46% | 1.072 | 136.42% |
| 52 | 1.455 | 1.499 | 0.04335 | 102.98% | 1.072 | 139.83% |
| 61 | 1.455 | 1.465 | 0.00964 | 100.66% | 1.031 | 142.06% |
| 62 | 1.455 | 1.469 | 0.01374 | 100.94% | 1.031 | 142.45% |
| ARS | EHD | ARS value | ARS − EHD | (ARS/EHD)% | TP | ARS/TP (%) |
| 11 | 5.800 | 6.141 | 0.341 | 105.88% | 1.934 | 317.51% |
| 12 | 3.299 | 4.423 | 1.125 | 134.10% | 1.934 | 228.70% |
| 21 | 1.664 | 1.674 | 0.010 | 100.61% | 2.486 | 67.35% |
| 22 | 1.950 | 2.119 | 0.169 | 108.65% | 2.486 | 85.23% |
| 31 | 1.980 | 2.048 | 0.069 | 103.47% | 0.380 | 539.05% |
| 32 | 2.084 | 2.101 | 0.017 | 100.83% | 0.380 | 552.87% |
| 41 | 2.247 | 2.287 | 0.040 | 101.80% | 1.236 | 185.05% |
| 42 | 2.530 | 2.813 | 0.284 | 111.22% | 1.236 | 227.63% |
| 51 | 2.655 | 2.690 | 0.035 | 101.32% | 1.072 | 250.99% |
| 52 | 2.764 | 2.930 | 0.166 | 106.00% | 1.072 | 273.40% |
| 61 | 2.816 | 2.905 | 0.089 | 103.16% | 1.031 | 281.64% |
| 62 | 3.363 | 3.391 | 0.029 | 100.86% | 1.031 | 328.83% |

Ninth Embodiment

Figure 15A:
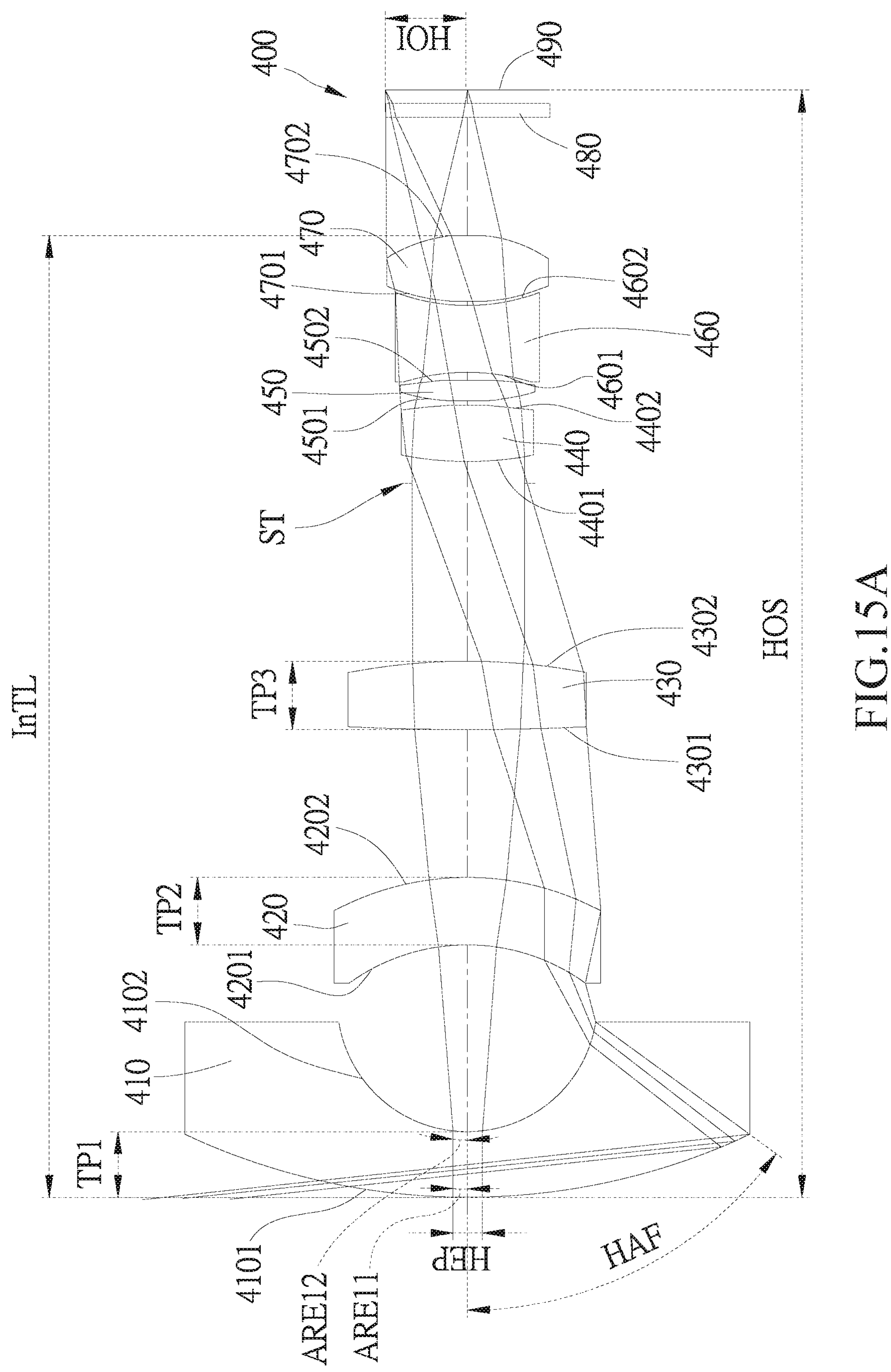
FIG. 15A is a schematic diagram of the lens arrangement of the imaging lens assembly according to a ninth embodiment of the present invention.
Figure 15B:
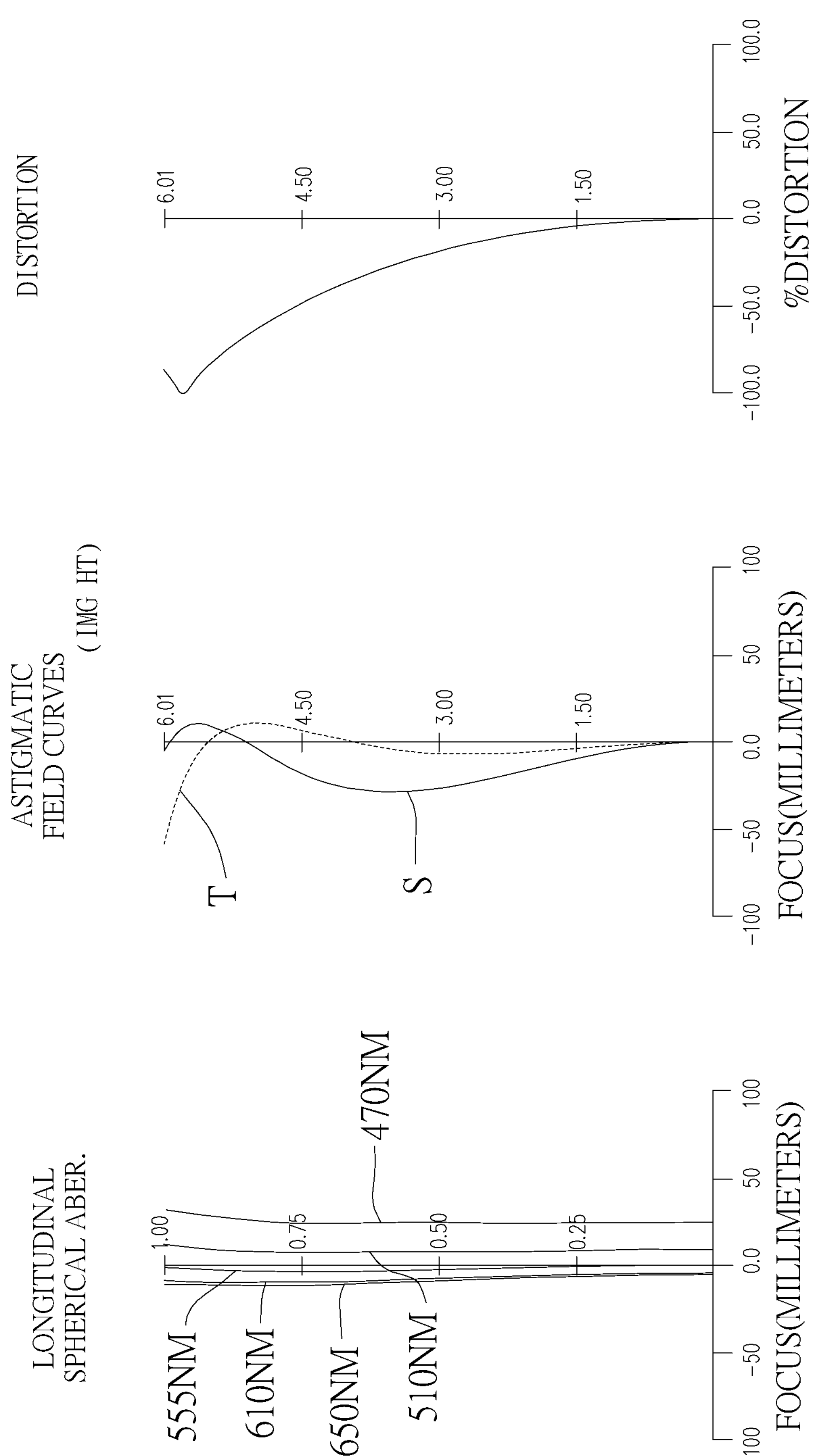
FIG. 15B is a curve diagram of a spherical aberration, an astigmatic field, and an optical distortion of the imaging lens assembly in the order from left to right according to the ninth embodiment of the present invention.
Figure 15C:
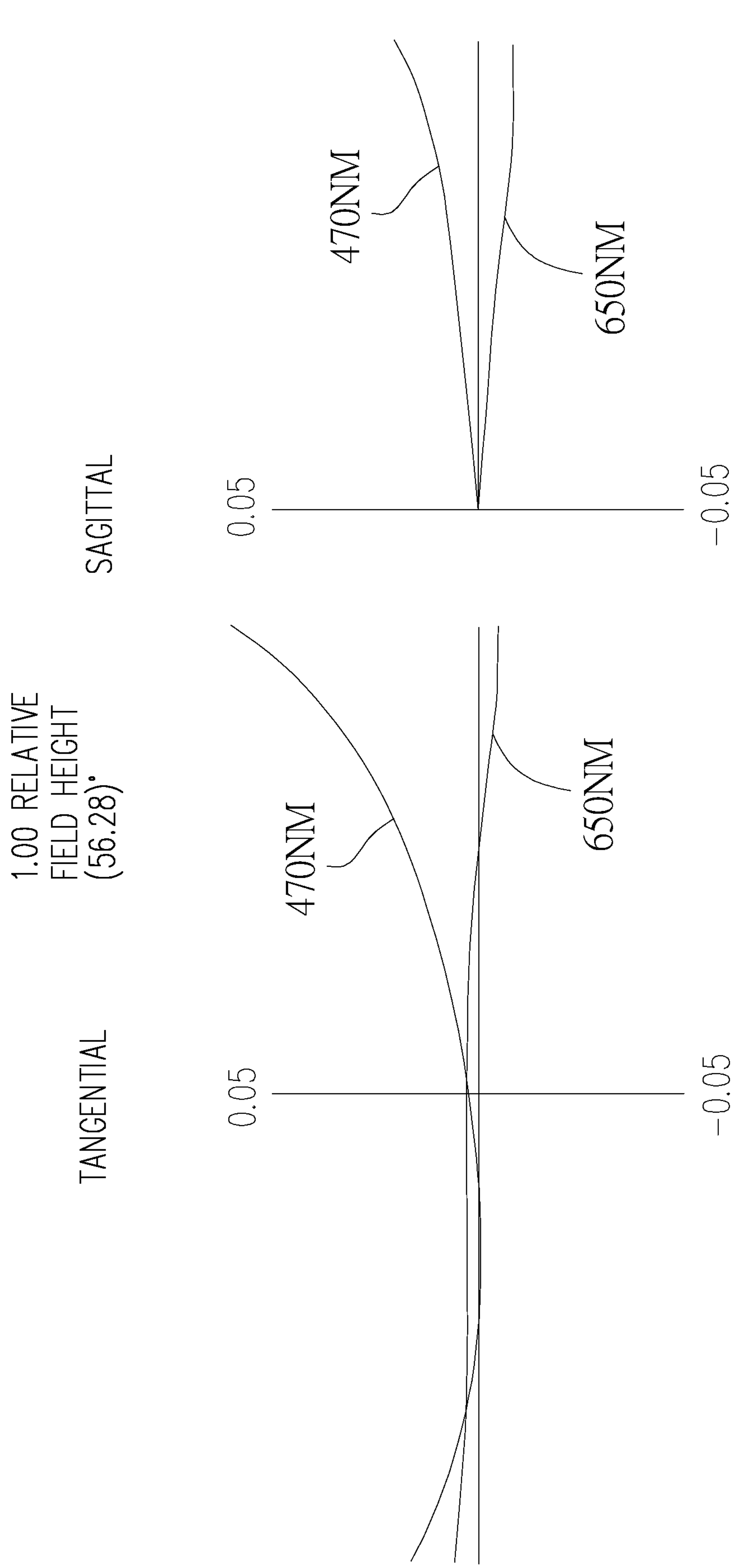
FIG. 15C shows a tangential fan and a sagittal fan of the imaging lens assembly according to the ninth embodiment of the present invention, and a transverse aberration diagram at 0.7 field of view when a longest operation wavelength and a shortest operation wavelength pass through an edge of an aperture.

Referring to FIG. 15A and FIG. 15B, FIG. 15A is a schematic diagram of a structure of an imaging lens assembly 400 according to a ninth embodiment of the present invention, and FIG. 15B is a curve diagram of a spherical aberration, an astigmatic field, and an optical distortion of the imaging lens assembly 400 in the order from left to right according to the ninth embodiment. FIG. 15C is a transverse aberration diagram of the imaging lens assembly 400 at 0.7 field of view according to the ninth embodiment. Referring to 15A, the imaging lens assembly 400 includes, along an optical axis from an object side to an image side, a first lens 410, a second lens 420, a third lens 430, an aperture ST, a fourth lens 440, a fifth lens 450, a sixth lens 460, a seventh lens 470, an infrared filter 480, and an image plane 490.

The first lens 410 has negative refractive power and is made of glass. The first lens 410 is a convex-concave lens, wherein an object-side surface 4101, which faces the object side, of the first lens 410 is convex, and an image-side surface 4102, which faces the image side, of the first lens 410 is concave. The object-side surface 4101 and the image-side surface 4102 of the first lens 410 are both spherical.

The second lens 420 has negative refractive power and is made of glass. The second lens 420 is a concave-convex lens, wherein an object-side surface 4201, which faces the object side, of the second lens 420 is concave, and an image-side surface 4202, which faces the image side, of the second lens 420 is convex. The object-side surface 4201 and the image-side surface 4202 of the second lens 420 are both spherical.

The third lens 430 has positive refractive power and is made of glass. The third lens 430 is a double convex lens, wherein an object-side surface 4301, which faces the object side, and an image-side surface 4302, which faces the image side, of the third lens 430 are both convex. The object-side surface 4301 and the image-side surface 4302 of the third lens 430 are both spherical.

The fourth lens 440 has positive refractive power and is made of glass. The fourth lens 440 is a double convex lens, wherein an object-side surface 4401, which faces the object side, and an image-side surface 4402, which faces the image side, of the fourth lens 440 are both convex. The object-side surface 4401 and the image-side surface 4402 of the fourth lens 440 are both spherical.

The fifth lens 450 has positive refractive power and is made of glass. The fifth lens 450 is a double convex lens, wherein an object-side surface 4501, which faces the object side, and an image-side surface 4502, which faces the image side, of the fifth lens 450 are both convex. The object-side surface 4501 and the image-side surface 4502 of the fifth lens 450 are both spherical.

The sixth lens 460 has negative refractive power and is made of glass. The sixth lens 460 is a double concave lens, wherein an object-side surface 4601, which faces the object side, and an image-side surface 4602, which faces the image side, of the sixth lens 460 are both concave. The object-side surface 4601 and the image-side surface 4602 of the sixth lens 460 are both spherical.

The seventh lens 470 has positive refractive power and is made of glass. The seventh lens 470 is a double convex lens, wherein an object-side surface 4701, which faces the object side, and an image-side surface 4702, which faces the image side, of the seventh lens 470 are both convex. The object-side surface 4701 and the image-side surface 4702 of the seventh lens 470 are both spherical.

The infrared filter 480 is made of glass, is disposed between the seventh lens 470 and the image plane 490, and does not affect the focal length of the imaging lens assembly 400.

The parameters of the lenses of the fourth embodiment are listed in Table 11 and Table 12.

TABLE 11 f = 4.7601 mm; f/HEP = 2.2; HAF = 95.98 deg

| Surface | | Radius of curvature (mm) | Thickness (mm) | Material | Refractive index | Abbe number | Focal length (mm) |
|---|---|---|---|---|---|---|---|
| 0 | Object | 1E+18 | 1E+18 | | | | |
| 1 | $1^{st}$ lens | 47.71478323 | 4.977 | glass | 2.001 | 29.13 | −12.647 |
| 2 | | 9.527614761 | 13.737 | | | | |
| 3 | $2^{nd}$ lens | −14.88061107 | 5.000 | glass | 2.001 | 29.13 | −99.541 |
| 4 | | −20.42046946 | 10.837 | | | | |
| 5 | $3^{rd}$ lens | 182.4762997 | 5.000 | glass | 1.847 | 23.78 | 44.046 |
| 6 | | −46.71963608 | 13.902 | | | | |
| 7 | Aperture | 1E+18 | 0.850 | | | | |
| 8 | $4^{th}$ lens | 28.60018103 | 4.095 | glass | 1.834 | 37.35 | 19.369 |
| 9 | | −35.08507586 | 0.323 | | | | |
| 10 | $5^{th}$ lens | 18.25991342 | 1.539 | glass | 1.609 | 46.44 | 20.223 |
| 11 | | −36.99028878 | 0.546 | | | | |
| 12 | $6^{th}$ lens | −18.24574524 | 5.000 | glass | 2.002 | 19.32 | −7.668 |
| 13 | | 15.33897192 | 0.215 | | | | |
| 14 | $7^{th}$ lens | 16.13218937 | 4.933 | glass | 1.517 | 64.20 | 13.620 |
| 15 | | −11.24007 | 8.664 | | | | |
| 16 | Infrared filter | 1E+18 | 1.000 | BK_7 | 1.517 | 64.2 | |
| 17 | | 1E+18 | 1.007 | | | | |
| 18 | Image plane | 1E+18 | −0.007 | | | | |

Reference wavelength (d-line): 555 nm; no

TABLE 12

Aspheric coefficients of the ninth embodiment

| Surface | 1 | 2 | 3 | 4 | 5 | 6 | 8 |
|---|---|---|---|---|---|---|---|
| k | 0.000000E+00 | 0.000000E+00 | 0.000000E+00 | 0.000000E+00 | 0.000000E+00 | 0.000000E+00 | 0.000000E+00 |
| A4 | 0.000000E+00 | 0.000000E+00 | 0.000000E+00 | 0.000000E+00 | 0.000000E+00 | 0.000000E+00 | 0.000000E+00 |
| A6 | 0.000000E+00 | 0.000000E+00 | 0.000000E+00 | 0.000000E+00 | 0.000000E+00 | 0.000000E+00 | 0.000000E+00 |
| A8 | 0.000000E+00 | 0.000000E+00 | 0.000000E+00 | 0.000000E+00 | 0.000000E+00 | 0.000000E+00 | 0.000000E+00 |
| A10 | 0.000000E+00 | 0.000000E+00 | 0.000000E+00 | 0.000000E+00 | 0.000000E+00 | 0.000000E+00 | 0.000000E+00 |
| A12 | 0.000000E+00 | 0.000000E+00 | 0.000000E+00 | 0.000000E+00 | 0.000000E+00 | 0.000000E+00 | 0.000000E+00 |

| Surface | 9 | 10 | 11 | 12 | 13 | 14 | 15 |
|---|---|---|---|---|---|---|---|
| k | 0.000000E+00 | 0.000000E+00 | 0.000000E+00 | 0.000000E+00 | 0.000000E+00 | 0.000000E+00 | 0.000000E+00 |
| A4 | 0.000000E+00 | 0.000000E+00 | 0.000000E+00 | 0.000000E+00 | 0.000000E+00 | 0.000000E+00 | 0.000000E+00 |
| A6 | 0.000000E+00 | 0.000000E+00 | 0.000000E+00 | 0.000000E+00 | 0.000000E+00 | 0.000000E+00 | 0.000000E+00 |
| A8 | 0.000000E+00 | 0.000000E+00 | 0.000000E+00 | 0.000000E+00 | 0.000000E+00 | 0.000000E+00 | 0.000000E+00 |
| A10 | 0.000000E+00 | 0.000000E+00 | 0.000000E+00 | 0.000000E+00 | 0.000000E+00 | 0.000000E+00 | 0.000000E+00 |
| A12 | 0.000000E+00 | 0.000000E+00 | 0.000000E+00 | 0.000000E+00 | 0.000000E+00 | 0.000000E+00 | 0.000000E+00 |

The values of expressions obtained based on Table 11 and Table 12 are listed in the following table:

| Ninth embodiment (Reference wavelength: 555 nm) | | | | | |
|---|---|---|---|---|---|
| \| f/f1 \| | \| f/f2 \| | \| f/f3 \| | \| f/f4 \| | \| f/f5 \| | \| f/f6 \| |
| 0.3764 | 0.0478 | 0.1081 | 0.2458 | 0.2354 | 0.6208 |
| \| f/f7 \| | ΣPPR | ΣNPR | ΣPPR/ \| ΣNPR \| | IN12 / f | IN67 / f |
| 0.3495 | 1.3510 | 0.6327 | 2.1352 | 2.8858 | 0.0451 |
| \| f1/f2 \| | \| f2/f3 \| | (TP1 + IN12)/ TP2 | | (TP7 + IN67)/ TP6 | |
| 0.1271 | 2.2599 | 3.7428 | | 1.0296 | |
| HOS | InTL | HOS / HOI | InS/ HOS | ODT % | TDT % |
| 81.6178 | 70.9539 | 13.6030 | 0.3451 | −113.2790 | 84.4806 |
| HVT11 | HVT12 | HVT21 | HVT22 | HVT31 | HVT32 |
| 0.0000 | 0.0000 | 0.0000 | 0.0000 | 0.0000 | 0.0000 |
| HVT61 | HVT62 | HVT71 | HVT72 | HVT72/ HOI | HVT72/ HOS |
| 0.0000 | 0.0000 | 0.0000 | 0.0000 | 0.0000 | 0.0000 |
| PSTA | PLTA | NSTA | NLTA | SSTA | SLTA |
| 0.060 mm | −0.005 mm | 0.016 mm | 0.006 mm | 0.020 mm | −0.008 mm |

The values related to the profile curve lengths obtained based on Table 11 and Table 12 are listed in the following table:

| Ninth embodiment (Reference wavelength: 555 nm) | | | | | | |
|---|---|---|---|---|---|---|
| ARE | 1/2(HEP) | ARE value | ARE − 1/2(HEP) | 2(ARE/HEP) % | TP | ARE/TP (%) |
| 11 | 1.082 | 1.081 | −0.00075 | 99.93% | 4.977 | 21.72% |
| 12 | 1.082 | 1.083 | 0.00149 | 100.14% | 4.977 | 21.77% |
| 21 | 1.082 | 1.082 | 0.00011 | 100.01% | 5.000 | 21.64% |
| 22 | 1.082 | 1.082 | −0.00034 | 99.97% | 5.000 | 21.63% |
| 31 | 1.082 | 1.081 | −0.00084 | 99.92% | 5.000 | 21.62% |
| 32 | 1.082 | 1.081 | −0.00075 | 99.93% | 5.000 | 21.62% |
| 41 | 1.082 | 1.081 | −0.00059 | 99.95% | 4.095 | 26.41% |
| 42 | 1.082 | 1.081 | −0.00067 | 99.94% | 4.095 | 26.40% |
| 51 | 1.082 | 1.082 | −0.00021 | 99.98% | 1.539 | 70.28% |
| 52 | 1.082 | 1.081 | −0.00069 | 99.94% | 1.539 | 70.25% |
| 61 | 1.082 | 1.082 | −0.00021 | 99.98% | 5.000 | 21.63% |
| 62 | 1.082 | 1.082 | 0.00005 | 100.00% | 5.000 | 21.64% |
| 71 | 1.082 | 1.082 | −0.00003 | 100.00% | 4.933 | 21.93% |
| 72 | 1.082 | 1.083 | 0.00083 | 100.08% | 4.933 | 21.95% |
| ARS | EHD | ARS value | ARS − EHD | (ARS/EHD)% | TP | ARS/TP (%) |
| 11 | 20.767 | 21.486 | 0.719 | 103.46% | 4.977 | 431.68% |
| 12 | 9.412 | 13.474 | 4.062 | 143.16% | 4.977 | 270.71% |
| 21 | 8.636 | 9.212 | 0.577 | 106.68% | 5.000 | 184.25% |
| 22 | 9.838 | 10.264 | 0.426 | 104.33% | 5.000 | 205.27% |
| 31 | 8.770 | 8.772 | 0.003 | 100.03% | 5.000 | 175.45% |
| 32 | 8.511 | 8.558 | 0.047 | 100.55% | 5.000 | 171.16% |
| 41 | 4.600 | 4.619 | 0.019 | 100.42% | 4.095 | 112.80% |
| 42 | 4.965 | 4.981 | 0.016 | 100.32% | 4.095 | 121.64% |
| 51 | 5.075 | 5.143 | 0.067 | 101.33% | 1.539 | 334.15% |
| 52 | 5.047 | 5.062 | 0.015 | 100.30% | 1.539 | 328.89% |
| 61 | 5.011 | 5.075 | 0.064 | 101.28% | 5.000 | 101.50% |
| 62 | 5.373 | 5.489 | 0.116 | 102.16% | 5.000 | 109.79% |
| 71 | 5.513 | 5.625 | 0.112 | 102.04% | 4.933 | 114.03% |
| 72 | 5.981 | 6.307 | 0.326 | 105.44% | 4.933 | 127.84% |

The temperature-adjustable optical imaging lenses 100, 200, 300 of the present invention could be applied to a group consisting of electronic portable devices, electronic wearable devices, electronic surveillance devices, electronic information devices, electronic communication devices, machine vision devices, and automotive electronic devices. Moreover, good imaging for both visible light and infrared light could be achieved by using the lens assemblies with different numbers of lenses to meet different requirements.

It must be pointed out that the embodiments described above are only some preferred embodiments of the present invention. All equivalent structures which employ the concepts disclosed in this specification and the appended claims should fall within the scope of the present invention.

What is claimed is:

1. A temperature-adjustable optical imaging lens, comprising:

an imaging lens assembly, comprising at least five lenses with refractive power and an image plane, wherein the at least five lenses, in order along an optical axis from an object side to an image side, comprises a first lens, a second lens, a third lens, a fourth lens, and a fifth lens;

a positioning assembly, comprising a lens barrel which is hollow and non-transparent, wherein the lens barrel has a cylindrical portion inside the lens barrel; the cylindrical portion is adapted to accommodate the imaging lens assembly;

a thermoconductive module, disposed in the cylindrical portion of the positioning assembly, wherein the thermoconductive module is disposed between the first lens and the second lens and is in contact with the first lens and the second lens, and a heating module, connected to the thermoconductive module and adapted to provide a heat source to the first lens and the second lens;

wherein the imaging lens assembly satisfies:

$$1.2 \leq f/HEP \leq 3.0;$$

$$1.5 \leq HOS/f \leq 10;$$

$$50\ deg < HAF \leq 100\ deg; \text{ and}$$

$$0.1 \leq 2(ARE/HEP) \leq 2.0;$$

wherein f is a focal length of the imaging lens assembly; HEP is an entrance pupil diameter of the imaging lens assembly; HAF is a half of a maximum field angle of the imaging lens assembly; HOS is a distance between an object-side surface, which faces the object side, of the first lens and the image plane on the optical axis; for any surface of any lens, ARE is a profile curve length measured from a start point where the optical axis passes therethrough, along a surface profile thereof, and finally to a coordinate point of a perpendicular distance where is a half of the entrance pupil diameter away from the optical axis, and wherein the thermoconductive module is a washer made of heat-conductive material; the washer has an upper peripheral surface facing the first lens and a lower peripheral surface facing the second lens; the washer has an inner annular hole penetrating through the upper peripheral surface and the lower peripheral surface; two sides of the inner annular hole form an upper rim on an inner side of the upper peripheral surface and a lower rim on an inner side of the lower peripheral surface, respectively; the washer is disposed on the second lens; the second lens abuts against the lower rim; the first lens abuts against the upper peripheral surface and is disposed on the washer.

2. The temperature-adjustable optical imaging lens as claimed in claim 1, wherein the upper peripheral surface has an annular convex portion and an abutting stepped portion; the annular convex portion surrounds the upper rim; the first lens abuts on the annular convex portion; the abutting stepped portion is recessed into an outer periphery of the annular convex portion.

3. The temperature-adjustable optical imaging lens as claimed in claim 2, wherein the heating module comprises an electric heating ring and a power connection portion; the electric heating ring is disposed on the upper peripheral surface of the washer, and the electric heating ring fits around the abutting stepped portion by surrounding the annular convex portion, so that the electric heating ring is located between the washer and the first lens; the power connection portion is connected to the electric heating ring and is guided out of the cylindrical portion to be connected to an external power source.

4. The temperature-adjustable optical imaging lens as claimed in claim 2, wherein the first lens has a first optical effective area, and a first optical ineffective area surrounding the first optical effective area; the second lens has a second optical effective area and a second optical ineffective area; the second optical effective area faces the first optical effective area; the second optical ineffective area surrounds the second optical effective area; the washer is disposed between the first optical ineffective area and the second optical ineffective area, wherein the inner annular hole of the washer correspondingly communicates between the first optical effective area and the second optical effective area.

5. The temperature-adjustable optical imaging lens as claimed in claim 1, wherein the first lens has a first optical effective area and a first optical ineffective area surrounding the first optical effective area; the second lens has a second optical effective area and a second optical ineffective area; the second optical effective area faces the first optical effective area; the second optical ineffective area surrounds the second optical effective area; the washer is disposed between the first optical ineffective area and the second optical ineffective area, wherein the inner annular hole of the washer correspondingly communicates between the first optical effective area and the second optical effective area.

6. The temperature-adjustable optical imaging lens as claimed in claim 1, wherein a thermal conductivity of the washer is in a range from 200 W/m·K to 400 W/m·K, and a linear thermal expansion coefficient of the washer is in a range from 15×10-6/K to 30×10-6/K.

7. The temperature-adjustable optical imaging lens as claimed in claim 1, wherein the imaging lens assembly further satisfies:

$$0.9 \leq 2(\text{ARE}/HEP) \leq 2.0.$$

8. The temperature-adjustable optical imaging lens as claimed in claim 1, wherein the imaging lens assembly has a total of six lenses with refractive power and comprises a sixth lens; the sixth lens is located between the fifth lens and the image plane; the imaging lens assembly further satisfies:

$$0.1 \leq InTL/HOS \leq 0.95;$$

wherein InTL is a distance between the object-side surface of the first lens and an image-side surface of the sixth lens on the optical axis of the imaging lens assembly.

9. The temperature-adjustable optical imaging lens as claimed in claim 1, wherein the imaging lens assembly has a total of seven lenses with refractive power and comprises a sixth lens and a seventh lens; the sixth lens and the seventh lens are located between the fifth lens and the image plane on the optical axis, wherein the sixth lens is located between the fifth lens and the seventh lens; the imaging lens assembly further satisfies:

$$0.1 \leq InTL/HOS \leq 0.95;$$

wherein InTL is a distance between the object-side surface of the first lens and an image-side surface of the seventh lens on the optical axis of the imaging lens assembly.

10. The temperature-adjustable optical imaging lens as claimed in claim 1, wherein the imaging lens assembly further satisfies:

$$PLTA \leq 100\ \mu\text{m};$$

$$PSTA \leq 100\ \mu\text{m};$$

$$NLTA \leq 100\ \mu\text{m};$$

$$NSTA \leq 100\ \mu\text{m};$$

$$SLTA \leq 100\ \mu\text{m};$$

$$SSTA \leq 100\ \mu\text{m}; \text{ and}$$

$$|TDT| < 100\%;$$

wherein TDT is a TV distortion; HOI is a maximum height for image formation on the image plane perpendicular to the optical axis; PLTA is a transverse aberration at 0.7 HOI on the image plane in a positive direction of a tangential fan of the imaging lens assembly after a longest operation wavelength of light passing through an edge of an entrance pupil; PSTA is a transverse aberration at 0.7 HOI on the image plane in the positive direction of the tangential fan after a shortest operation wavelength of light passing through the edge of the entrance pupil; NLTA is a transverse aberration at 0.7 HOI on the image plane in a negative direction of the tangential fan after the longest operation wavelength of light passing through the edge of the entrance pupil; NSTA is a transverse aberration at 0.7 HOI on the image plane in the negative direction of the tangential fan after the shortest operation wavelength of light passing through the edge of the entrance pupil; SLTA is a transverse aberration at 0.7 HOI on the image plane of a sagittal fan of the imaging lens assembly after the longest operation wavelength of light passing through the edge of the entrance pupil; SSTA is a transverse aberration at 0.7 HOI on the image plane of the sagittal fan after the shortest operation wavelength of light passing through the edge of the entrance pupil.

11. The temperature-adjustable optical imaging lens as claimed in claim 1, wherein the imaging lens assembly further comprises an aperture; the imaging lens assembly further satisfies:

$$0.2 \leq InS/HOS \leq 1.1;$$

wherein InS is a distance between the aperture and the image plane on the optical axis of the imaging lens assembly.

12. A temperature-adjustable optical imaging lens, comprising:

an imaging lens assembly, comprising at least five lenses with refractive power and an image plane, wherein the at least five lenses, in order along an optical axis from an object side to an image side, comprises a first lens, a second lens, a third lens, a fourth lens, and a fifth lens;

a positioning assembly, comprising a lens barrel which is hollow and non-transparent, wherein the lens barrel has a cylindrical portion inside the lens barrel; the cylindrical portion is adapted to accommodate the imaging lens assembly;

a thermoconductive module, disposed in the cylindrical portion of the positioning assembly, wherein the thermoconductive module is disposed between the first lens and the second lens and is in contact with the second lens, and a heating module, disposed on the thermoconductive module and being in contact with the first lens, wherein the heating module is adapted to provide a heat source to the first lens and the second lens;

wherein the imaging lens assembly satisfies:

$$1.2 \leq f/HEP \leq 3.0;$$

$$1.5 \leq HOS/f \leq 10;$$

$$50deg < HAF \leq 100deg; \text{ and}$$

$$0.1 \leq 2(ARE/HEP) \leq 2.0;$$

wherein f is a focal length of the imaging lens assembly; HEP is an entrance pupil diameter of the imaging lens assembly; HAF is a half of a maximum field angle of the imaging lens assembly; HOS is a distance between an object-side surface, which faces the object side, of the first lens and the image plane on the optical axis; for any surface of any lens, ARE is a profile curve length measured from a start point where the optical axis passes therethrough, along a surface profile thereof, and finally to a coordinate point of a perpendicular distance where is a half of the entrance pupil diameter away from the optical axis, and wherein the thermoconductive module is a washer made of heat-conductive material; the washer has an upper peripheral surface facing the first lens and a lower peripheral surface facing the second lens; the washer has an inner annular hole penetrating through the upper peripheral surface and the lower peripheral surface; two sides of the inner annular hole form an upper rim located on an inner side of the upper peripheral surface and a lower rim located on an inner side of the lower peripheral surface, respectively; the washer is disposed on the second lens; the second lens abuts against the lower rim; the heating module is disposed on the upper peripheral surface of the washer; the first lens abuts against the heating module, so that the heating module is in contact with the first lens and the washer.

13. The temperature-adjustable optical imaging lens as claimed in claim 12, wherein the heating module comprises an electric heating ring and a power connection portion; the electric heating ring surrounds the inner annular hole to correspond to the upper rim and is abutted by the first lens to be positioned on the upper peripheral surface of the washer; the power connection portion is connected to the electric heating ring and is guided out of the cylindrical portion to be connected to an external power source.

14. The temperature-adjustable optical imaging lens as claimed in claim 13, wherein the first lens has a first optical effective area and a first optical ineffective area surrounding the first optical effective area; the second lens has a second optical effective area and a second optical ineffective area; the second optical effective area faces the first optical effective area; the second optical ineffective area surrounds the second optical effective area; the washer is disposed between the first optical ineffective area and the second optical ineffective area, wherein the inner annular hole of the washer correspondingly communicates between the first optical effective area and the second optical effective area; the electric heating ring is in contact with the first optical ineffective area of the first lens.

15. The temperature-adjustable optical imaging lens as claimed in claim 12, wherein a thermal conductivity of the washer is in a range from 200 W/m·K to 400 W/m·K, and a linear thermal expansion coefficient of the washer is in a range from 15×10-6/K to 30×10-6/K.

16. The temperature-adjustable optical imaging lens as claimed in claim 12, wherein the imaging lens assembly further satisfies:

$$0.9 \leq ARS/EHD \leq 2.0;$$

wherein, for any surface of any lens, EHD is a maximum effective half diameter thereof; ARS is a profile curve length measured from a start point where the optical axis passes therethrough, along a surface profile thereof, and finally to an end point of the maximum effective half diameter thereof.

17. The temperature-adjustable optical imaging lens as claimed in claim 12, wherein the imaging lens assembly further satisfies:

$$PLTA \leq 100\ \mu m;$$

$$PSTA \leq 100\ \mu m;$$

$$NLTA \leq 100\ \mu m;$$

$$NSTA \leq 100\ \mu m;$$

$$SLTA \leq 100\ \mu m;$$

$$SSTA \leq 100\ \mu m; \text{ and}$$

$$|TDT| < 100\%;$$

wherein TDT is a TV distortion; HOI is a maximum height for image formation on the image plane perpendicular to the optical axis; PLTA is a transverse aberration at 0.7 HOI on the image plane in a positive direction of a tangential fan of the imaging lens assembly after a longest operation wavelength of light passing through an edge of an entrance pupil; PSTA is a transverse aberration at 0.7 HOI on the image plane in the positive direction of the tangential fan after a shortest operation wavelength of light passing through the edge of the entrance pupil; NLTA is a transverse aberration at 0.7 HOI on the image plane in a negative direction of the tangential fan after the longest operation wavelength of light passing through the edge of the entrance pupil; NSTA is a transverse aberration at 0.7 HOI on the image plane in the negative direction of the tangential fan after the shortest operation wavelength of light passing through the edge of the entrance pupil; SLTA is a transverse aberration at 0.7 HOI on the image plane of a sagittal fan of the imaging lens assembly after the longest operation wavelength of light passing through the edge of the entrance pupil; SSTA is a transverse aberration at 0.7 HOI on the image plane of the sagittal fan after the shortest operation wavelength of light passing through the edge of the entrance pupil.

18. The temperature-adjustable optical imaging lens as claimed in claim 12, wherein the imaging lens assembly further satisfies:

$$0.6 \leq TP1/TP2 \leq 0.9; \text{ and}$$

$$0.4 \leq TP2/TP3 \leq 0.6;$$

wherein TP1 is a thickness of the first lens on the optical axis of the imaging lens assembly; TP2 is a thickness of the second lens on the optical axis of the imaging lens assembly; TP3 is a thickness of the third lens on the optical axis of the imaging lens assembly.

19. The temperature-adjustable optical imaging lens as claimed in claim 12, wherein the imaging lens assembly has a total of six lenses with refractive power and comprises a sixth lens; the sixth lens is located between the fifth lens and the image plane; the imaging lens assembly further satisfies:

$$0.1 \leq InTL/HOS \leq 0.95;$$

wherein InTL is a distance between the object-side surface of the first lens and an image-side surface of the sixth lens on the optical axis of the imaging lens assembly.

20. The temperature-adjustable optical imaging lens as claimed in claim 12, wherein the imaging lens assembly has a total of seven lenses with refractive power and comprises a sixth lens and a seventh lens; the sixth lens and the seventh lens are located between the fifth lens and the image plane on the optical axis, wherein the sixth lens is located between the fifth lens and the seventh lens; wherein the imaging lens assembly further satisfies:

$$0.1 \leq InTL/HOS \leq 0.95;$$

wherein InTL is a distance between the object-side surface of the first lens and an image-side surface of the seventh lens on the optical axis of the imaging lens assembly.

21. The temperature-adjustable optical imaging lens as claimed in claim 12, wherein the temperature-adjustable optical imaging lens is applicable to a group consisting of electronic portable devices, electronic wearable devices, electronic surveillance devices, electronic information devices, electronic communication devices, machine vision devices, and automotive electronic devices.

22. A temperature-adjustable optical imaging lens, comprising:

an imaging lens assembly, comprising at least five lenses with refractive power and an image plane, wherein the at least five lenses, in order along an optical axis from an object side to an image side, comprises a first lens, a second lens, a third lens, a fourth lens, and a fifth lens;

a positioning assembly, comprising a lens barrel which is hollow and non-transparent, wherein the lens barrel has a cylindrical portion inside the lens barrel; the cylindrical portion is adapted to accommodate the imaging lens assembly;

a thermoconductive module, disposed in the cylindrical portion of the positioning assembly, wherein the thermoconductive module is disposed between the first lens and the second lens and is in contact with the second lens, and a heating module, connected to the thermoconductive module and adapted to provide a heat source to the first lens and the second lens;

wherein the imaging lens assembly satisfies:

$$1.6 \leq f/HEP \leq 2.31;$$

$$1.7 \leq HOS/f \leq 8.0;$$

$$60deg < HAF \leq 70deg; \text{ and}$$

$$0.1 \leq 2(ARE/HEP) \leq 2.0;$$

wherein f is a focal length of the imaging lens assembly; HEP is an entrance pupil diameter of the imaging lens assembly; HAF is a half of a maximum field angle of the imaging lens assembly; HOS is a distance between an object-side surface, which faces the object side, of the first lens and the image plane on the optical axis; for any surface of any lens, ARE is a profile curve length measured from a start point where the optical axis passes therethrough, along a surface profile thereof, and finally to a coordinate point of a perpendicular distance where is a half of the entrance pupil diameter away from the optical axis.

23. The temperature-adjustable optical imaging lens as claimed in claim 22, wherein the thermoconductive module is a washer made of heat-conductive material; the washer has an upper peripheral surface facing the first lens and a lower peripheral surface facing the second lens; the washer has an inner annular hole penetrating through the upper peripheral surface and the lower peripheral surface; two sides of the inner annular hole form an upper rim located on an inner side of the upper peripheral surface and a lower rim located on an inner side of the lower peripheral surface, respectively; the washer is disposed on the second lens; the second lens abuts against the lower rim.

24. The temperature-adjustable optical imaging lens as claimed in claim 23, wherein the heating module comprises an electric heating ring and a power connection portion; the electric heating ring is in contact with the washer by surrounding the inner annular hole; the power connection portion is connected to the electric heating ring and is guided out of the cylindrical portion to be connected to an external power source.

25. The temperature-adjustable optical imaging lens as claimed in claim 24, wherein the upper peripheral surface has an annular convex portion and an abutting stepped portion; the annular convex portion surrounds the upper rim, and the first lens abuts on the annular convex portion; the abutting stepped portion is recessed into an outer periphery of the annular convex portion; the electric heating ring is located between the washer and the first lens.

26. The temperature-adjustable optical imaging lens as claimed in claim 25, wherein the first lens has a first optical effective area and a first optical ineffective area surrounding the first optical effective area; the second lens has a second optical effective area and a second optical ineffective area; the second optical effective area faces the first optical effective area; the second optical ineffective area surrounds the second optical effective area; the washer is disposed between the first optical ineffective area and the second optical ineffective area, wherein the inner annular hole of the washer correspondingly communicates between the first optical effective area and the second optical effective area; the electric heating ring is in contact with the first optical ineffective area of the first lens.

27. The temperature-adjustable optical imaging lens as claimed in claim 24, wherein the electric heating ring is fixed to the upper peripheral surface of the washer to correspond to the upper rim, and the first lens abuts against the electric heating ring, so that the electric heating ring is disposed between the first lens and the washer.

28. The temperature-adjustable optical imaging lens as claimed in claim 27, wherein the first lens has a first optical effective area and a first optical ineffective area surrounding the first optical effective area; the second lens has a second optical effective area and a second optical ineffective area; the second optical effective area faces the first optical effective area; the second optical ineffective area surrounds the second optical effective area; the washer is disposed between the first optical ineffective area and the second optical ineffective area, wherein the inner annular hole of the washer correspondingly communicates between the first optical effective area and the second optical effective area; the electric heating ring is in contact with the first optical ineffective area of the first lens.

29. The temperature-adjustable optical imaging lens as claimed in claim 24, wherein the electric heating ring is fixed to the lower peripheral surface of the washer to correspond to the lower rim, and the electric heating ring surrounds the second lens.

30. The temperature-adjustable optical imaging lens as claimed in claim 23, wherein a thermal conductivity of the washer is in a range from 200 W/m·K to 400 W/m·K, and a linear thermal expansion coefficient of the washer is in a range from 15×10-6/K to 30×10-6/K.

31. The temperature-adjustable optical imaging lens as claimed in claim 22, wherein all lenses among the first lens to the fifth lens are made of glass.

32. The temperature-adjustable optical imaging lens as claimed in claim 22, wherein the imaging lens assembly further satisfies:

$$0.6 \leq TP1/TP2 \leq 0.9;$$

wherein TP1 is a thickness of the first lens along the optical axis of the imaging lens assembly; TP2 is a thickness of the second lens along the optical axis of the imaging lens assembly.

33. The temperature-adjustable optical imaging lens as claimed in claim 22, wherein the imaging lens assembly further satisfies:

$$0.4 \leq TP2/TP3 \leq 0.6;$$

wherein TP2 is a thickness of the second lens along the optical axis of the imaging lens assembly; TP3 is a thickness of the third lens along the optical axis of the imaging lens assembly.

34. The temperature-adjustable optical imaging lens as claimed in claim 22, wherein the imaging lens assembly further satisfies:

$$0.9 \leq IN12/f \leq 1.1;$$

wherein IN12 is a distance between the first lens and the second lens along the optical axis of the imaging lens assembly.

35. The temperature-adjustable optical imaging lens as claimed in claim 22, wherein the imaging lens assembly further comprises an aperture and an image sensor; the image sensor is disposed on the image plane; the imaging lens assembly further satisfies:

$$0.2 \leq InS/HOS \leq 1.1;$$

wherein InS is a distance between the aperture and the image plane on the optical axis of the imaging lens assembly.

* * * * *